United States Patent
Moreno et al.

(10) Patent No.: US 12,393,891 B1
(45) Date of Patent: *Aug. 19, 2025

(54) SYSTEMS, METHODS, AND GRAPHICAL USER INTERFACES FOR SECURE EXECUTION OF ANALYTICAL TASKS USING NATURAL LANGUAGE

(71) Applicant: SAS Institute Inc., Cary, NC (US)

(72) Inventors: Julia Moreno, Glasgow (GB); Kedar Shriram Prabhudesai, Cary, NC (US); Fang Liang, Cary, NC (US); Varunraj Valsaraj, Cary, NC (US); Pelin Cay, Raleigh, NC (US); Brett Alexander Vogelsang, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/966,368

(22) Filed: Dec. 3, 2024

Related U.S. Application Data

(63) Continuation of application No. 18/966,237, filed on Dec. 3, 2024, which is a continuation of application
(Continued)

(51) Int. Cl.
| | |
|---|---|
| *G06Q 10/06* | (2023.01) |
| *G06F 21/62* | (2013.01) |
| *G06Q 10/0631* | (2023.01) |

(52) U.S. Cl.
CPC ......... *G06Q 10/0631* (2013.01); *G06F 21/62* (2013.01)

(58) Field of Classification Search
CPC .................................................. G06Q 10/06
See application file for complete search history.

(56) References Cited

U.S. PATENT DOCUMENTS

| | | |
|---|---|---|
| 9,229,984 B2 | 1/2016 | George |
| 10,169,600 B2 | 1/2019 | Feng et al. |

(Continued)

FOREIGN PATENT DOCUMENTS

| | | |
|---|---|---|
| CN | 109565461 B | 7/2021 |
| CN | 114861456 A | 8/2022 |

(Continued)

OTHER PUBLICATIONS

Zhikai Chen et al., Exploring the Potential of Large Language Models (LLMs) in Learning on Graphs, The Hong Kong Polytechnic University, Jan. 25, 2024. (Year: 2024).*

(Continued)

*Primary Examiner* — Kurtis Gills
(74) *Attorney, Agent, or Firm* — Padowithz Alce; Quintin Scheitlin; Alce PLLC

(57) ABSTRACT

A computer-implemented method includes receiving a natural language input including a natural language request for executing an analytical task and processing the natural language input by a language model, where the processing may include translating the natural language input to an analytical function call for calling an analytical function of a set of distinct analytical functions of an analytics computing server. Additionally, the computer-implemented method includes calling the analytical function at the analytics computing server using the analytical function call, receiving a technical output in response to calling the analytical function, and outputting a response to the natural language input that includes the technical analytical output.

32 Claims, 34 Drawing Sheets

Related U.S. Application Data

No. 18/966,201, filed on Dec. 3, 2024, now Pat. No. 12,271,688.

(60) Provisional application No. 63/552,063, filed on Feb. 9, 2024.

(56) References Cited

U.S. PATENT DOCUMENTS

| | | | |
|---|---|---|---|
| 10,789,426 | B2 | 9/2020 | Lavallee |
| 10,805,382 | B2 | 10/2020 | Narayanam et al. |
| 10,929,606 | B2 | 2/2021 | Martineau |
| 11,301,631 | B1 | 4/2022 | Atallah |
| 11,321,373 | B2 | 5/2022 | Gupta |
| 11,636,104 | B2 | 4/2023 | Penzo et al. |
| 11,698,933 | B1 | 7/2023 | Atallah |
| 11,769,017 | B1 | 9/2023 | Gray et al. |
| 11,809,983 | B2 | 11/2023 | Long et al. |
| 11,886,826 | B1 | 1/2024 | Bavarian |
| 12,008,332 | B1 | 6/2024 | Gardner et al. |
| 2012/0191642 | A1 | 7/2012 | George |
| 2013/0268260 | A1 | 10/2013 | Lundberg |
| 2017/0221476 | A1 | 8/2017 | Iverson |
| 2019/0362094 | A1 | 11/2019 | Van Hoof et al. |
| 2020/0035230 | A1 | 1/2020 | Yadav |
| 2021/0056170 | A1 | 2/2021 | Bohannon et al. |
| 2021/0192134 | A1 | 6/2021 | Yue et al. |
| 2022/0106121 | A1 | 4/2022 | Puite et al. |
| 2022/0156466 | A1* | 5/2022 | Gill .................. G06N 5/022 |
| 2022/0283789 | A1 | 9/2022 | Yadhav et al. |
| 2023/0067828 | A1 | 3/2023 | Pandit et al. |
| 2023/0141200 | A1 | 5/2023 | Taylor |
| 2023/0315856 | A1 | 10/2023 | Lee |
| 2024/0012379 | A1* | 1/2024 | Popp ................ G05B 19/418 |
| 2024/0126998 | A1 | 4/2024 | Tory |
| 2024/0257020 | A1 | 8/2024 | Kruger |
| 2024/0289733 | A1 | 8/2024 | Singh et al. |
| 2024/0290327 | A1 | 8/2024 | Byrne |
| 2024/0303422 | A1 | 9/2024 | Fabian et al. |
| 2024/0346246 | A1 | 10/2024 | Scholak |
| 2024/0414048 | A1* | 12/2024 | Kasap .................. G06N 3/045 |
| 2024/0419835 | A1* | 12/2024 | Karlberg ................ G06N 3/04 |
| 2025/0005224 | A1 | 1/2025 | Anthony et al. |
| 2025/0005293 | A1 | 1/2025 | Nguyen |
| 2025/0005297 | A1* | 1/2025 | Davish ................ G06F 40/40 |
| 2025/0013963 | A1* | 1/2025 | Qazvinian .......... G06Q 10/0639 |

FOREIGN PATENT DOCUMENTS

| | | | |
|---|---|---|---|
| CN | 117216232 | A1 | 12/2023 |
| CN | 117252195 | A | 12/2023 |
| CN | 117332067 | A | 1/2024 |
| EP | 3399429 | A1 * | 11/2018 ........... G06F 40/174 |
| WO | 2024182250 | A1 | 9/2024 |

OTHER PUBLICATIONS

Lambrecht et al., "CM05: Unlocking the Potential of Generative AI for the Pharmaceutical Industry—SAS AI—enabled Assistant," Phuse, 2023, pp. 1-36.

Helena Yu, "A Paradigm Shift in Data Analytics with the Rise of Large Language Models," Medium, Oct. 9, 2023, pp. 1-19.

Tanay Varshney, "Build an LLM-Powered Data Agent for Data Analysis," Generative AI/LLM's, Feb. 20, 2024, pp. 1-7.

Mariya Mansurova, "Can LLMs Replace Data Analysts? Building an LLM-Powered Analyst," Towards Data Science, Dec. 11, 2023, pp. 1-34.

Julian Jerzerick, "ChatSLC: Using Altair's Alternative SAS Language Environment to Communicate with ChatGPT," Medium, Apr. 24, 2023, pp. 1-15.

Harveen Kathuria, "Einstien Copilot in Tableau: Accelerate Analysis with AI," Tableau, Jan. 29, 2024, pp. 1-7.

Wenxin Song, "Enhancing Tabular Data Analysis with LLMs," Medium, Feb. 5, 2024, pp. 1-22.

The Pecan Team, "How LLMs and Data Analytics Work Together," Pecan, Jan. 3, 2024, pp. 1-20.

Huzefa Chawre, "How LLMs Are Changing the Face of Business Analytics," Turing, 2024, pp. 1-13.

Kim Manis, "Introducing Microsoft Fabric and Copliot in Microsoft Power BI," Microsft, May 23, 2023, pp. 1-28.

Richie Cotton, "Introduction to LangChain for Data Engineerin & Data Applications," DataCamp, Apr. 2023, pp. 1-11.

Microsoft, "Overview of Copliot for Power BI," Mar. 5, 2024, pp. 1-7.

Yeliz Kilinc, "SAS Code Migration into Open-Source Language by Using Azure OpenAI," Microsoft, Aug. 28, 2023, pp. 1-9.

Snowflake Inc., "What is a Large Language Model and What Can LLMS do for Data Science?," 2023, pp. 1-10.

Tian et al., ChartGPT: Leveraging LLMs to Generate Charts from Abstract Natural Language, pp. 1-15, Journal of Latex Class Files, vol. 14, No. 8, Aug. 2021.

Bethaz et al., "DS4ALL: All You Need for Democratizing Data Exploration and Analysis," 2021 IEEE International Conference on Big Data (Big Data), pp. 4235-4242, 2021.

Generative Artificial Intelligence in Supply Chain and Operations Management: a Capability-Based Framework for Analysis and Implementation; Jackson et al., Jan. 2, 2024.

International Search Report and Written Opinion received in International Application No. PCT/US2024/058308 mailed Apr. 1, 2025.

* cited by examiner

SPACE PLANNING OPTIMIZATION

CHATBOT | OVERAGE CHATBOT INFO

2005

| MATERIAL | MATERIAL_DESCRIPTION | ITEM | SUPPLIER | TEMP CONTROLLED |
|---|---|---|---|---|
| MATERIAL AF | DESCRIPTION AF | 165 | 172 | AMBIENT |
| MATERIAL AG | DESCRIPTION AG | 131 | 231 | AMBIENT |
| MATERIAL AH | DESCRIPTION AH | 127 | 193 | AMBIENT |
| MATERIAL AI | DESCRIPTION AI | 123 | 474 | TEMP CONTROLLED |
| MATERIAL AJ | DESCRIPTION AJ | 123 | 1557 | TEMP CONTROLLED |
|  |  |  |  | 1434 |

2002D — 2004D

LIST ITEMS TO MOVE IN

BASED ON THE OPTIMIZATION MODEL RESULTS AND ONLY CONSIDERING QUANTITIES GREATER THAN OR EQUAL TO 100, WE RECOMMEND MOVING IN (OVERFLOW → MAIN) 15 [3,319.0 PALLETS]. HERE IS THE LIST OF TOP 10 MATERIALS TO MOVE IN:

2002E

| MATERIAL | MATERIAL_DESCRIPTION | MOVE_IN_QTY | STOCK_HBC | TEMP_DESC | TOTAL_8_WEEK_DEMAND |
|---|---|---|---|---|---|
| MATERIAL BA | DESCRIPTION BA | 749 | 55 | AMBIENT | 185 |
| MATERIAL BB | DESCRIPTION BB | 336 | 324 | TEMP CONTROLLED | 682 |
| MATERIAL BC | DESCRIPTION BC | 263 | 294 |  | 527 |
| MATERIAL BD | DESCRIPTION BD | 226 | 33 | TEMP CONTROLLED | 259 |
| MATERIAL BE | DESCRIPTION BE | 223 | 37 | TEMP CONTROLLED | 394 |
| MATERIAL BF | DESCRIPTION BF | 212 | 356 | AMBIENT | 570 |
| MATERIAL BG | DESCRIPTION BG | 205 | 697 | AMBIENT | 903 |
| MATERIAL BH | DESCRIPTION BH | 194 | 144 |  | 338 |
| MATERIAL BI | DESCRIPTION BI | 157 | 322 | TEMP CONTROLLED | 777 |
| MATERIAL BJ | DESCRIPTION BJ | 137 | 129 | TEMP CONTROLLED | 266 |

2020 — SUBMIT — 2001

LIST AMBIENT ITEMS TO MOVE IN

---

WEEK NUMBER: 38, [ CLICK HERE FOR VISUAL ANALYTICS REPORT ]
LAST UPDATE: WED 20 MAR 2024, 10:35AM
TARGET UTILIZATION: --NOT SET--
SCENARIO SUMMARY: [ CURRENT SCENARIO: BASESCENARIO ]

2010

| SCENARIO | UTIL BEFORE | UTIL AFTER | MAIN → OVERFLOW | OVERFLOW → MAIN |
|---|---|---|---|---|
| BASESCENARIO | 96.0% | 82.0% | MATS: 697 [PLTS: 12,339] | MATS: 47 [PLTS: 4,254] |

SYSTEMS, METHODS, AND GRAPHICAL USER INTERFACES FOR SECURE EXECUTION OF ANALYTICAL TASKS USING NATURAL LANGUAGE

CROSS-REFERENCE TO RELATED APPLICATIONS

This application is a continuation of U.S. patent application Ser. No. 18/966,237, filed on 3 Dec. 2024, which is a continuation of U.S. patent application Ser. No. 18/966,201, filed on 3 Dec. 2024, which claims the benefit of U.S. Provisional Application No. 63/552,063, filed on 9 Feb. 2024, which are incorporated in their entireties by this reference.

TECHNICAL FIELD

This invention relates generally to the machine learning field and, more specifically, to new and useful systems and methods for secure execution of analytics tasks using natural language.

BACKGROUND

The execution of analytical functions often involves users interacting with systems through specialized interfaces that demand structured and precise inputs. These traditional methods may be difficult for users who are not familiar with technical formats and syntaxes, limiting accessibility and ease of use. One solution may include using a language model to interpret natural language inputs requesting an analytical function and attempting to execute the requested analytical function. However, language models that attempt to execute an analytical function may end up outputs that appear plausible but are misleading or otherwise incorrect.

Additionally, integrating language models to interpret inputs from users may introduce one or more security vulnerabilities. For instance, giving language models direct access to sensitive data may create risks of unintended data exposure. In one example, misinterpreted requests or inputs from unauthorized users may result in the language model disclosing confidential information. The techniques described herein may seek to address the challenges of executing analytical functions accurately after receiving a corresponding natural language input while limiting security vulnerabilities associated with processing the natural language input and executing the analytical functions.

BRIEF SUMMARY OF THE EMBODIMENT(S)

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In some embodiments, a computer-program product may comprise a non-transitory machine-readable storage medium storing computer instructions that, when executed by one or more processors, perform operations comprising: receiving, via a graphical user interface, a natural language input comprising a natural language request for executing an analytical task; processing the natural language input by a large language model, wherein the processing includes: translating the natural language input to an analytical function call for calling an analytical function of a plurality of distinct analytical functions of an analytics computing server, and extracting, from the natural language input, a function parameter value for each of one or more parameters for executing the analytical function; calling the analytical function at the analytics computing server using the analytical function call and the function parameter value extracted for each of the one or more parameters of the analytical function; receiving a technical analytical output in response to calling the analytical function using the function parameter value extracted for each of the one or more parameters of the analytical function; translating, by the large language model, the technical analytical output to a natural language explanation of the technical analytical output; and outputting, via the graphical user interface, a response to the natural language input that includes the technical analytical output and the natural language explanation of the technical analytical output.

In some embodiments of the computer-program product, the large language model is configured to translate the natural language input to a plurality of distinct analytical function calls, each of the plurality of analytical function calls are associated with a function prompt name and a function prompt description, and translating the natural language input to the analytical function call includes: detecting, via the large language model, that a vector value of the function prompt name and a vector value of the function prompt description of the analytical function call of the plurality of distinct analytical function calls has a smallest vector distance to a vector value of the natural language input, and translating the natural language input to the analytical function call based on detecting that the vector value of the function prompt name and the vector value of the function prompt description has the smallest vector distance to the vector value of the natural language input.

In some embodiments of the computer-program product, the one or more parameters of the analytical function include a first parameter that is of a first data type, and extracting the function parameter value of each of the one or more parameters of the analytical function includes: extracting, via the large language model, one or more tokens from the natural language input that correspond to the first parameter, determining, via the large language model, that the one or more tokens are of a second data type, different from the first data type, converting, via the large language model, the one or more tokens of the second data type to the first data type, and using the one or more tokens of the first data type as the function parameter value extracted for the first parameter.

In some embodiments of the computer-program product, the analytical function comprises the one or more parameters and further comprises a required parameter, and the computer instructions, when executed by the one or more processors, perform operations further comprising determining that the large language model did not extract the function parameter value of the required parameter, and assigning a default function parameter value to the required parameter in response to determining that the large language model did not extract the function parameter value of the required parameter, and calling the analytical function is based on the function parameter value extracted for the one or more parameters and the default function parameter value assigned to the required parameter.

In some embodiments of the computer-program product, the computer instructions, when executed by the one or more processors, perform operations further comprising: initializing the large language model with a respective analytical function call of a plurality of analytical function calls includes: assigning a function prompt name to the respective analytical function call, assigning a function prompt description to the respective analytical function call, adding, to an extensible data structure, an entry corresponding to the respective analytical function call, wherein the entry includes the respective analytical function call, the function prompt name assigned to the respective analytical function call, and the function prompt description assigned to the respective analytical function call, and providing the extensible data structure to the large language model.

In some embodiments of the computer-program product, the function prompt name assigned to the respective analytical function call specifies a role of the respective analytical function call, and the function prompt description assigned to the respective analytical function call includes instructions that: define one or more parameters of the respective analytical function call and define a return format of the respective analytical function call.

In some embodiments of the computer-program product, the role of the respective analytical function call in the function prompt name is specified using a first amount of text, and the function prompt description assigned to the respective analytical function call further includes instructions that: define the role of the respective analytical function call with a second amount of text, greater than the first amount of text.

In some embodiments of the computer-program product, initializing the large language model with the respective analytical function call and a second respective analytical function call of the plurality of analytical function calls further includes: assigning a function prompt name to the second respective analytical function call, assigning a function prompt description to the second respective analytical function call, and adding, to the extensible data structure, a second entry corresponding to the second respective analytical function call, wherein the second entry includes the second respective analytical function call, the function prompt name assigned to the second respective analytical function call, and the function prompt description assigned to the second respective analytical function call.

In some embodiments of the computer-program product, the analytical task specified in the natural language input is an optimization task, the analytical function is an optimization function, and the technical analytical output of the analytical function is an optimization output of the optimization function.

In some embodiments of the computer-program product, the analytical function call includes a first parameter and a second parameter, the analytical function of the analytics computing server includes a third parameter and a fourth parameter, extracting the function parameter value of each of the one or more parameters of the analytical function includes: extracting, from the natural language input, a function parameter value for the first parameter of the analytical function call and a function parameter value for the second parameter of the analytical function call, using the function parameter value extracted for the first parameter of the analytical function call as the function parameter value for the third parameter of the analytical function, and using the function parameter value extracted for the second parameter of the analytical function call as the function parameter value for the fourth parameter of the analytical function.

In some embodiments of the computer-program product, the graphical user interface includes a first section and a second section, the first section of the graphical user interface is configured to receive the natural language input and display the response to the natural language input, and the second section of the graphical user interface is configured to display a graphical visualization associated with the response to the natural language input.

In some embodiments of the computer-program product, the graphical visualization in the second section of the graphical user interface is updated in response to receiving one or more additional natural language inputs.

In some embodiments of the computer-program product, the graphical user interface that receives the natural language input is in communication with a large language model computing server that executes the large language model; the large language model computing server is in communication with a function call computing server configured with a function call library that includes the analytical function call; the function call computing server is in communication with the analytics computing server configured to execute one or more of the plurality of distinct analytical functions; and the analytics computing server is in communication with a computer database comprising user data and a visual analytics computing server that generates graphical analytic content for the response to the natural language input.

In some embodiments of the computer-program product, the large language model is fine-tuned to classify the natural language input to the analytical function call and a plurality of additional analytical functions calls, and fine-tuning the large language model includes: providing the large language model with an extensible data structure comprising a plurality of function call entries corresponding to the analytical function call and the plurality of additional analytical function calls, wherein a respective function call entry includes a respective analytical function call, a function prompt name associated with the respective analytical function call, and a function prompt description associated with the respective analytical function call, and fine-tuning the large language model using the extensible data structure.

In some embodiments, a computer-implemented method comprising: receiving, via a graphical user interface, a natural language input comprising a natural language request for executing an analytical task; processing the natural language input by a large language model, wherein the processing includes: translating the natural language input to an analytical function call for calling an analytical function of a plurality of distinct analytical functions of an analytics computing server, and extracting, from the natural language input, a function parameter value for each of one or more parameters for executing the analytical function; calling the analytical function at the analytics computing server using the analytical function call and the function parameter value extracted for each of the one or more parameters of the analytical function; receiving a technical analytical output in response to calling the analytical function using the function parameter value extracted for each of the one or more parameters of the analytical function; translating, by the large language model, the technical analytical output to a natural language explanation of the technical analytical output; and outputting, via the graphical user interface, a response to the natural language input that includes the technical analytical output and the natural language explanation of the technical analytical output.

In some embodiments of the computer-implemented method, the large language model is configured to translate the natural language input to a plurality of distinct analytical function calls, each of the plurality of analytical function calls are associated with a function prompt name and a function prompt description, and translating the natural language input to the analytical function call includes: detecting, via the large language model, that a vector value of the function prompt name and a vector value of the function prompt description of the analytical function call of the plurality of distinct analytical function calls has a smallest vector distance to a vector value of the natural language input, and translating the natural language input to the analytical function call based on detecting that the vector value of the function prompt name and the vector value of the function prompt description has the smallest vector distance to the vector value of the natural language input.

In some embodiments of the computer-implemented method, the one or more parameters of the analytical function include a first parameter that is of a first data type, and extracting the function parameter value of each of the one or more parameters of the analytical function includes: extracting, via the large language model, one or more tokens from the natural language input that correspond to the first parameter, determining, via the large language model, that the one or more tokens are of a second data type, different from the first data type, converting, via the large language model, the one or more tokens of the second data type to the first data type, and using the one or more tokens of the first data type as the function parameter value extracted for the first parameter.

In some embodiments of the computer-implemented method, the analytical function comprises the one or more parameters and further comprises a required parameter, the computer instructions, when executed by the one or more processors, perform operations further comprising: determining that the large language model did not extract the function parameter value of the required parameter, and assigning a default function parameter value to the required parameter in response to determining that the large language model did not extract the function parameter value of the required parameter, and calling the analytical function is based on the function parameter value extracted for the one or more parameters and the default function parameter value assigned to the required parameter.

In some embodiments of the computer-implemented method, the computer instructions, when executed by the one or more processors, perform operations further comprising: initializing the large language model with a respective analytical function call of a plurality of analytical function calls includes: assigning a function prompt name to the respective analytical function call, assigning a function prompt description to the respective analytical function call, adding, to an extensible data structure, an entry corresponding to the respective analytical function call, wherein the entry includes the respective analytical function call, the function prompt name assigned to the respective analytical function call, and the function prompt description assigned to the respective analytical function call, and providing the extensible data structure to the large language model.

In some embodiments of the computer-implemented method, the function prompt name assigned to the respective analytical function call specifies a role of the respective analytical function call, and the function prompt description assigned to the respective analytical function call includes instructions that: define one or more parameters of the respective analytical function call and define a return format of the respective analytical function call.

In some embodiments of the computer-implemented method, the role of the respective analytical function call in the function prompt name is specified using a first amount of text, and the function prompt description assigned to the respective analytical function call further includes instructions that: define the role of the respective analytical function call with a second amount of text, greater than the first amount of text.

In some embodiments of the computer-implemented method, initializing the large language model with the respective analytical function call and a second respective analytical function call of the plurality of analytical function calls further includes: assigning a function prompt name to the second respective analytical function call, assigning a function prompt description to the second respective analytical function call, and adding, to the extensible data structure, a second entry corresponding to the second respective analytical function call, wherein the second entry includes the second respective analytical function call, the function prompt name assigned to the second respective analytical function call, and the function prompt description assigned to the second respective analytical function call.

In some embodiments of the computer-implemented method, the analytical task specified in the natural language input is an optimization task, the analytical function is an optimization function, and the technical analytical output of the analytical function is an optimization output of the optimization function.

In some embodiments of the computer-implemented method, the analytical function call includes a first parameter and a second parameter, the analytical function of the analytics computing server includes a third parameter and a fourth parameter, extracting the function parameter value of each of the one or more parameters of the analytical function includes: extracting, from the natural language input, a function parameter value for the first parameter of the analytical function call and a function parameter value for the second parameter of the analytical function call, using the function parameter value extracted for the first parameter of the analytical function call as the function parameter value for the third parameter of the analytical function, and using the function parameter value extracted for the second parameter of the analytical function call as the function parameter value for the fourth parameter of the analytical function.

In some embodiments of the computer-implemented method, the graphical user interface includes a first section and a second section, the first section of the graphical user interface is configured to receive the natural language input and display the response to the natural language input, and the second section of the graphical user interface is configured to display a graphical visualization associated with the response to the natural language input.

In some embodiments of the computer-implemented method, the graphical visualization in the second section of the graphical user interface is updated in response to receiving one or more additional natural language inputs.

In some embodiments of the computer-implemented method, the graphical user interface that receives the natural language input is in communication with a large language model computing server that executes the large language model; the large language model computing server is in communication with a function call computing server configured with a function call library that includes the analytical function call; the function call computing server is in communication with the analytics computing server configured to execute one or more of the plurality of distinct analytical functions; and the analytics computing server is in communication with a computer database comprising user data and a visual analytics computing server that generates graphical analytic content for the response to the natural language input.

In some embodiments of the computer-implemented method, the large language model is fine-tuned to classify the natural language input to the analytical function call and a plurality of additional analytical functions calls, and fine-tuning the large language model includes: providing the large language model with an extensible data structure comprising a plurality of function call entries corresponding to the analytical function call and the plurality of additional analytical function calls, wherein a respective function call entry includes a respective analytical function call, a function prompt name associated with the respective analytical function call, and a function prompt description associated with the respective analytical function call, and fine-tuning the large language model using the extensible data structure.

In some embodiments, a computer-implemented system may comprise: one or more processors; a memory; a computer-readable medium operably coupled to the one or more processors, the computer-readable medium having computer-readable instructions stored thereon that, when executed by the one or more processors, cause a computing device to perform operations comprising: receiving, via a graphical user interface, a natural language input comprising a natural language request for executing an analytical task; processing the natural language input by a large language model, wherein the processing includes: translating the natural language input to an analytical function call for calling an analytical function of a plurality of distinct analytical functions of an analytics computing server, and extracting, from the natural language input, a function parameter value for each of one or more parameters for executing the analytical function; calling the analytical function at the analytics computing server using the analytical function call and the function parameter value extracted for each of the one or more parameters of the analytical function; receiving a technical analytical output in response to calling the analytical function using the function parameter value extracted for each of the one or more parameters of the analytical function; translating, by the large language model, the technical analytical output to a natural language explanation of the technical analytical output; and outputting, via the graphical user interface, a response to the natural language input that includes the technical analytical output and the natural language explanation of the technical analytical output.

In some embodiments of the computer-implemented system, the large language model is configured to translate the natural language input to a plurality of distinct analytical function calls, each of the plurality of analytical function calls are associated with a function prompt name and a function prompt description, and translating the natural language input to the analytical function call includes: detecting, via the large language model, that a vector value of the function prompt name and a vector value of the function prompt description of the analytical function call of the plurality of distinct analytical function calls has a smallest vector distance to a vector value of the natural language input, and translating the natural language input to the analytical function call based on detecting that the vector value of the function prompt name and the vector value of the function prompt description has the smallest vector distance to the vector value of the natural language input.

In some embodiments, a computer-program product embodied in a non-transitory machine-readable storage medium may store computer instructions that, when executed by one or more processors, perform operations comprising: initializing an analytics digital assistant that is implemented using a large language model that interfaces with an analytics compute service, wherein initializing the analytics digital assistant includes: defining a plurality of distinct resource-forecasting prompts that provides the large language model with instructions for responding to natural language inputs associated with resource forecasting-type analytical tasks, wherein: each distinct resource-forecasting prompt of the plurality of distinct resource-forecasting prompts associates a distinct resource demand forecasting task to a corresponding resource optimization compute function, and each distinct resource-forecasting prompt of the plurality of distinct resource-forecasting prompts includes a set of prompt instructions that specifies one or more parameters required to execute the corresponding resource optimization compute function; receiving, via a graphical user interface associated with the analytics digital assistant, user input that includes a request to execute a resource demand forecasting task; identifying, using the large language model associated with the digital assistant, a resource-forecasting prompt of the plurality of distinct resource-forecasting prompts that corresponds to the target resource demand forecasting task; transmitting, to the analytics compute service associated with the digital assistant, a request to execute a target resource optimization compute function based on the set of prompt instructions and the corresponding resource optimization compute function of the resource forecasting prompt; executing, via the analytics compute service, the target resource optimization compute function based on the analytics compute service receiving the request; and returning, via the graphical user interface of the digital assistant, a response to the user input that includes resource optimization results computed by the analytics compute service for the target resource optimization compute function.

In some embodiments of the computer-program product, the target resource demand forecasting task relates to optimizing a utilization rate of a target physical location, the user input does not include a user-specified utilization rate of the target physical location, the target resource optimization compute function relates to a utilization optimization compute function that requires a utilization parameter value to be set before executing the utilization optimization compute function, and executing the target resource optimization compute function includes executing the utilization optimization compute function with a default utilization parameter value based on the user input excluding the user-specified utilization rate of the target physical location.

In some embodiments of the computer-program product, the resource optimization results include: a first proposed resource transfer that specifies a total number of items to transfer from the target physical location to a second physical location, a second proposed resource transfer that specifies a total number of items to transfer from the second physical location to the target physical location, and an expected utilization rate of the target physical location after the first proposed resource transfer and the second proposed resource transfer are completed.

In some embodiments of the computer-program product, the target resource demand forecasting task relates to optimizing a utilization rate of a target physical location, the user input includes a user-specified utilization rate of the target physical location, the target resource optimization compute function relates to a utilization optimization compute function that requires a utilization parameter value to be set before executing the utilization optimization compute function, the computer-program product further comprises computer instructions for performing operations including: extracting, from the user input, the user-specified utilization rate of the target physical location using the large language model, and executing the target resource optimization compute function includes executing the utilization optimization compute function with the user-specified utilization rate of the target physical location based on the user input having the user-specified utilization rate of the target physical location.

In some embodiments of the computer-program product, the target resource demand forecasting task relates to identifying items for transportation from a primary physical storage site to a secondary physical storage site, the target resource optimization compute function relates to an item transport optimization compute function that determines a set of items to transport from the primary physical storage site to the secondary physical storage site to satisfy a predetermined storage utilization rate of the primary physical storage site, executing the target resource optimization compute function includes executing, using an optimization model, the item transport optimization compute function, wherein an output of the optimization model includes an outbound item transfer list that specifies one or more item identification numbers and respective item quantities to be transported, and returning, via the graphical user interface of the digital assistant, the response to the user input further includes presenting the outbound item transfer list in a tabular format.

In some embodiments of the computer-program product, the target resource demand forecasting task relates to identifying items for transportation from a secondary physical storage site to a primary physical storage site, the target resource optimization compute function relates to an item transport optimization compute function that determines a set of items to transport from the secondary physical storage site to the primary physical storage site to satisfy a predetermined storage utilization rate of the primary physical storage site, executing the target resource optimization compute function includes executing, using an optimization model, the item transport optimization compute function, wherein an output of the optimization model includes an inbound item transfer list that specifies one or more item identification numbers and respective item quantities to be transported, and returning, via the graphical user interface of the digital assistant, the response to the user input further includes presenting the inbound item transfer list in a tabular format.

In some embodiments of the computer-program product, the user input includes a request to simulate a scenario where future demand increases or decreases by a user-specified demand adjustment value, the target resource optimization compute function relates to a resource demand forecasting optimization compute function that requires a demand direction parameter and a demand adjustment parameter, the computer-program product further comprises computer instructions for performing operations including: identifying, using the large language model, the user-specified demand adjustment value and a user-specified demand direction value from the user input, converting, using the large language model, the user-specified demand adjustment value into a standardized format compatible with the resource demand forecasting optimization compute function, and converting, using the large language model, the user-specified demand direction value into a standardized format compatible with the resource demand forecasting optimization compute function; and executing the target resource optimization compute function includes executing, using an optimization model, the resource demand forecasting optimization compute function with (i) the converted user-specified demand direction value as the demand direction parameter and (ii) the converted user-specified demand adjustment value as the demand adjustment parameter.

In some embodiments of the computer-program product, the response to the user input includes: one or more recommended item movement actions based on the scenario simulated, and an expected utilization rate of a target physical location after the one or more recommended item movement actions are completed.

In some embodiments of the computer-program product, the graphical user interface includes a dual-panel interface, including: a first panel configured to display a chatbot-type interface for receiving optimization requests from a user and displaying responses from the digital assistant during a current session, and a second panel configured to display a summary table of optimization scenarios executed during the current session, wherein each distinct row of the summary table represents a distinct optimization scenario executed during the current session.

In some embodiments of the computer-program product, each distinct row of the summary table of optimization scenarios includes: an optimization scenario name or optimization scenario identifier for the distinct optimization scenario, a utilization rate of a target physical storage site before the distinct optimization scenario was executed, a utilization rate of the target physical storage site after the distinct optimization scenario was executed, a total quantity of items to transport from the target physical storage site to a secondary physical storage site as determined by the distinct optimization scenario, and a total quantity of items to transport from the secondary physical storage site to the primary physical storage site as determined by the distinct optimization scenario.

In some embodiments of the computer-program product, returning, via the graphical user interface of the digital assistant, the response to the user input includes: returning a natural language response to the user input in the chatbot-type interface of the first panel of the dual-panel interface, and adding, in real-time or near real-time, a new row to the summary table of optimization scenarios based on the resource optimization results computed by the analytics compute service for the target resource optimization compute function.

In some embodiments of the computer-program product, each of the plurality of distinct resource forecasting prompts are associated with a prompt name and a prompt description, and identifying the resource forecasting prompt of the plurality of distinct resource forecasting prompts that corresponds to the target resource demand forecasting task includes: assessing, via the large language model, the user input against the prompt name and the prompt description of the plurality of distinct resource forecasting prompts, and detecting, via the large language model, that the prompt name and the prompt description of the resource forecasting prompt of the plurality of distinct resource forecasting prompts that corresponds to the target resource demand forecasting task matches the user input with a greater amount of confidence than the prompt name and the prompt description of a remainder of the plurality of distinct resource forecasting prompts.

In some embodiments of the computer-program product, the digital assistant uses a first programmatic interface to interact with the large language model, the digital assistant uses a second programmatic interface to interact with the analytics compute service, and the large language model and the analytics compute service are separate components that the digital assistant uses to generate the response to the user input.

In some embodiments, a computer-implemented method may comprise: initializing an analytics digital assistant that is implemented using a large language model that interfaces with an analytics compute service, wherein initializing the analytics digital assistant includes: defining a plurality of distinct resource-forecasting prompts that provides the large language model with instructions for responding to natural language inputs associated with resource forecasting-type analytical tasks, wherein: each distinct resource-forecasting prompt of the plurality of distinct resource-forecasting prompts associates a distinct resource demand forecasting task to a corresponding resource optimization compute function, and each distinct resource-forecasting prompt of the plurality of distinct resource-forecasting prompts includes a set of prompt instructions that specifies one or more parameters required to execute the corresponding resource optimization compute function; receiving, via a graphical user interface associated with the analytics digital assistant, user input that includes a request to execute a resource demand forecasting task; identifying, using the large language model associated with the digital assistant, a resource-forecasting prompt of the plurality of distinct resource-forecasting prompts that corresponds to the target resource demand forecasting task; transmitting, to the analytics compute service associated with the digital assistant, a request to execute a target resource optimization compute function based on the set of prompt instructions and the corresponding resource optimization compute function of the resource forecasting prompt; executing, via the analytics compute service, the target resource optimization compute function based on the analytics compute service receiving the request; and returning, via the graphical user interface of the digital assistant, a response to the user input that includes resource optimization results computed by the analytics compute service for the target resource optimization compute function.

In some embodiments of the computer-implemented method, the target resource demand forecasting task relates to optimizing a utilization rate of a target physical location, the user input does not include a user-specified utilization rate of the target physical location, the target resource optimization compute function relates to a utilization optimization compute function that requires a utilization parameter value to be set before executing the utilization optimization compute function, and executing the target resource optimization compute function includes executing the utilization optimization compute function with a default utilization parameter value based on the user input excluding the user-specified utilization rate of the target physical location.

In some embodiments of the computer-implemented method, the resource optimization results include: a first proposed resource transfer that specifies a total number of items to transfer from the target physical location to a second physical location, a second proposed resource transfer that specifies a total number of items to transfer from the second physical location to the target physical location, and an expected utilization rate of the target physical location after the first proposed resource transfer and the second proposed resource transfer are completed.

In some embodiments of the computer-implemented method, the target resource demand forecasting task relates to optimizing a utilization rate of a target physical location, the user input includes a user-specified utilization rate of the target physical location, the target resource optimization compute function relates to a utilization optimization compute function that requires a utilization parameter value to be set before executing the utilization optimization compute function, the computer-program product further comprises computer instructions for performing operations including: extracting, from the user input, the user-specified utilization rate of the target physical location using the large language model, and executing the target resource optimization compute function includes executing the utilization optimization compute function with the user-specified utilization rate of the target physical location based on the user input having the user-specified utilization rate of the target physical location.

In some embodiments of the computer-implemented method, the target resource demand forecasting task relates to identifying items for transportation from a primary physical storage site to a secondary physical storage site, the target resource optimization compute function relates to an item transport optimization compute function that determines a set of items to transport from the primary physical storage site to the secondary physical storage site to satisfy a predetermined storage utilization rate of the primary physical storage site, executing the target resource optimization compute function includes executing, using an optimization model, the item transport optimization compute function, wherein an output of the optimization model includes an outbound item transfer list that specifies one or more item identification numbers and respective item quantities to be transported, and returning, via the graphical user interface of the digital assistant, the response to the user input further includes presenting the outbound item transfer list in a tabular format.

In some embodiments of the computer-implemented method, the target resource demand forecasting task relates to identifying items for transportation from a secondary physical storage site to a primary physical storage site, the target resource optimization compute function relates to an item transport optimization compute function that determines a set of items to transport from the secondary physical storage site to the primary physical storage site to satisfy a predetermined storage utilization rate of the primary physical storage site, executing the target resource optimization compute function includes executing, using an optimization model, the item transport optimization compute function, wherein an output of the optimization model includes an inbound item transfer list that specifies one or more item identification numbers and respective item quantities to be transported, and returning, via the graphical user interface of the digital assistant, the response to the user input further includes presenting the inbound item transfer list in a tabular format.

In some embodiments of the computer-implemented method, the user input includes a request to simulate a scenario where future demand increases or decreases by a user-specified demand adjustment value, the target resource optimization compute function relates to a resource demand forecasting optimization compute function that requires a demand direction parameter and a demand adjustment parameter, the computer-program product further comprises computer instructions for performing operations including: identifying, using the large language model, the user-specified demand adjustment value and a user-specified demand direction value from the user input, converting, using the large language model, the user-specified demand adjustment value into a standardized format compatible with the resource demand forecasting optimization compute function, and converting, using the large language model, the user-specified demand direction value into a standardized format compatible with the resource demand forecasting optimization compute function; and executing the target resource optimization compute function includes executing, using an optimization model, the resource demand forecasting optimization compute function with (i) the converted user-specified demand direction value as the demand direction parameter and (ii) the converted user-specified demand adjustment value as the demand adjustment parameter.

In some embodiments of the computer-implemented method, the response to the user input includes: one or more recommended item movement actions based on the scenario simulated, and an expected utilization rate of a target physical location after the one or more recommended item movement actions are completed.

In some embodiments of the computer-implemented method, the graphical user interface includes a dual-panel interface, including: a first panel configured to display a chatbot-type interface for receiving optimization requests from a user and displaying responses from the digital assistant during a current session, and a second panel configured to display a summary table of optimization scenarios executed during the current session, wherein each distinct row of the summary table represents a distinct optimization scenario executed during the current session.

In some embodiments of the computer-implemented method, each distinct row of the summary table of optimization scenarios includes: an optimization scenario name or optimization scenario identifier for the distinct optimization scenario, a utilization rate of a target physical storage site before the distinct optimization scenario was executed, a utilization rate of the target physical storage site after the distinct optimization scenario was executed, a total quantity of items to transport from the target physical storage site to a secondary physical storage site as determined by the distinct optimization scenario, and a total quantity of items to transport from the secondary physical storage site to the primary physical storage site as determined by the distinct optimization scenario.

In some embodiments of the computer-implemented method, returning, via the graphical user interface of the digital assistant, the response to the user input includes: returning a natural language response to the user input in the chatbot-type interface of the first panel of the dual-panel interface, and adding, in real-time or near real-time, a new row to the summary table of optimization scenarios based on the resource optimization results computed by the analytics compute service for the target resource optimization compute function.

In some embodiments of the computer-implemented method, each of the plurality of distinct resource forecasting prompts are associated with a prompt name and a prompt description, and identifying the resource forecasting prompt of the plurality of distinct resource forecasting prompts that corresponds to the target resource demand forecasting task includes: assessing, via the large language model, the user input against the prompt name and the prompt description of the plurality of distinct resource forecasting prompts, and detecting, via the large language model, that the prompt name and the prompt description of the resource forecasting prompt of the plurality of distinct resource forecasting prompts that corresponds to the target resource demand forecasting task matches the user input with a greater amount of confidence than the prompt name and the prompt description of a remainder of the plurality of distinct resource forecasting prompts.

In some embodiments of the computer-implemented method, the digital assistant uses a first programmatic interface to interact with the large language model, the digital assistant uses a second programmatic interface to interact with the analytics compute service, and the large language model and the analytics compute service are separate components that the digital assistant uses to generate the response to the user input.

In some embodiments, a computer-implemented system may comprise: one or more processors; a memory; a computer-readable medium operably coupled to the one or more processors, the computer-readable medium having computer-readable instructions stored thereon that, when executed by the one or more processors, cause a computing device to perform operations comprising: initializing an analytics digital assistant that is implemented using a large language model that interfaces with an analytics compute service, wherein initializing the analytics digital assistant includes: defining a plurality of distinct resource-forecasting prompts that provides the large language model with instructions for responding to natural language inputs associated with resource forecasting-type analytical tasks, wherein: each distinct resource-forecasting prompt of the plurality of distinct resource-forecasting prompts associates a distinct resource demand forecasting task to a corresponding resource optimization compute function, and each distinct resource-forecasting prompt of the plurality of distinct resource-forecasting prompts includes a set of prompt instructions that specifies one or more parameters required to execute the corresponding resource optimization compute function; receiving, via a graphical user interface associated with the analytics digital assistant, user input that includes a request to execute a resource demand forecasting task; identifying, using the large language model associated with the digital assistant, a resource-forecasting prompt of the plurality of distinct resource-forecasting prompts that corresponds to the target resource demand forecasting task; transmitting, to the analytics compute service associated with the digital assistant, a request to execute a target resource optimization compute function based on the set of prompt instructions and the corresponding resource optimization compute function of the resource forecasting prompt; executing, via the analytics compute service, the target resource optimization compute function based on the analytics compute service receiving the request; and returning, via the graphical user interface of the digital assistant, a response to the user input that includes resource optimization results computed by the analytics compute service for the target resource optimization compute function.

In some embodiments of the computer-implemented system, the target resource demand forecasting task relates to optimizing a utilization rate of a target physical location, the user input does not include a user-specified utilization rate of the target physical location, the target resource optimization compute function relates to a utilization optimization compute function that requires a utilization parameter value to be set before executing the utilization optimization compute function, and executing the target resource optimization compute function includes executing the utilization optimization compute function with a default utilization parameter value based on the user input excluding the user-specified utilization rate of the target physical location.

In some embodiments of the computer-implemented system, the resource optimization results include: a first proposed resource transfer that specifies a total number of items to transfer from the target physical location to a second physical location, a second proposed resource transfer that specifies a total number of items to transfer from the second physical location to the target physical location, and an expected utilization rate of the target physical location after the first proposed resource transfer and the second proposed resource transfer are completed.

In some embodiments of the computer-implemented system, the target resource demand forecasting task relates to optimizing a utilization rate of a target physical location, the user input includes a user-specified utilization rate of the target physical location, the target resource optimization compute function relates to a utilization optimization compute function that requires a utilization parameter value to be set before executing the utilization optimization compute function, the computer-program product further comprises computer instructions for performing operations including: extracting, from the user input, the user-specified utilization rate of the target physical location using the large language model, and executing the target resource optimization compute function includes executing the utilization optimization compute function with the user-specified utilization rate of the target physical location based on the user input having the user-specified utilization rate of the target physical location.

In some embodiments, a computer-program product may comprise a non-transitory machine-readable storage medium storing computer instructions that, when executed by one or more processors, perform operations comprising: receiving a natural language input comprising a natural language request for executing an analytical task; processing the natural language input by a language model, wherein the processing includes: translating the natural language input to an analytical function call for calling an analytical function of a plurality of distinct analytical functions of an analytics computing server; and calling the analytical function at the analytics computing server using the analytical function call; receiving a technical analytical output in response to calling the analytical function; and outputting a response to the natural language input that includes the technical analytical output.

In some embodiments of the computer-program product, each analytical function of the plurality of distinct analytical functions maps to a respective set of predefined instructions accessible by the analytics computing server, and wherein calling the analytical function comprises providing an identifier of the analytical function call to the analytics computing server and executing, at the analytics computing server, the set of predefined instructions mapped to the analytical function based at least in part on the identifier of the analytical function call.

In some embodiments of the computer-program product, the computer instructions, when executed by one or more processors, perform additional operations comprising: providing, to the analytics computing server, an indication of user credentials, wherein executing the set of predefined instructions that map to the analytical function comprises accessing one or more of a set of tables, the set of tables based at least in part on the provided indication of user credentials.

In some embodiments of the computer-program product, the computer instructions, when executed by one or more processors, perform additional operations comprising: storing, at a database accessible by the analytics computing server, the set of tables and a second set of tables, the set of tables associated with a first user indicated by the user credentials and the second set of tables associated with a second user distinct from the first user; and blocking access to the second set of tables based at least in part on the provided indication of user credentials.

In some embodiments of the computer-program product, accessing the one or more of the set of tables comprises updating an entry of the one or more of the set of tables.

In some embodiments of the computer-program product, the analytics computing server is configured to control access to entries of the one or more tables such that the language model is restricted from accessing data stored within the one or more tables, thereby securing the one or more tables from unauthorized access via the natural language input provided to the language model.

In some embodiments of the computer-program product, the computer instructions, when executed by one or more processors, may perform additional operations comprising: initializing the language model according to a set of predefined prompts, wherein the language model translates the natural language input to the analytical function call based at least in part on the initializing.

In some embodiments of the computer-program product, the natural language input is received via a graphical user interface (GUI), a command-line interface (CLI), or an application programming interface (API).

In some embodiments of the computer-program product, the response to the natural language input is output via the GUI, the CLI, or the API.

In some embodiments of the computer-program product, the language model is configured to translate the natural language input to a plurality of distinct analytical function calls, each of the plurality of analytical function calls are associated with a function prompt name and a function prompt description, and translating the natural language input to the analytical function call includes: detecting, via the large language model, that a vector value of the function prompt name and a vector value of the function prompt description of the analytical function call of the plurality of distinct analytical function calls has a smallest vector distance to a vector value of the natural language input, and translating the natural language input to the analytical function call based on detecting that the vector value of the function prompt name and the vector value of the function prompt description has the smallest vector distance to the vector value of the natural language input.

In some embodiments of the computer-program product, the graphical user interface that receives the natural language input is in communication with a large language model computing server that executes the large language model; the large language model computing server is in communication with a function call computing server configured with a function call library that includes the analytical function call; the function call computing server is in communication with the analytics computing server configured to execute one or more of the plurality of distinct analytical functions; and the analytics computing server is in communication with a computer database comprising user data and a visual analytics computing server that generates graphical analytic content for the response to the natural language input.

In some embodiments, a computer-implemented method may comprise: receiving a natural language input comprising a natural language request for executing an analytical task; processing the natural language input by a language model, wherein the processing includes: translating the natural language input to an analytical function call for calling an analytical function of a plurality of distinct analytical functions of an analytics computing server; and calling the analytical function at the analytics computing server using the analytical function call; receiving a technical analytical output in response to calling the analytical function; and outputting a response to the natural language input that includes the technical analytical output.

In some embodiments of the computer-implemented method, each analytical function of the plurality of distinct analytical functions maps to a respective set of predefined instructions accessible by the analytics computing server, and wherein calling the analytical function comprises providing an identifier of the analytical function call to the analytics computing server and executing, at the analytics computing server, the set of predefined instructions mapped to the analytical function based at least in part on the identifier of the analytical function call.

In some embodiments, the computer-implemented method further comprises providing, to the analytics computing server, an indication of user credentials, wherein executing the set of predefined instructions that map to the analytical function comprises accessing one or more of a set of tables, the set of tables based at least in part on the provided indication of user credentials.

In some embodiments, the computer-implemented method further comprises: storing, at a database accessible by the analytics computing server, the set of tables and a second set of tables, the set of tables associated with a first user indicated by the user credentials and the second set of tables associated with a second user distinct from the first user; and blocking access to the second set of tables based at least in part on the provided indication of user credentials.

In some embodiments of the computer-implemented method, accessing the one or more of the set of tables comprises updating an entry of the one or more of the set of tables.

In some embodiments of the computer-implemented method, the analytics computing server is configured to control access to entries of the one or more tables such that the language model is restricted from accessing data stored within the one or more tables, thereby securing the one or more tables from unauthorized access via the natural language input provided to the language model.

In some embodiments of the computer-implemented method, the computer-implemented method further comprises initializing the language model according to a set of predefined prompts, wherein the language model translates the natural language input to the analytical function call based at least in part on the initializing.

In some embodiments of the computer-implemented method, the natural language input is received via a graphical user interface (GUI), a command-line interface (CLI), or an application programming interface (API).

In some embodiments of the computer-implemented method, the response to the natural language input is output via the GUI, the CLI, or the API.

In some embodiments of the computer-implemented method, the language model is configured to translate the natural language input to a plurality of distinct analytical function calls, each of the plurality of analytical function calls are associated with a function prompt name and a function prompt description, and translating the natural language input to the analytical function call includes: detecting, via the large language model, that a vector value of the function prompt name and a vector value of the function prompt description of the analytical function call of the plurality of distinct analytical function calls has a smallest vector distance to a vector value of the natural language input, and translating the natural language input to the analytical function call based on detecting that the vector value of the function prompt name and the vector value of the function prompt description has the smallest vector distance to the vector value of the natural language input.

In some embodiments of the computer-implemented method, the graphical user interface that receives the natural language input is in communication with a large language model computing server that executes the large language model; the large language model computing server is in communication with a function call computing server configured with a function call library that includes the analytical function call; the function call computing server is in communication with the analytics computing server configured to execute one or more of the plurality of distinct analytical functions; and the analytics computing server is in communication with a computer database comprising user data and a visual analytics computing server that generates graphical analytic content for the response to the natural language input.

In some embodiments, a computer-implemented system may comprise: one or more processors; a memory; a computer-readable medium operably coupled to the one or more processors, the computer-readable medium having computer-readable instructions stored thereon that, when executed by the one or more processors, cause a computing device to perform operations comprising: receiving a natural language input comprising a natural language request for executing an analytical task; processing the natural language input by a language model, wherein the processing includes: translating the natural language input to an analytical function call for calling an analytical function of a plurality of distinct analytical functions of an analytics computing server; and calling the analytical function at the analytics computing server using the analytical function call; receiving a technical analytical output in response to calling the analytical function; and outputting a response to the natural language input that includes the technical analytical output.

In some embodiments of the computer-implemented system, each analytical function of the plurality of distinct analytical functions maps to a respective set of predefined instructions accessible by the analytics computing server, and wherein calling the analytical function comprises providing an identifier of the analytical function call to the analytics computing server and executing, at the analytics computing server, the set of predefined instructions mapped to the analytical function based at least in part on the identifier of the analytical function call.

In some embodiments of the computer-implemented system, the computer-readable instructions stored thereon, when executed by the one or more processors, cause the computing device to perform additional operations comprising: providing, to the analytics computing server, an indication of user credentials, wherein executing the set of predefined instructions that map to the analytical function comprises accessing one or more of a set of tables, the set of tables based at least in part on the provided indication of user credentials.

In some embodiments of the computer-implemented system, the computer-readable instructions stored thereon, when executed by the one or more processors, cause the computing device to perform additional operations comprising: storing, at a database accessible by the analytics computing server, the set of tables and a second set of tables, the set of tables associated with a first user indicated by the user credentials and the second set of tables associated with a second user distinct from the first user; and blocking access to the second set of tables based at least in part on the provided indication of user credentials.

In some embodiments of the computer-implemented system, accessing the one or more of the set of tables comprises updating an entry of the one or more of the set of tables.

In some embodiments of the computer-implemented system, the analytics computing server is configured to control access to entries of the one or more tables such that the language model is restricted from accessing data stored within the one or more tables, thereby securing the one or more tables from unauthorized access via the natural language input provided to the language model.

In some embodiments of the computer-implemented system, the computer-readable instructions stored thereon, when executed by the one or more processors, cause the computing device to perform additional operations comprising: initializing the language model according to a set of predefined prompts, wherein the language model translates the natural language input to the analytical function call based at least in part on the initializing.

In some embodiments of the computer-implemented system, the natural language input is received via a graphical user interface (GUI), a command-line interface (CLI), or an application programming interface (API).

BRIEF DESCRIPTION OF THE FIGURES

FIG. 20 through 26 illustrate examples of graphical user interface views for secure execution of an analytical task using natural language.

DESCRIPTION OF THE PREFERRED EMBODIMENTS

Figure 1:
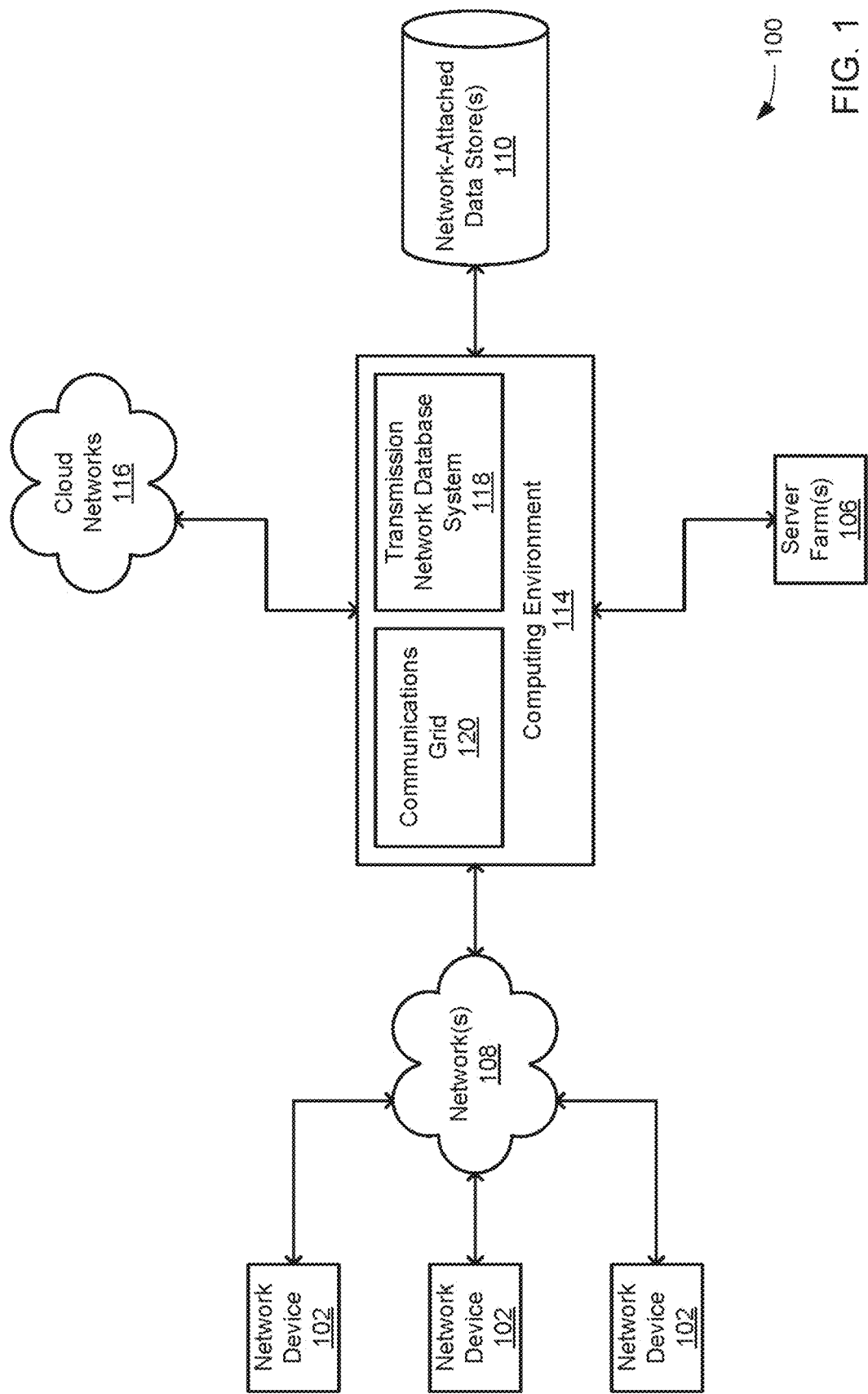
FIG. 1 illustrates a block diagram that provides an illustration of the hardware components of a computing system, according to some embodiments of the present technology.

The systems and methods described herein introduce a novel approach to securely executing analytical tasks using natural language, improving the accessibility and usability of analytics platforms for users unfamiliar with technical formats and syntax.

As described in more detail herein, the systems, methods, and embodiments offer advancements over conventional interfaces for executing analytical functions. Traditional systems typically require users to interact with specialized interfaces using structured formats, which may be unintuitive and inaccessible for non-technical users. A key technical feature described herein contributing to the inventive step may include the integration of a language model capable of interpreting natural language inputs, enabling users to submit requests in conversational language. This approach simplifies user interactions with analytical software, allowing individuals without specialized expertise to access advanced analytics functions. By eliminating the need for structured input formats, the system enhances usability and accessibility.

Additionally, as described in more detail herein, the techniques described herein address security challenges posed by existing systems that allow language models to directly interact with sensitive data. Traditional approaches risk data exposure if a language model misinterprets a user request or processes a malicious request from an unauthorized user. The described techniques mitigate these risks through a layered architecture. As described herein, the language model may interpret user intent and may map it to the appropriate analytical function without directly accessing the target database. Instead, a separate server may independently manage data access, verifying user authorization before delivering any sensitive results. This separation between the language model and the data-handling server may strengthen data security, may reduce the likelihood of unintended data exposure, and may ensure compliance with stringent data protection protocols.

Additionally, the systems, methods, and embodiments described herein may mitigate a risk of a language model producing unreliable outputs (e.g., hallucinations) when requested by a user to perform an analytical task. For instance, analytical tasks may be delegated to a deterministic system separate from the language model and the language model may be responsible for selecting a predefined analytical function (e.g., rather than performing the requested analytical function) that is then performed at the deterministic system. This integration of a probabilistic language model with a stable analytical framework may provide a more robust reliability, thus reinforcing operational security and trust in the associated automated process.

Additionally, the systems, methods, and embodiments described herein may support role-based access configurations, ensuring that users only interact with functions and data aligned with their responsibilities. For instance, the system responsible for executing analytical functions may be configured to receive credentials from a user attempting to execute an analytical function on a particular set of data to ensure that the user has the correct access permissions. By tailoring access permissions at a granular level, the system prevents users from executing functions or accessing data outside their operational scope. This technique provides a secure mechanism for managing user interactions within the system and may generally provide enhanced data security and operational compliance over systems that offer broad or unrestricted access.

The following description of the preferred embodiments of the inventions are not intended to limit the inventions to these preferred embodiments, but rather to enable any person skilled in the art to make and use these inventions.

Example Systems

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
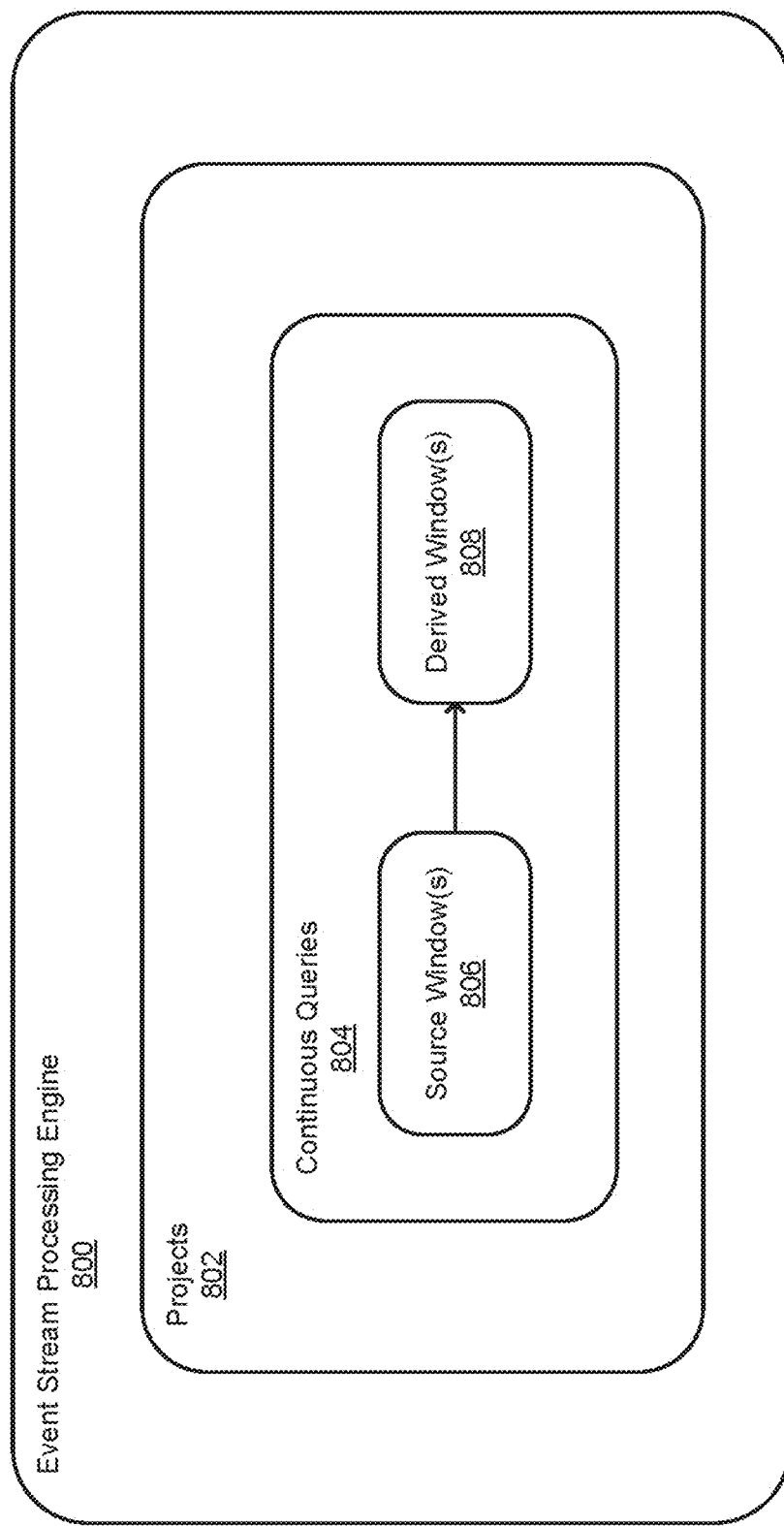
FIG. 8 illustrates a block diagram including components of an Event Stream Processing Engine (ESPE), according to some embodiments of the present technology.
Figure 9:
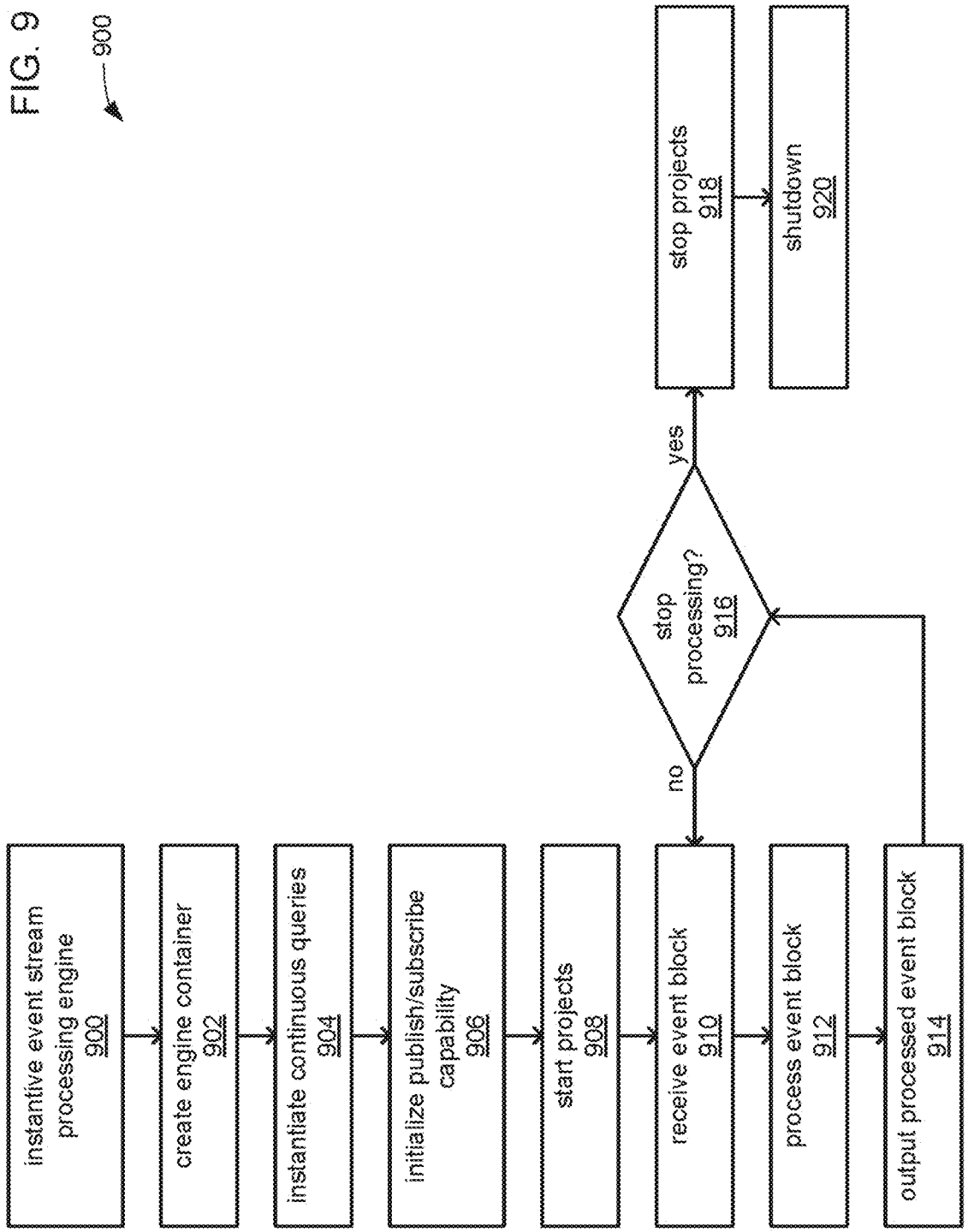
FIG. 9 illustrates a flow chart showing an example process including operations performed by an event stream processing engine, according to some embodiments of the present technology.
Figure 10:
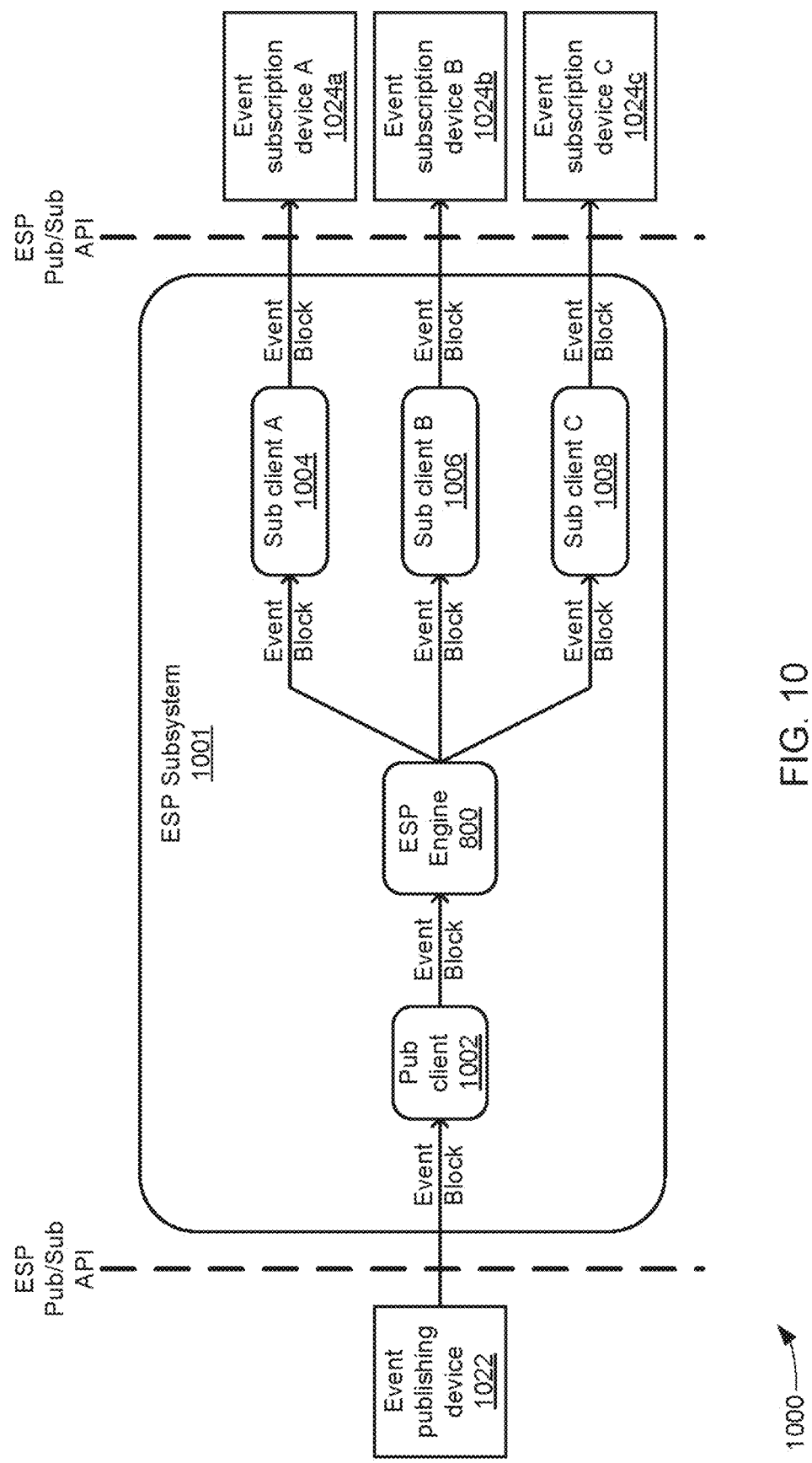
FIG. 10 illustrates an ESP system interfacing between a publishing device and multiple event subscribing devices, according to some embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® LOW Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
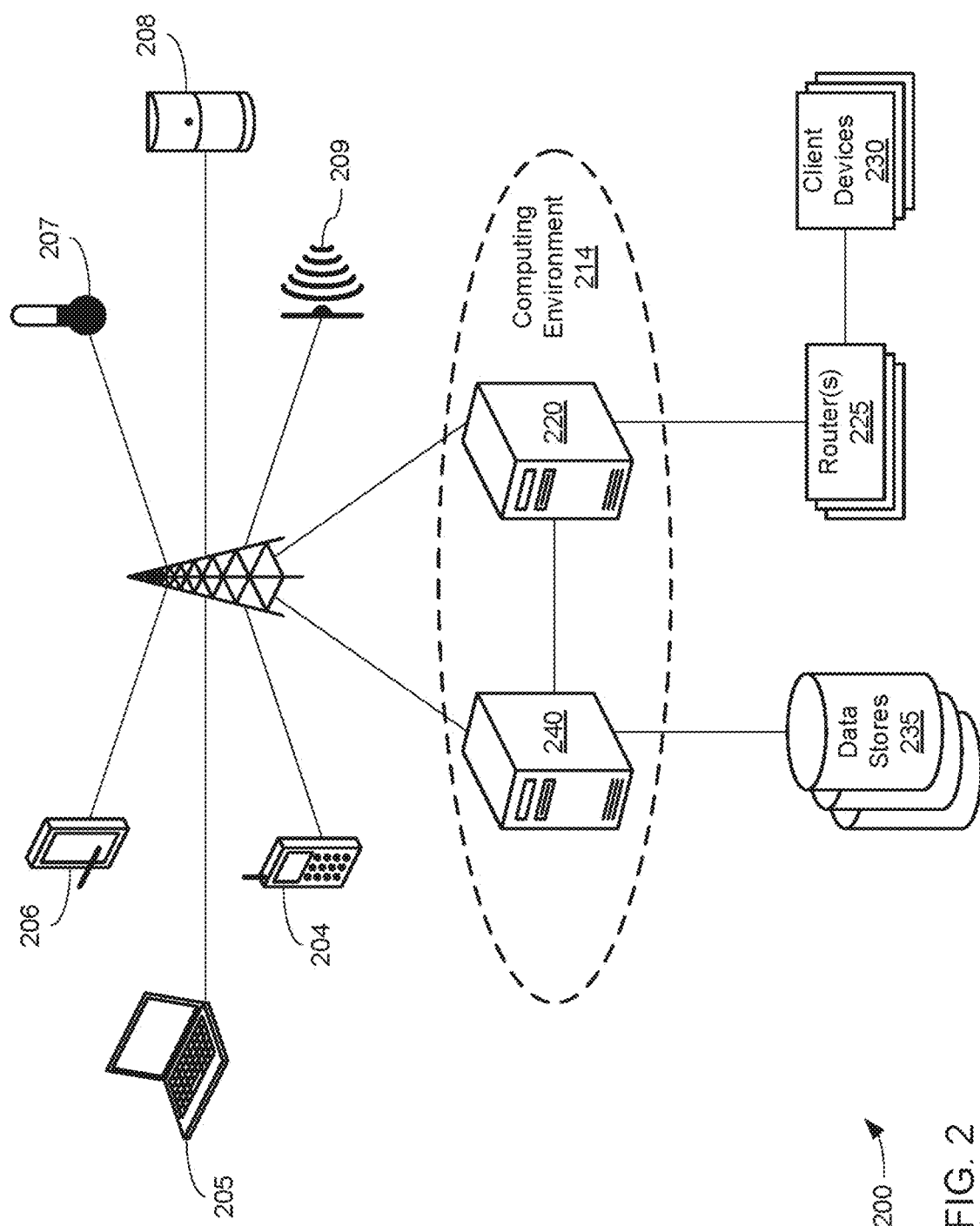
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
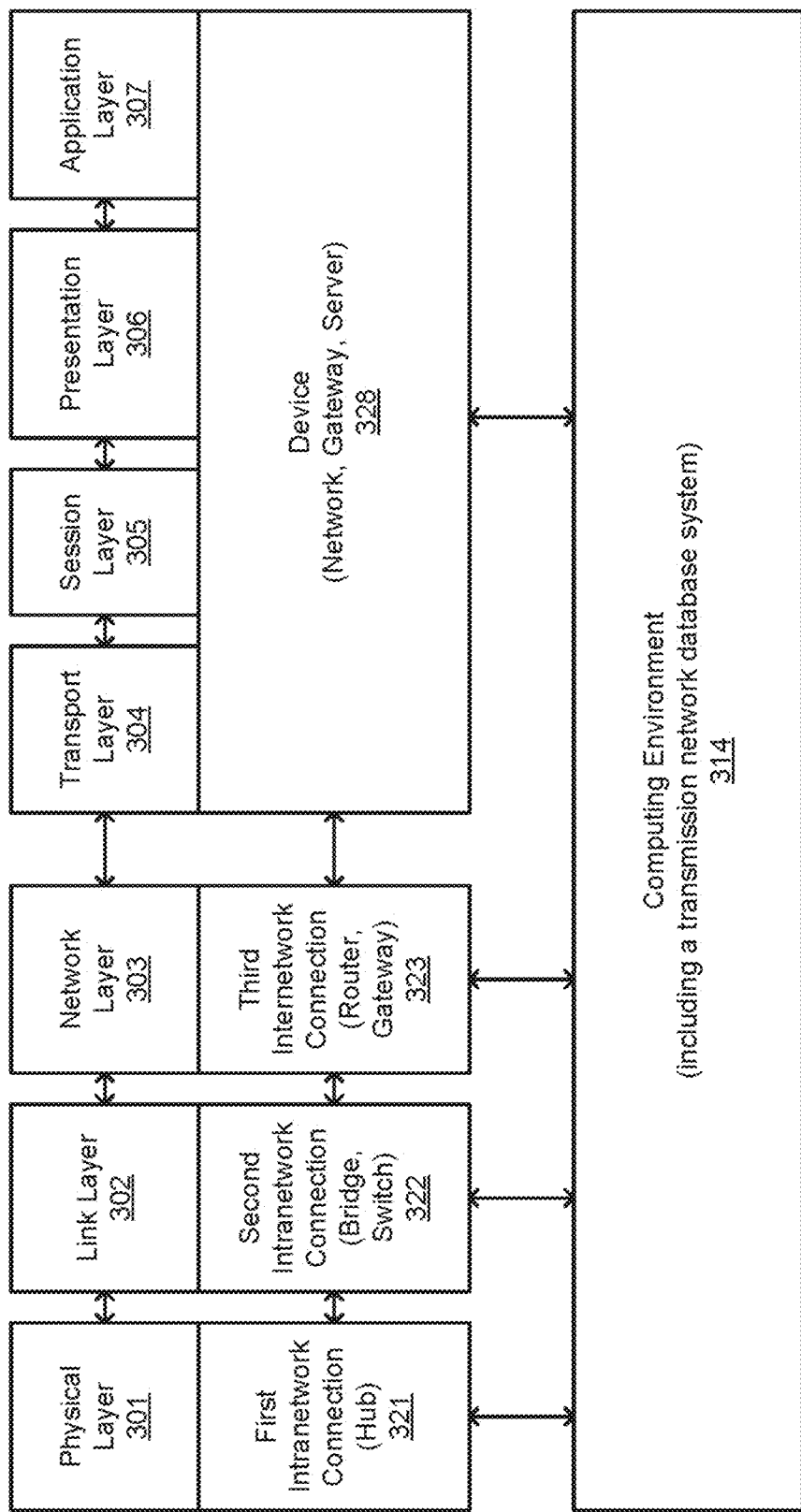
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 301. Physical layer 301 represents physical communication and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network.

In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
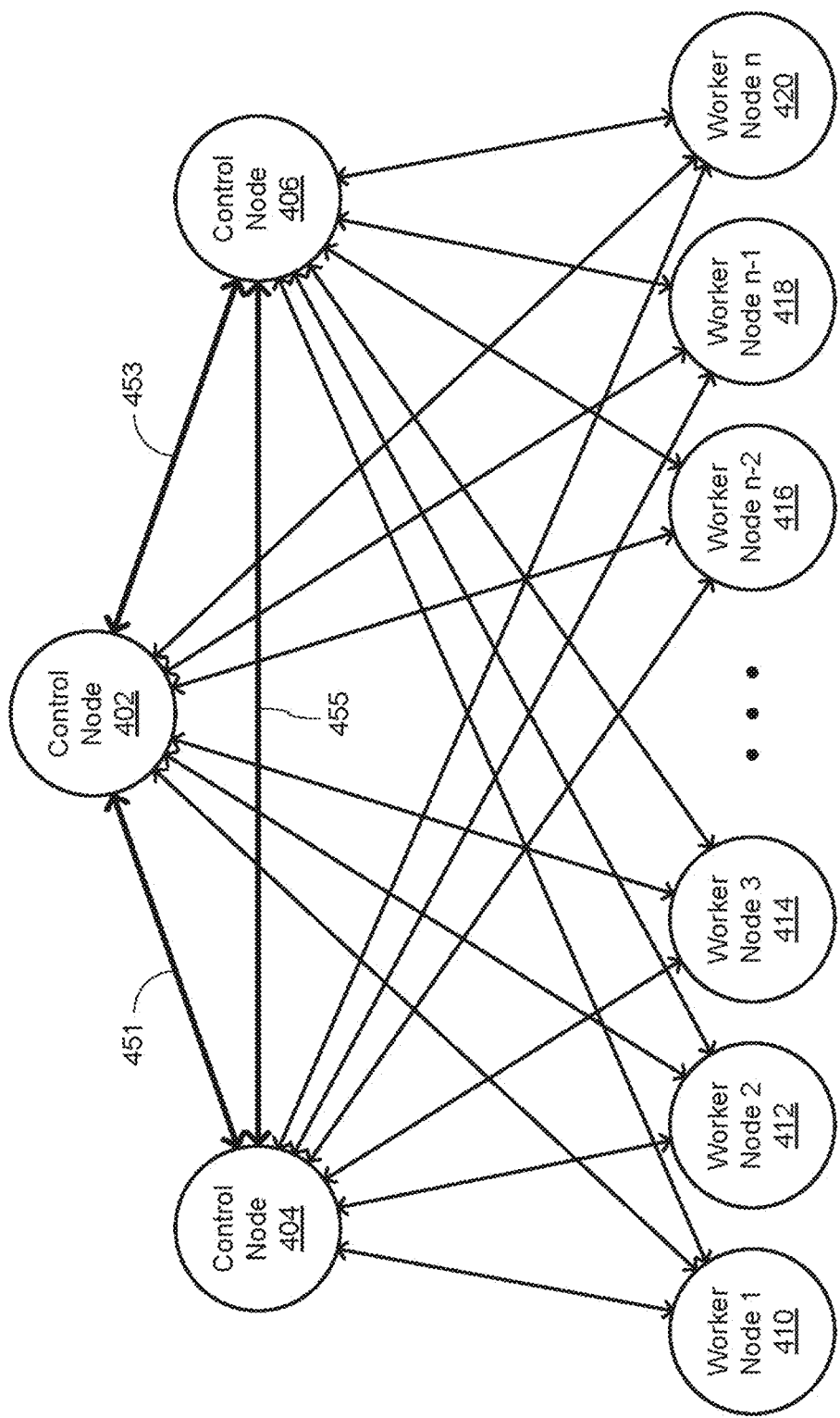
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recently saved checkpoint of their status and re-start the project from that checkpoint to minimize lost progress on the project being executed.

Figure 5:
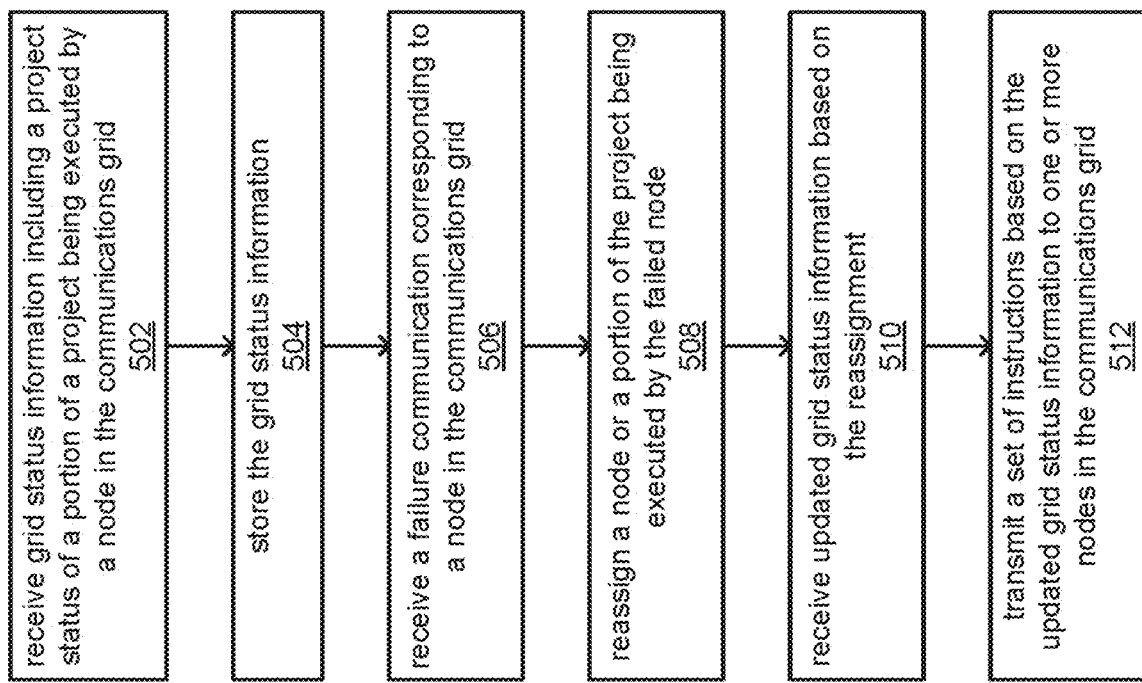
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
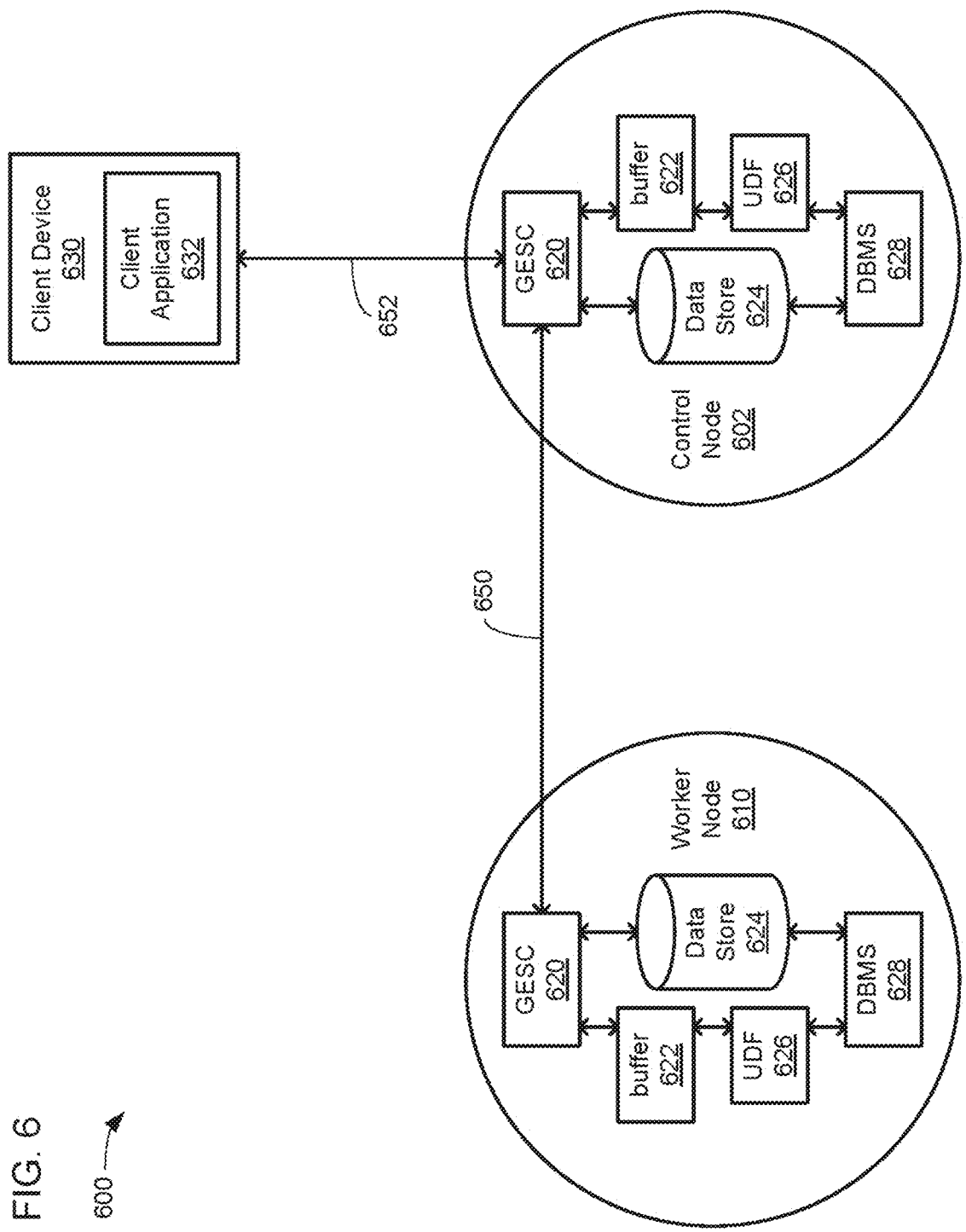
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
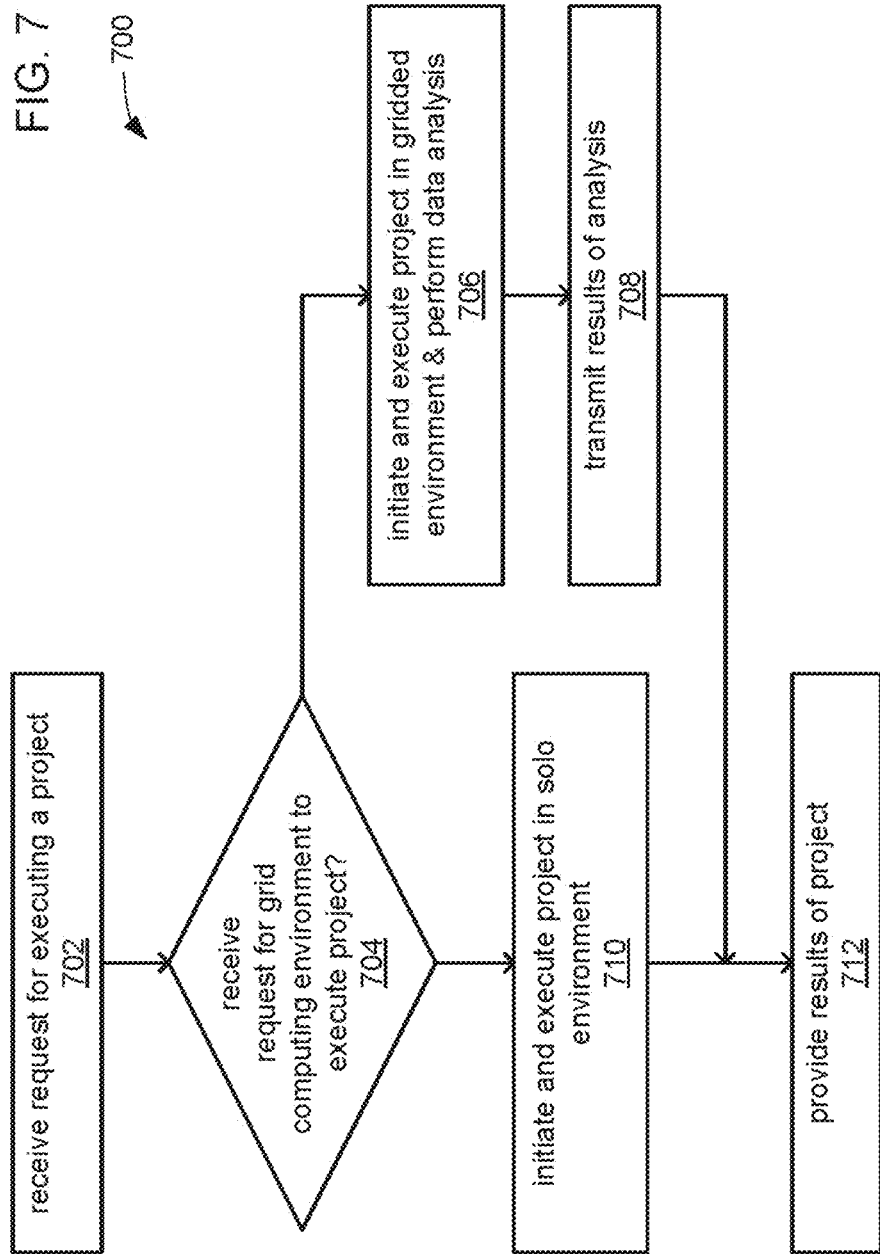
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. A client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
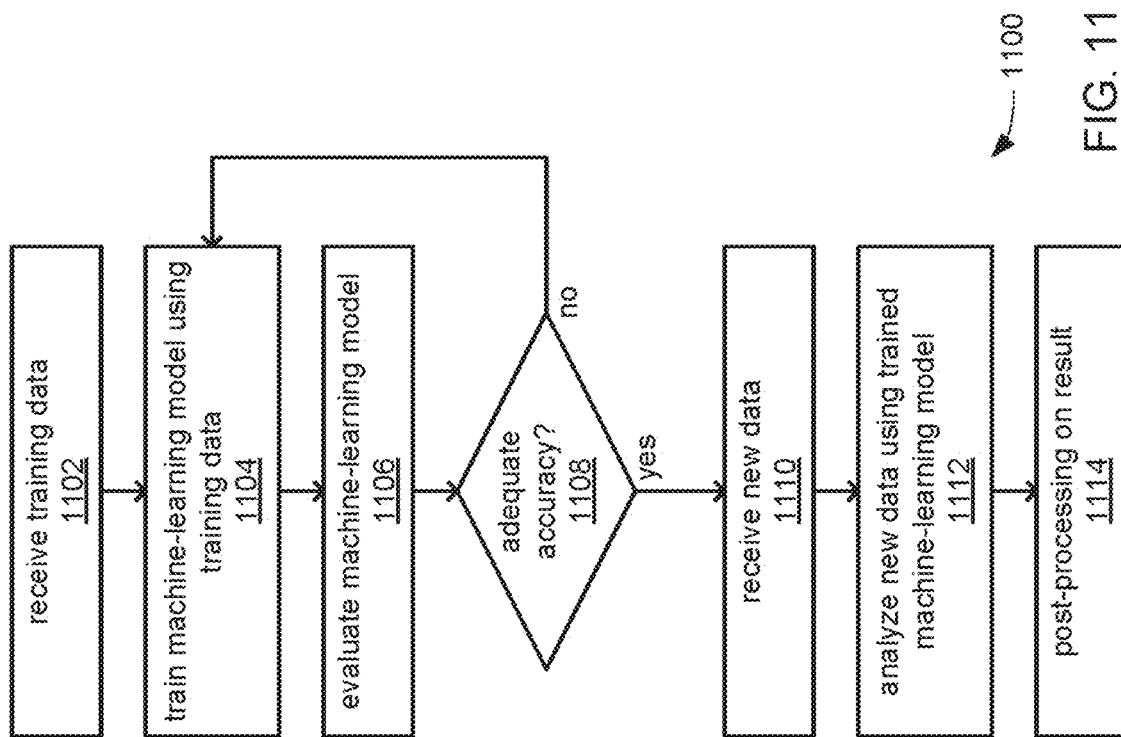
FIG. 11 illustrates a flow chart of an example of a process for generating and using a machine-learning model according to some aspects, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
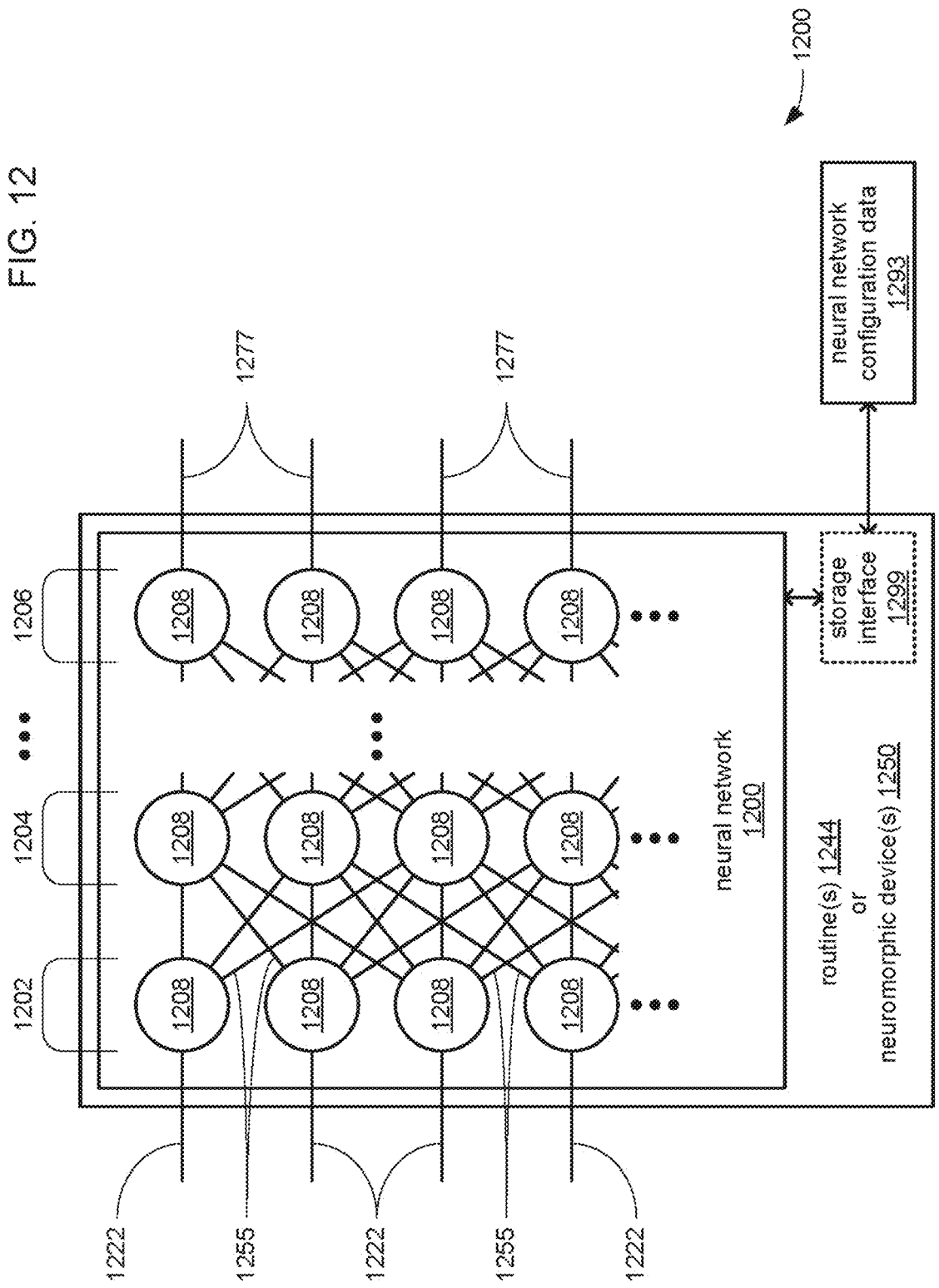
FIG. 12 illustrates an example of a machine-learning model as a neural network, according to some embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
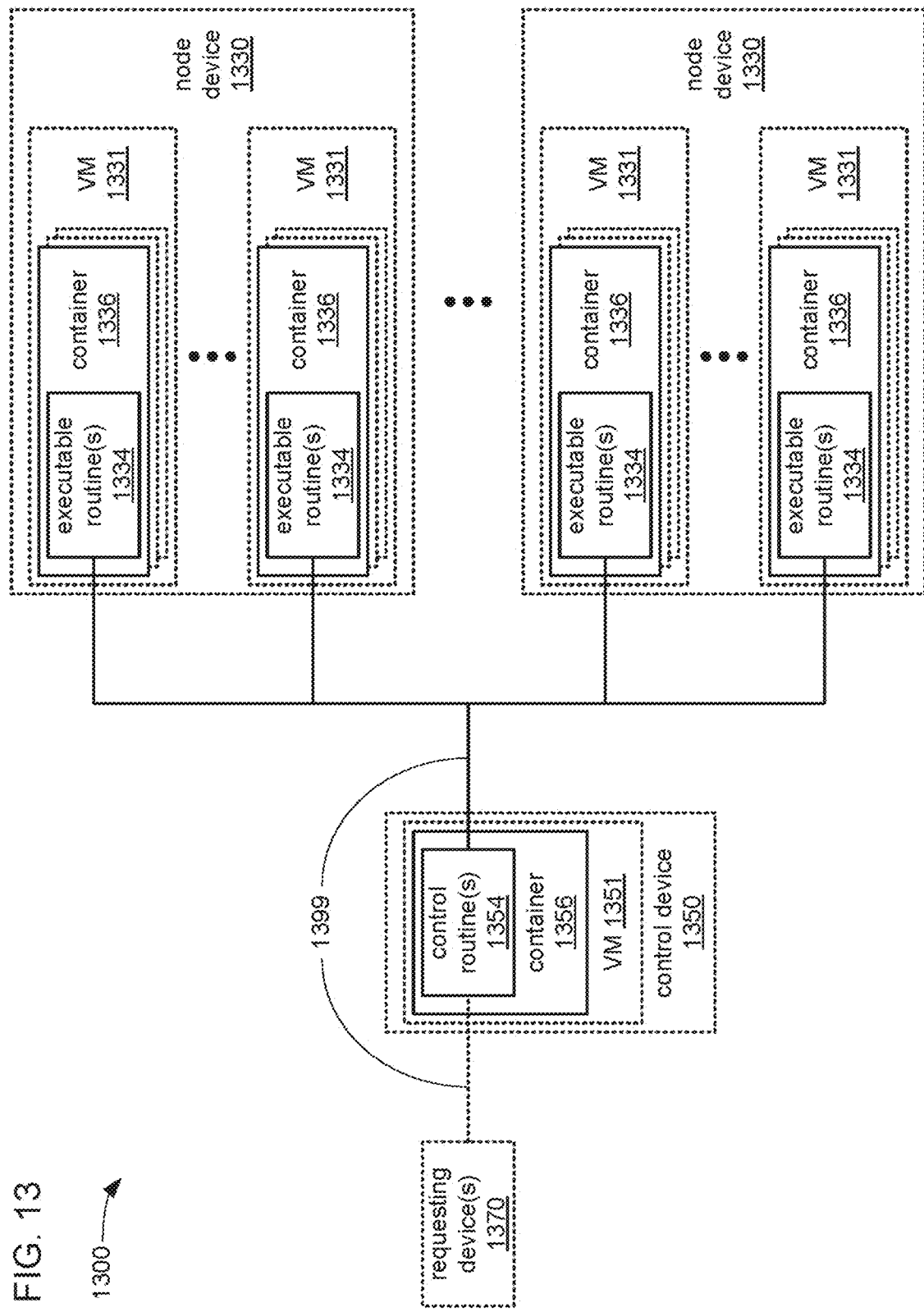
FIG. 13 illustrates various aspects of the use of containers as a mechanism to allocate processing, storage and/or other resources of a processing system to the performance of various analyses, according to some embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

Figure 14:
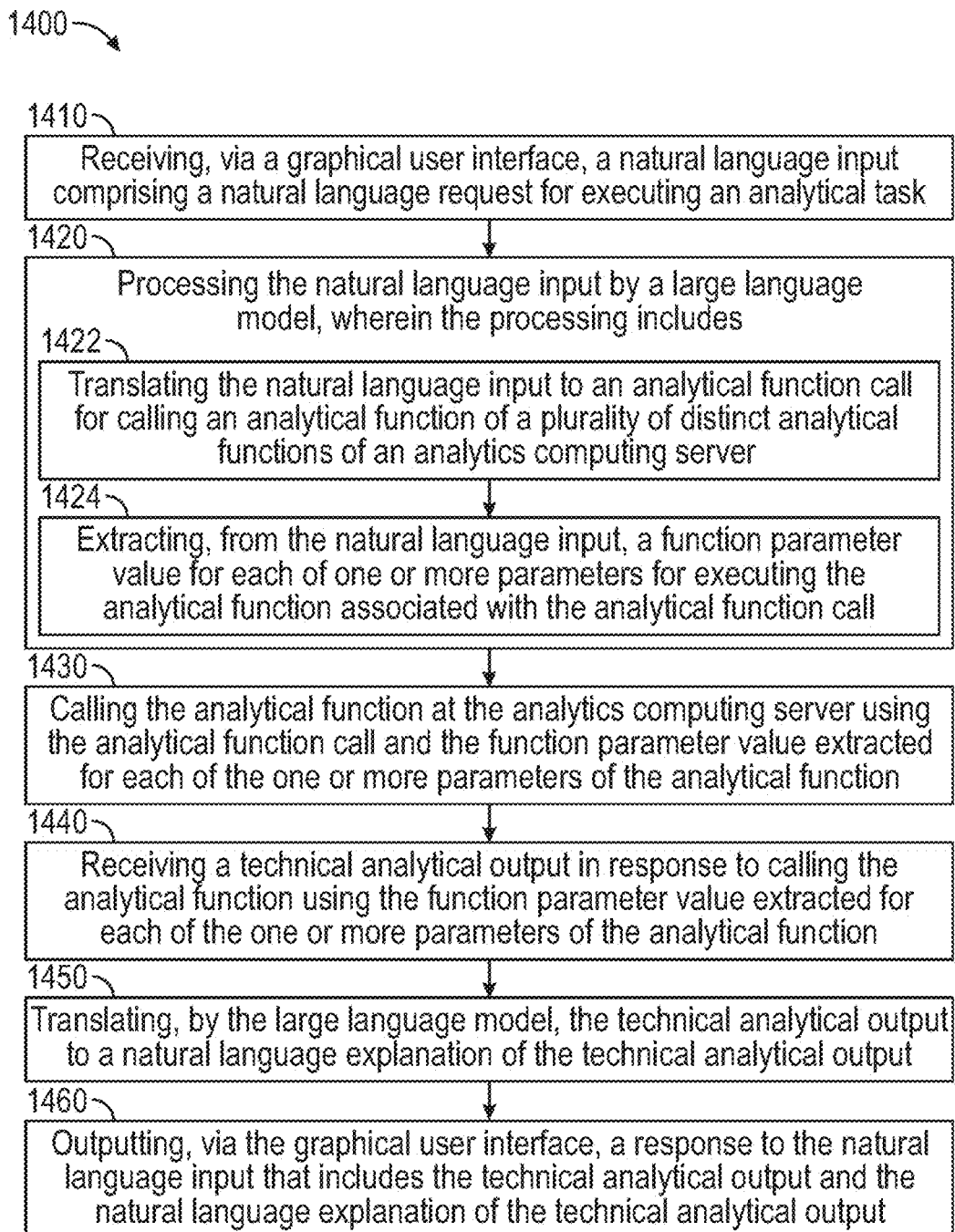
FIGS. 14 and 14A illustrate examples of methods for secure execution of an analytical task using natural language, according to some embodiments of the present technology.

FIG. 14 illustrates one embodiment of method 1400 for securely executing analytical tasks using natural language. It shall be appreciated that other embodiments contemplated within the scope of the present disclosure may involve more processes, fewer processes, different processes, or a different order of processes than illustrated in FIG. 14. It should be noted that a computer-program product may include a non-transitory machine-readable storage medium storing computer instructions that, when executed by one or more operations, may perform operations corresponding to the processes and sub-processes of method 1400. Additionally, or alternatively, a computer-implemented method may include operations corresponding to processes and sub-processes of 1400. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 1400.

One of ordinary skill in the art will appreciate that method 1400 may provide many technical advantages and practical applications over conventional design of interfaces for executing analytical functions. Traditional systems often rely on specialized interfaces requiring users to submit requests in structured formats, which may not be intuitive or accessible for those unfamiliar with these formats. The techniques presented here integrate a language model that interprets natural language inputs, allowing users to make requests in conversational language. This approach streamlines user interactions with analytical software, making it easier for users to access advanced analytics functions without needing specialized knowledge.

Additionally, existing systems may allow language models to directly interact with sensitive data, posing potential security risks. For instance, sensitive data might inadvertently be exposed if the language model misinterprets a request or if it receives a malicious request from an unauthorized user. The techniques described here mitigate this risk by using a layered architecture: the language model interprets the user's intent and maps it to an analytical function, without directly accessing the target database. Although the language model can request data access through a server, the server independently manages data access, verifying the user's authorization before providing any results that may contain sensitive information. This separation between the language model and the data-handling server bolsters data security, reduces the chances of data exposure, and maintains compliance with data sensitivity protocols.

As shown in FIG. 14, process 1410 of method 1400 may receive, via a graphical user interface (GUI), a natural language input including a natural language request for executing an analytical task. In a non-limiting example, FIG. 15A may depict an example of a user interface receiving a natural language input. For instance, conversational user interface 1503 may receive a natural language input 1502. The natural language input 1502 may include a natural language request for executing an analytical task as described herein.

A natural language input may refer to a user-provided input expressed in a human language. The natural language input may be unstructured and may, in some examples, not follow formal syntax rules of programming languages or command-line interfaces. A natural language request may be a command provided in the form of a natural language input, where the command may indicate a specific intent or action to be performed. For instance, the natural language request may be a command to perform a particular analytical task. An analytical task may refer to a computational process or operation that involves the systematic analysis of data. Such tasks may include performing functions such as optimization, data querying, statistical analysis, forecasting, or modeling and may use algorithmic or mathematical techniques to convert data into insights.

A GUI, as described herein, may refer to a user interface that enables user interaction through graphical user interface elements. In the present disclosure, these graphical user interface elements may include a first user interface input element (e.g., an input field) into which a user may type, paste, or otherwise insert the natural language input. Additionally, in some examples, the graphical user interface elements may include a user interface control element (e.g., a submit button) which enables the user to provide the natural language input to process 1410. Alternatively, the natural language input may be automatically provided to the process 1410 upon being input into the first user interface input element. Upon the user providing the natural language input to process 1410, the GUI may display a receipt of the natural language input (e.g., a copy of the text of the natural language input) in a UI display element. In some examples, the receipt of the natural language input may be displayed in a chat box. It should be noted that other types of user interfaces (e.g., a command line interface, an application programming interface) may be used to receive the natural language input without deviating from the scope of the present disclosure.

Figure 15A:
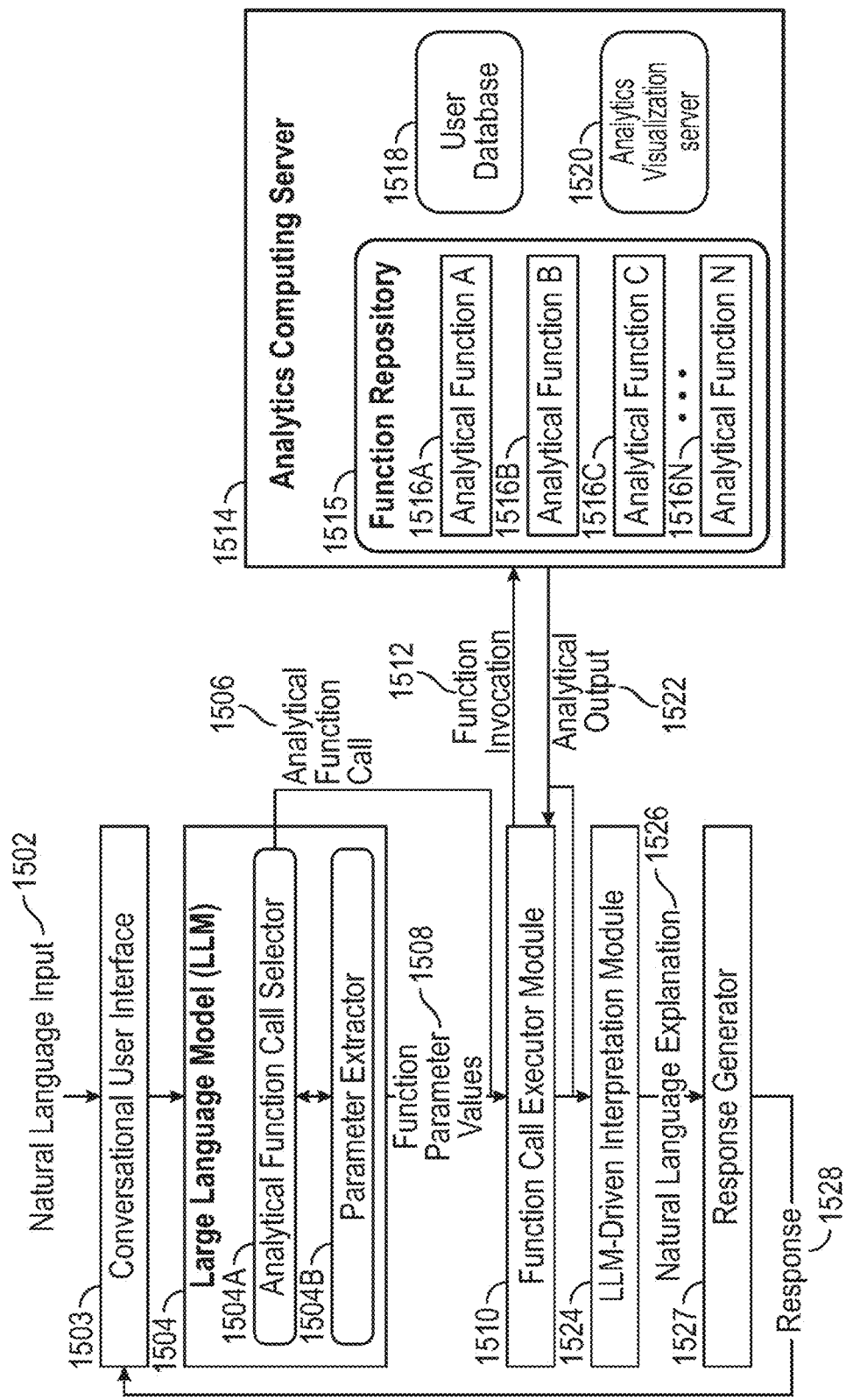
FIG. 15A illustrates an example of a system for secure execution of an analytical task using natural language, according to some embodiments of the present technology.
Figure 15B:
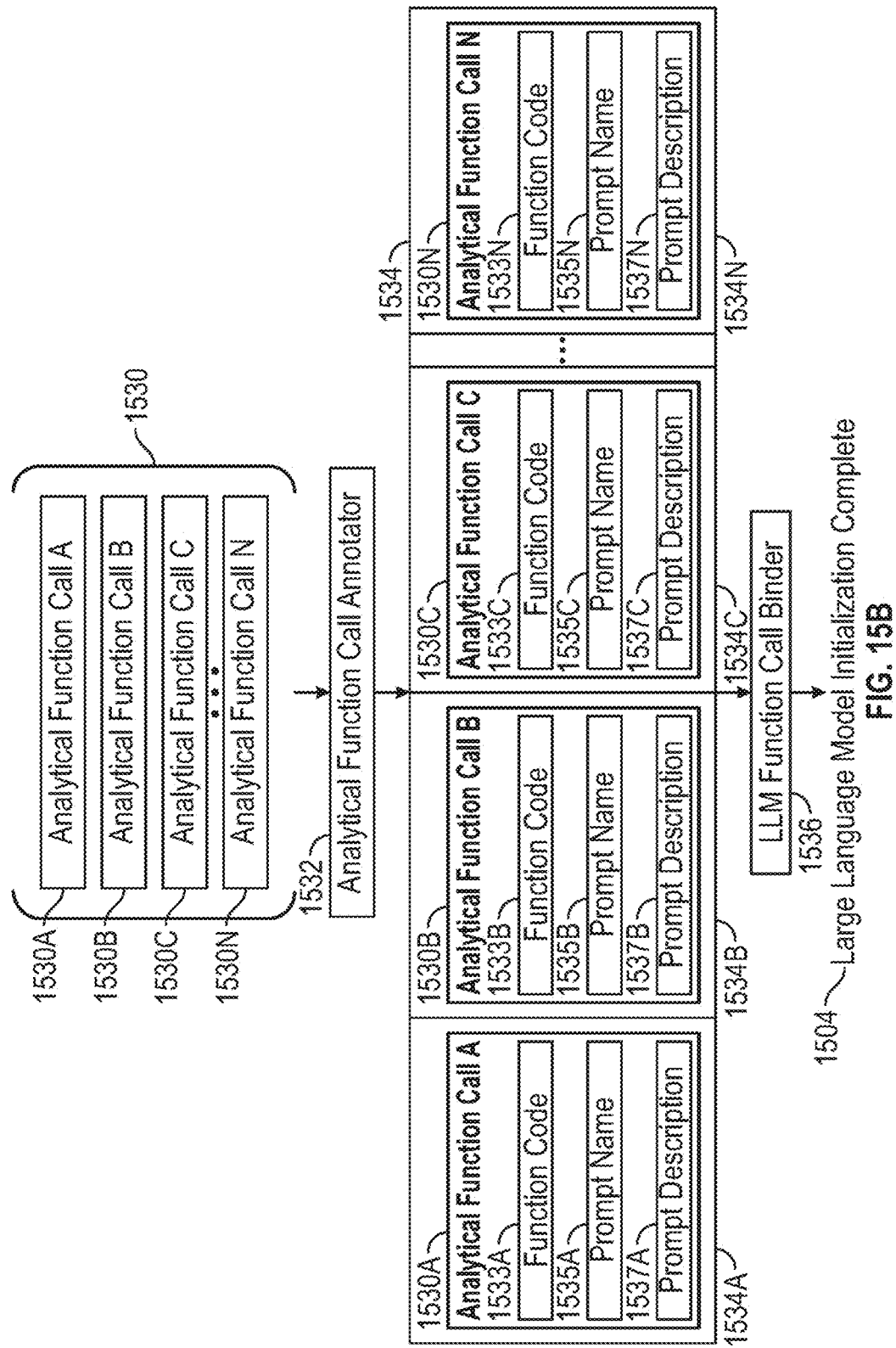
FIG. 15B illustrates an example of an analytical function call initialization procedure for secure execution of an analytical task using natural language, according to some embodiments of the present technology.
Figure 15C:
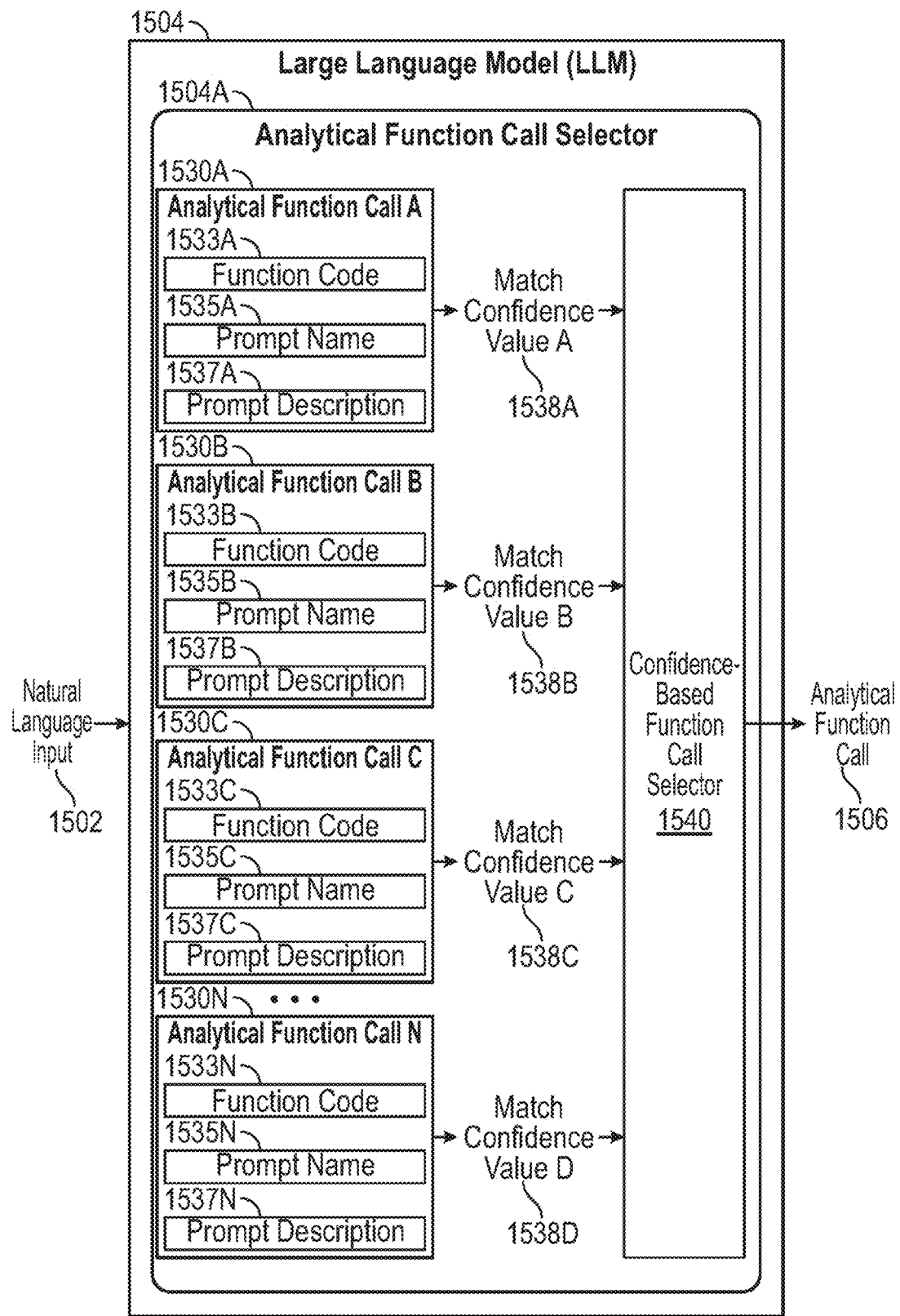
FIG. 15C illustrates an example of an analytical function call selection procedure for secure execution of an analytical task using natural language, according to some embodiments of the present technology.
Figure 15D:
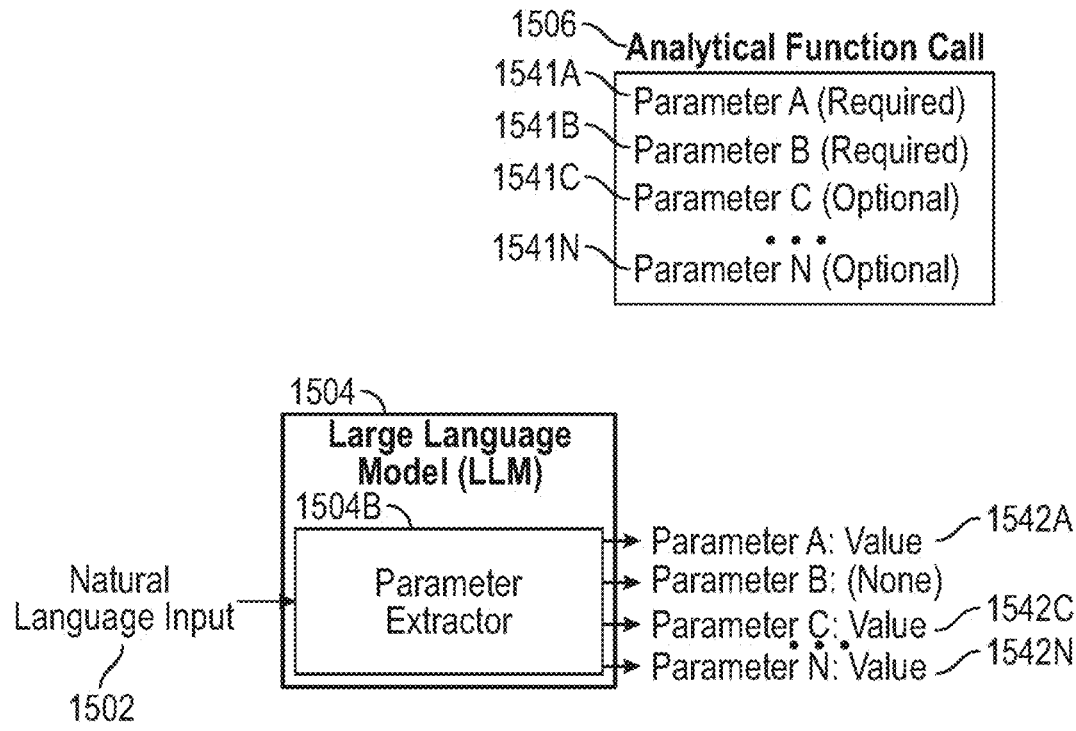
FIG. 15D illustrates an example of a parameter extraction procedure for secure execution of an analytical task using natural language, according to some embodiments of the present technology.
Figure 15E:
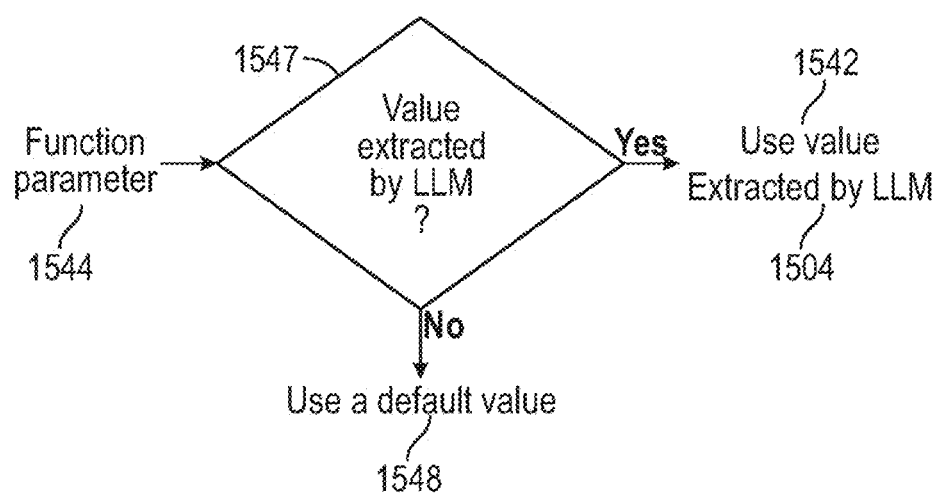
FIG. 15E illustrates an example of a default parameter decision procedure for secure execution of an analytical task using natural language, according to some embodiments of the present technology.
Figure 15F:
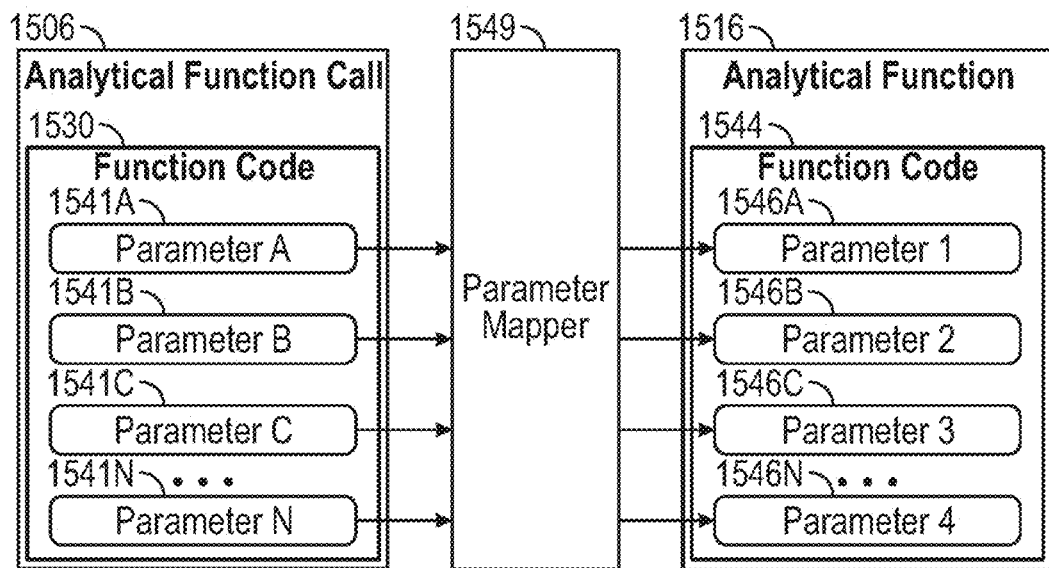
FIG. 15F illustrates an example of a parameter mapping procedure for secure execution of an analytical task using natural language, according to some embodiments of the present technology.
Figure 15G:
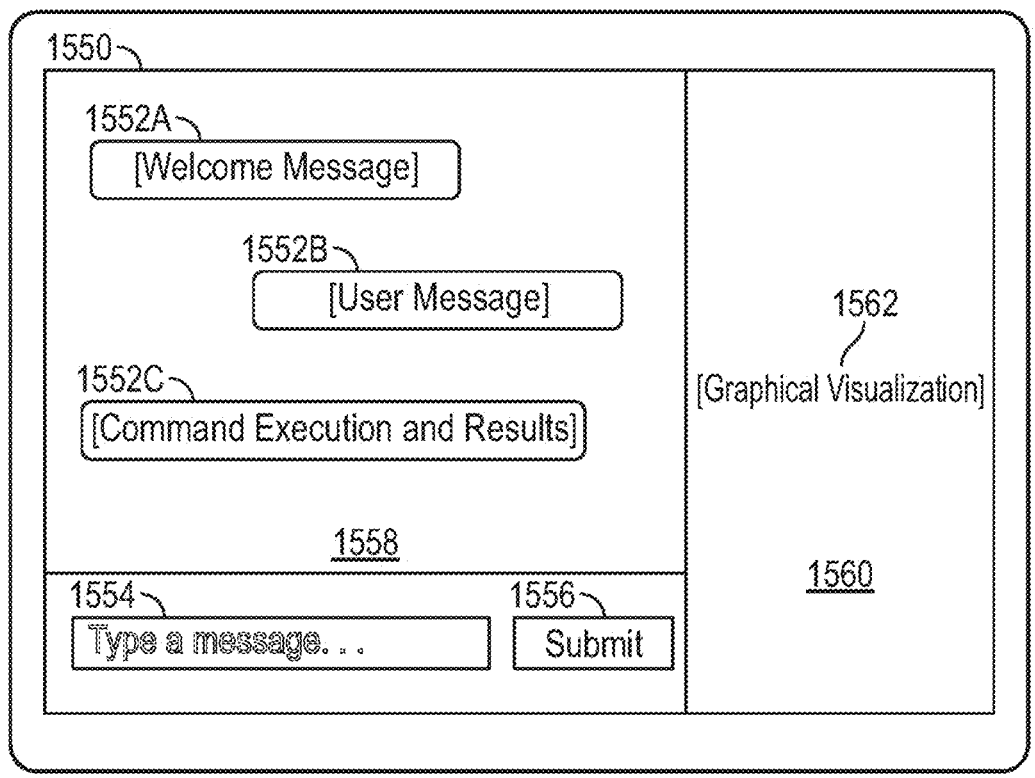
FIG. 15G illustrates an example of a graphical user interface view for secure execution of an analytical task using natural language, according to some embodiments of the present technology.

In a non-limiting example, FIG. 15G may depict an example of a GUI configured to receive a natural language input. For instance, a user may load the GUI, which may include a chat box element 1550. The chat box element 1550 may include a user interface input element 1554 (e.g., an input field), a user interface control element 1556 (e.g., a submit button), and a user interface display element 1558 (e.g., a chat box display). When the user loads the GUI, the user interface display element may display a first message 1552A (e.g., a welcome message). The first message 1552A may be provided by a system that provides the GUI to the user or may be provided by a separate system.

After receiving the first message 1552A, the user may type, paste, or otherwise insert a natural language input into user interface input element 1554 (e.g., a textual input field) and may click, select, or otherwise trigger the user interface control element 1556. Upon triggering the user interface control element 1556, the natural language input may be provided to an LLM as described herein (e.g., with regards to process 1420). Additionally, the user interface display element 1552A may display a receipt message 1552B corresponding to the natural language input (e.g., may display a copy of the natural language input provided to user interface input element 1554).

As shown in FIG. 14, process 1420 of method 1400 may process the natural language input by a large language model (LLM), where a language model may be a machine learning model designed to process and generate human language. An LLM may be a language model that is trained on a large corpus of training data and/or has many training parameters. In some examples, the graphical user interface that receives the natural language input is in communication with an LLM computing server that executes the LLM. Accordingly, the graphical user interface may provide the natural language input to the LLM computing server, where the natural language input may be processed by the LLM. It should be noted, without deviating from the scope of the disclosure, that the natural language input may be processed by another language model, such as a small language model.

In a non-limiting example, FIG. 15A may depict an example of processing the natural language input by the LLM. For instance, conversational user interface 1503 may provide the natural language input 1502 to LLM 1504 and LLM 1504 may process the natural language input.

In some examples, process 1420 of method 1400 may initialize the LLM with a respective analytical function call of a set of analytical function calls. An analytical function call may be defined as a command provided to an analytics computing system (e.g., by the LLM) that triggers the execution of a particular analytical function at the analytics computing system. In the present example, each analytical function call may correspond to a respective analytical function called to perform a respective analytical task.

Alternatively, multiple analytical functions may be called to perform a particular analytical task.

Initializing the LLM may include assigning a function prompt name to the respective analytical function call and assigning a function prompt description to the respective analytical function call. The function prompt name may be an example of or otherwise act as an identifier for a particular analytical function call and may be used to enable a software system (e.g., an analytics computing server) to locate an analytical function for execution. For instance, the function prompt name assigned to the respective analytical function call may specify a role of the respective analytical function call, where the role of the respective analytical function call in the function prompt name may be specified using a first amount of text. The function prompt description may provide supporting information for the analytical function call, such as expected parameters, an output of the analytical function call, or a role performed by the function. For instance, the function prompt description assigned to the respective analytical function call may include instructions that define one or more parameters of the respective analytical function call and define a return format of the respective analytical function. Additionally, the function prompt description assigned to the respective analytical function call may further include instructions that define the role of the respective analytical function call with a second amount of text greater than the first amount of text for the function prompt name.

Initializing the LLM may further include adding, to an extensible data structure, an entry corresponding to the respective analytical function call and providing the extensible data structure to the LLM. An extensible data structure may be a data structure whose size can be adjusted (e.g., expanded) dynamically and an entry may refer to a data value within the data structure. The entry may include the respective analytical function call, the function prompt name assigned to the respective analytical function call, and the function prompt description assigned to the respective analytical function call.

In some examples, the set of analytical function calls may be included in a function call library of a function call computing server in communication with the LLM computing server. In such examples, the function call computing server may provide the extensible data structure to the LLM. It should be noted that there may be examples where the data structure may have a static size once each analytical function call is added to the data structure (e.g., the data structure may be non-extensible). Additionally, the function call computing server may be in communication with the analytics computing server. For instance, the analytics computing server may provide to the function call computing server, an indication of the analytical functions for which to include an analytical function call in the function call library. It should be noted that there may be examples in which the graphical user interface is hosted at (e.g., executed by, located at) a separate server from the LLM computing server, the function call computing server, or the analytics computing server.

In some examples, initializing the LLM with the respective analytical function call and a second respective analytical function call of the set of analytical function calls further includes assigning a function prompt name to the second respective analytical function call and assigning a function prompt description to the second respective analytical function call. Additionally, initializing the LLM with the respective analytical function call and the second respective analytical function call may include adding, to the extensible data structure, a second entry corresponding to the second respective analytical function call, where the second entry includes the second respective analytical function call, the function prompt name assigned to the second respective analytical function call, and the function prompt description assigned to the second respective analytical function call.

In a non-limiting example, FIG. 15B may depict an example of initializing an LLM with analytical function calls. For instance, a function call computing server may initially have an analytical function call set 1530 (e.g., a set of analytical function calls) that may include N analytical function calls (e.g., analytical function call 1530A, analytical function call 1530B, analytical function call 1530C, and analytical function call 1530N), where N may be an integer greater than or equal to 2.

An analytical function call annotator 1532 may assign function codes, prompt names, and prompt descriptions to each analytical function call of the N analytical function calls and may add the N analytical function calls to an extensible data structure 1534. For instance, analytical function call annotator 1532 may assign function code 1533A, prompt name 1535A (e.g., a function prompt name), and prompt description 1537A (e.g., a function prompt description) to analytical function call 1530A; may assign function code 1533B, prompt name 1535B, and prompt description 1537B to analytical function call 1530B; may assign function code 1533C, prompt name 1535C, and prompt description 1537C to analytical function call 1530C; and may assign function code 1533N, prompt name 1535N, and prompt description 1537N to analytical function call 1530N. In some examples, function code 1533A, 1533B, 1533C, and 1533N may correspond to logic or instructions defining how the analytical functions associated with each respective analytical function call operate. Analytical function call annotator 1532 may add analytical function call 1530A as a first entry 1534A of extensible data structure 1534, analytical function call 1530B as a second entry 1534B of extensible data structure 1534, analytical function call 1530C as a third entry 1534C of extensible data structure 1534, and analytical function call 1530N as a fourth entry 1534N of extensible data structure 1534.

Analytical function call annotator 1532 may provide the extensible data structure 1534 to LLM function call binder 1536. LLM function call binder 1536 may be configured to take parameters extracted from a natural language input and to bind them to respective fields for an analytical function call within extensible data structure 1534. Upon LLM function call binder 1536 receiving the extensible data structure 1534, initialization may be complete.

In some examples, the LLM may be fine-tuned to classify the natural language input to the analytical function call and a set of additional analytical function calls, which may include providing the LLM with an extensible data structure including a set of function call entries corresponding to the analytical function call and the set of additional analytical function calls. Fine-tuning an LLM may involve adapting a pre-trained LLM to perform a specific task (e.g., selecting an analytical function call that most closely maps to a natural language input). Data associated with the specific task (e.g., data showing a mapping of natural language inputs to respective analytical function calls) may be collected and used to further train the LLM (e.g., using supervised learning). The weights of the model may be adjusted through backpropagation, gradient descent, or other techniques.

As shown in FIG. 14, sub-process 1422 of method 1400 may translate (e.g., via the LLM) the natural language input to an analytical function call for calling an analytical function of a set of distinct analytical functions of an analytics computing server. In a non-limiting example, FIG. 15A may depict LLM 1504 including an analytical function call selector 1504A that may be configured to translate the natural language input 1502 to an analytical function call 1506. The analytical function call selector 1504A may provide the analytical function call 1506 to the function call executor module 1510.

In some examples of sub-process 1422, each of the sets of analytical function calls are associated with a function prompt name and a function prompt description. In such examples, sub-process 1422 translating the natural language input to the analytical function call may include detecting, via the LLM, that a vector value of the function prompt name and a vector value of the function prompt description of the analytical function call has a smallest vector distance to a vector value of the natural language input relative to each other of the set of distinct analytical function calls. Additionally, sub-process 1422 translating the natural language input to the analytical function call may include translating the natural language input to the analytical function call based on the detecting that the vector value of the function prompt name and the vector value of the function prompt description has the smallest vector distance to the vector value of the natural language input.

A vector value, as described herein, may refer to a mathematical representation of a word, phrase, or sentence through techniques such as word embedding or transformer-based embedding. For instance, each word or sequence of words may be transformed into a numeric vector that may be compared with other numeric vectors for determining similarity, where a higher level of similarity may correspond to a closer semantic similarity between the numeric vectors. In the present disclosure, vector values may be encoded for the function prompt name and/or the function prompt description according to such techniques. The vector distance may be a measure between two vector values indicating how similar or dissimilar they are and may use metrics such as cosine similarity or Euclidean distance. A smaller vector distance may indicate a higher semantic similarity between the inputs. Sub-process 1422 detecting the smallest vector distance may thus correspond to selecting a prompt name and/or prompt description most semantically similar (e.g., semantically closest) to the natural language input.

In a non-limiting example, FIG. 15C may depict LLM 1504 including an analytical function call selector 1504A that may be configured to translate the natural language input 1502 to an analytical function call 1506 using a confidence-based function call selector 1540. For instance, a set of analytical function calls including analytical function calls 1530A, 1530B, 1530C, and 1530N may be compared to the natural language input 1502 by the analytical function call selector 1504A and a corresponding set of match confidence values may be generated and provided to confidence-based function call selector 1540. For instance, match confidence value 1538A may be generated for analytical function call 1530A, match confidence value 1538B may be generated for analytical function call 1530B, match confidence value 1538C may be generated for analytical function call 1530C, and match confidence value 1538D may be generated for analytical function call 1530N. Confidence-based function call selector 1540 may compare match confidence values 1538A, 1538B, 1538C, and 1538D and may select the match confidence value corresponding to closest match (e.g., a highest value, a lowest value, a value most similar to a threshold amount). The confidence-based function call selector 1540 may then output the analytical function call whose match confidence value indicated the closest match to the natural language input 1502.

In some examples, generating the respective match confidence value for each analytical function call may be based on determining a respective vector value for one or more of the function code, prompt name, or prompt description for each analytical function call. For instance, for analytical function call 1530A, a first vector value may be generated for the function code 1533A, a second vector value may be generated for prompt name 1535A, and a third vector value may be generated for prompt description 1537A. The first vector value, second vector value, and/or third vector value may be compared to one or more vector values associated with the natural language input 1502 and a match confidence value 1538A may be generated from the comparison. In some examples, the match confidence value 1538A may correspond to a combination of a first vector distance between the first vector value and the one or more vector values associated with the natural language input 1502, a second vector distance between the second vector value and the one or more vector values, and/or a third vector distance between the third vector value and the one or more vector values. Alternatively, the match confidence value 1538A may correspond to just one of the first vector distance, the second vector distance, and the third vector distance.

As shown in FIG. 14, sub-process 1424 of method 1400 may extract, from the natural language input, a function parameter value for each of one or more parameters for executing the analytical function. In a non-limiting example, FIG. 15A may depict LLM 1504 including a parameter extractor 1504B that may be configured to extract, from natural language input 1502, a function parameter value for each of one or more parameters (e.g., function parameter values 1508) for executing an analytical function. The parameter extractor 1504B may provide the function parameter values 1508 to the function call executor module 1510. In some examples, analytical function call selector 1504A of LLM 1504 may be configured to exchange information with parameter extractor 1504B. For instance, analytical function call selector 1504A may indicate, to parameter extractor 1504B, the selected analytical function, which parameter extractor 1504B may use when extracting parameters.

The one or more parameters may refer to inputs or arguments to the analytical function and, in some examples, may correspond to at least a subset of the parameters indicated in a functional description of the corresponding analytical function call. The function parameter values may correspond to specific instances of the one or more parameters.

Extracting the function parameter value for each of the one or more parameters may include identifying references to the one or more parameters in the natural language input and mapping each reference to the most similar parameter. The mapping may be performed by comparing vector values for the references to vector values for the one or more parameters and identifying a mapping between a reference and a respective parameter if the comparison indicates a level of similarity above a threshold amount. The value of the reference may be used as the extracted function parameter value for the corresponding parameter of the one or more parameters. If a parameter of the one or more parameters does not have a mapping to any reference in the natural language input, a default value may be used for the function parameter value for the parameter.

In some examples of sub-process 1424, the analytical function call includes a first parameter and a second parameter and the analytical function of the analytics computing server includes a third parameter and a fourth parameter. In such examples, sub-process 1424 extracting the function parameter value of each of the one or more parameters of the analytical function includes extracting, from the natural language input, a function parameter value for the first parameter of the analytical function call and a function parameter value for the second parameter of the analytical function call. Additionally, the extracting may include using the function parameter value extracted for the first parameter of the analytical function call as the function parameter value for the third parameter of the analytical function and using the function parameter value extracted for the second parameter of the analytical function call as the function parameter value for the fourth parameter of the analytical function.

In a non-limiting example, FIG. 15D may depict parameter extractor 1504B of LLM 1504 extracting parameter values, which may also be referred to as function parameter values, from a natural language input 1502 for a particular analytical function call 1506. The particular analytical function call 1506 may be the analytical function call selected by analytical function call selector 1504A. Analytical function call 1506 may have a corresponding set of parameters (e.g., indicated by the prompt description for the analytical function call 1506). For instance, analytical function call 1506 may have N parameters (e.g., first parameter 1541A, second parameter 1541B, third parameter 1541C, and fourth parameter 1541N). Each parameter of the N parameters may have an associated optionality status. For instance, in the present example, first parameter 1541A and second parameter 1541B may have a non-optional status (e.g., a required status) and third parameter 1541C and fourth parameter 1541N may have an optional status. In some examples, a prompt description for the analytical function call 1506 may indicate the optionality status. Additionally, or alternatively, the analytics computing server 1514 may have access to the optionality status (e.g., stored at the computing server 1514 or via communicating with a function call computing server).

Parameter extractor 1504B may process the natural language input 1502 to attempt to extract parameter values for parameters 1541A, 1541B, 1541C, and 1541N. In the present example, parameter extractor 1504B may extract a first parameter value 1542A for first parameter 1541A, a second parameter value 1542C for third parameter 1541C, and a third parameter value 1542N for fourth parameter 1542N. Additionally, parameter extractor 1504B may not locate a parameter value for second parameter 1541B (e.g., due to the natural language input 1502 not specifying a parameter value for the second parameter 1541B).

As shown in FIG. 14, process 1430 may call the analytical function at the analytics computing server using the analytical function call and the function parameter value extracted for each of the one or more parameters of the analytical function. For instance, in a non-limiting example, function call executor module 1510 may provide a function invocation 1512 to analytics computing server 1514, where the function invocation 1512 may provide an indication of the analytical function call 1506 and function parameter values 1508. Analytics computing server 1514 of FIG. 15A may include a function repository 1515, where the function repository 1515 may include a set of analytical functions to which an analytical function call may be mapped. For instance, analytics computing server 1514 may map the analytical function call 1506 indicated in function invocation 1512 to one of analytical functions 1516A, 1516B, 1516C, and 1516N. It should be noted that there may be examples in which an analytical function call 1506 is mapped to multiple analytical functions or in which the function invocation 1512 includes multiple analytical function calls.

In some examples, analytics computing server 1514 may map function parameter values 1508 to respective parameters of an analytical function within the function repository 1515. For instance, in a non-limiting example, FIG. 15F may depict a mapping between parameters of an analytical function call 1506 and an analytical function 1516 of function repository 1515. For instance, analytical function call 1506 may include function code 1530, where function code 1530 may use a set of parameters for the analytical function call 1506 (e.g., parameters 1541A, 1541B, 1541C, and 1541N as described herein). A parameter mapper 1549 of analytics computing server 1514 may map the parameters of the analytical function call 1506 to parameters used by a function code 1544 of an analytical function 1516 (e.g., function parameters 1546A, 1546B, 1546C, and 1546D). It should be noted, without deviating from the scope of the disclosure, that there may be examples in which a single analytical function call parameter maps to multiple analytical function parameters, multiple analytical function call parameter map to a single analytical function parameter, or a single analytical function call parameter maps to a single analytical function parameter.

In some examples of process 1430, one or more parameters of the analytical function include a first parameter that is of a first data type. For instance, function parameter 1546A may be of a first data type, where a data type may refer to a grouping of data values into a machine type (e.g., an integer, a float, a struct, a class) or a particular set of units (e.g., percentage, a quantity of a particular type of item). In such examples, process 1424 extracting, from the natural language input, the function parameter value of each of the one or more parameters of the analytical function may include extracting, via the LLM (e.g., LLM 1504), one or more tokens from the natural language input that correspond to the first parameter and determining, via the LLM, that the one or more tokens are of a second data type, different from the first data type. For instance, the LLM 1504 may extract one or more tokens from natural language input 1502 that correspond to function parameter 1546A (e.g., parameter value 1542A) and may determine that the one or more tokens are of a second data type different from the first data type (e.g., parameter value 1542A may be a string whereas the values of function parameter 1546A may be an integer or a float). Additionally, process 1424 extracting the function parameter value may include converting, via the large language model, the one or more tokens of the second data type to the first data type (e.g., converting a string to an integer or float) and using the one or more tokens of the first data type as the function parameter value extracted for the first parameter. As defined herein, a token may refer to a single unit of text (e.g., a word, a subword, a character, a phrase).

In some examples of process 1430, the analytical function may include one or more parameters and may further include a required parameter. In such examples, process 1430 may determine that the LLM did not extract the function parameter value of the required parameter and may assign a default function parameter value to the required parameter in response to determining that the LLM did not extract the function parameter value of the required parameter. Additionally, process 1430 may call the analytical function based on the function parameter value extracted for the one or more parameters and the default function parameter value assigned to the required parameter.

For instance, in a non-limiting example, FIG. 15E may depict a decision flow that parameter mapper 1549 may use to set a value of a parameter of analytical function 1516 once the corresponding parameter in the analytical function call 1506. For instance, for a function parameter 1546 of an analytical function 1516, if a value was successfully extracted (e.g., by the LLM 1504) and set for the corresponding parameter of the analytical function call, the analytics computing server 1514, at 1547, may set the value of function parameter 1546 to the value of the parameter for the analytical function call. For instance, since parameter extractor 1504B extracts a first parameter value 1542A for parameter 1541A of the analytical function call, a corresponding parameter 1546 of the analytical function associated with the analytical function call may be set with the first parameter value 1542A. Alternatively, if no value was successfully extracted for the function parameter 1546, the analytics computing server 1514 may determine to set the function parameter 1546 for the analytical function 1516 with a default value 1548. For instance, since parameter extractor 1504B does not extract a parameter value for parameter 1541B of the analytical function call, a corresponding parameter of the analytical function associated with the analytical function call may be set with the default value 1548 for that parameter.

As shown in FIG. 14, process 1440 may receive a technical analytical output in response to calling the analytical function using the function parameter value extracted for each of the one or more parameters of the analytical function. For instance, in a non-limiting example, as depicted in FIG. 15A, after analytics computing server 1514 maps an analytical function call 1506 to an analytical function of the function repository 1515, analytics computing server 1514 may call the analytical function. Analytics computing server 1514 may output a result of the analytical function (e.g., a value returned by the analytical function) to function call executor module 1510 and/or LLM-driven interpretation module 1524. In examples in which analytics computing server 1514 provides the analytical output 1522 to function call executor module 1510, function call executor module 1510 may provide an indication of the analytical output 1522 to LLM-driven interpretation module 1524. Alternatively, function call executor module 1510 may provide an indication of the function invocation 1512 to LLM-driven interpretation module 1524

The analytical output 1522, which may also be referred to as a technical analytical output, may represent a result of the analytical function and may have a format that depends on a type of analysis performed. The analytical output 1522 may be provided as a raw output of the analytical function or may be processed prior to being provided by analytics computing server 1514. In some examples, the analytical output 1522 may be cached or stored at a memory accessible by analytics computing server 1514 (e.g., to enable analytics computing server 1514 to access the analytical output 1522 instead of rerunning the function call if a future natural language request requests the same analytical output 1522).

In some examples, the analytical task specified in the natural language input is an optimization task and the analytical function is an optimization function. In some such examples, the technical analytical output of the analytical function is an optimization output of the optimization function. An optimization task may refer to a computational process that seeks to minimize or maximize an objective or metric while adhering to a set of constraints or limitations. For instance, optimization tasks may include determining a most efficient allocation of resources or determining an optimal outcome given certain constraints. An optimization function may be a specific algorithm or computational procedure designed to solve this optimization task. The optimization task may take in relevant parameters and may apply mathematical models to determine a solution. The optimization function may aim to adjust variables in a way that maximizes a desired outcome or minimizes a negative factor while respecting imposed constraints.

As shown in FIG. 14, process 1450 may translate, by the large language model, the technical analytical output to a natural language explanation of the technical analytical output. In a non-limiting example, FIG. 15A may depict an LLM-driven interpretation module 1524 receiving an analytical output 1522 from analytics computing server 1514 and/or function call executor module 1510. Upon receiving the analytical output 1522, LLM-driven interpretation module 1524 may convert (e.g., via LLM 1504) the analytical output 1522 to a natural language explanation 1526. As defined herein, a natural language explanation may refer to a description or an interpretation of technical results. The natural language explanation may include a recommendation for the user based on the technical results. It should be noted that there may be examples when the language model used to perform process 1450 may, in some examples, differ from the language model used to perform one or more aspects of process 1420 (e.g., sub-process 1422 and/or 1424). Alternatively, the same language model may be used for each of processes 1420 and 1450. In some examples, to generate the natural language explanation, process 1450 may provide a query to the analytics compute service corresponding to the technical results and may use a result of the query (e.g., a line from a table accessible by the analytics compute service) to generate the natural language explanation.

As shown in FIG. 14, process 1460 may output, via the graphical user interface, a response to the natural language input that includes the technical analytical output and the natural language explanation of the technical analytical output. In a non-limiting example, FIG. 15A may depict LLM-driven interpretation module 1524 providing natural language explanation 1526 to response generator 1527 and response generator 1527 providing a response 1528 to conversational user interface 1503. The response 1528 may include natural language explanation 1526 and analytical output 1522.

In some examples, the conversational user interface 1503 includes a first section and a second section, where the first section of the conversational user interface 1503 is configured to receive the natural language input and display the response to the natural language input and the second section of the conversational user interface 1503 is configured to display a graphical visualization associated with the response to the natural language input. For instance, as depicted in FIG. 15G, a GUI may include chat box element 1550, which may be an example of the first section. For instance, chat box element 1550, upon receiving user message 1552B may provide command execution and results 1552C, which may include natural language explanation 1526 and/or a representation of the analytical output 1522. Additionally, GUI may include graphical visualization element 1560 which may display a graphical visualization 1562 associated with the response. Graphical visualization 1562 may, for instance, include a summary table of analytical functions executed during a current session, where each distinct row of the summary table represents a distinct scenario (e.g., a distinct set of parameters provided to an analytical function or a distinct analytical function). Additionally, or alternatively, graphical visualization 1562 may include one or more graphs providing a visualization for the analytical output 1522 (e.g., a scatter plot, a line graph, a bar chart.

In some examples, the graphical visualization in the second section of the conversational user interface 1503 is updated in response to receiving one or more additional natural language inputs. For instance, for each distinct natural language input (e.g., a natural language input associated with a distinct set of parameters or a distinct analytical function) provided to the conversational user interface 1503, a new row may be added to the summary table. Additionally, or alternatively, a new graph may be added or a previously provided graph may be updated.

In some examples, the analytics computing server may be in communication with a computer database including user data and a visual analytics computing server that generates graphical analytical content for the response to the natural language input. For instance, the analytics computing server 1514 of FIG. 15A may include a user database 1518. The user database 1518 may be configured to include information about a user providing the natural language input. Such information may be used to enable the user to perform an authentication procedure to gain access to the conversational user interface 1503 (e.g., the user database 1518 may include authentication information). Additionally, or alternatively, the user database 1518 may include a set of identifiers linking particular tables (e.g., tables accessed by the analytical functions) to particular users. Accordingly, when a user submits a natural language input, the analytics computing server 1514 may restrict tables according to which user submits the natural language input (e.g., the analytics computing server 1514 may refrain from using tables linked to a different user from the one providing the natural language input).

Additionally, the analytics computing server 1514 may include an analytics visualization server 1520 that generates graphical analytical content, such as one or more dashboards or graphs. The graphical analytical content provided by the analytics visualization server 1520 may, for instance, be a representation of the summary table or of a visualization of the analytical output provided by the analytics computing server 1514.

Figure 14A:
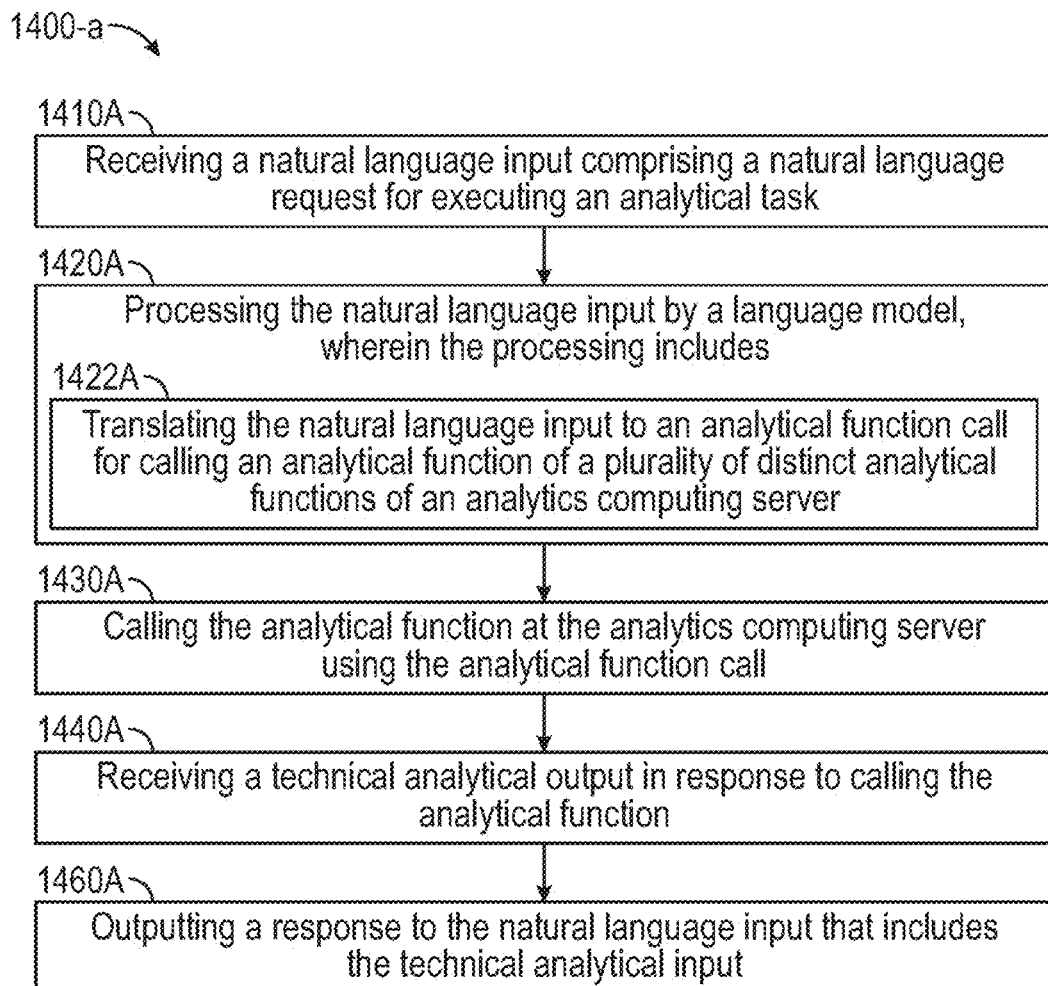

FIG. 14A illustrates one embodiment of method 1400A for securely executing analytical tasks using natural language. It shall be appreciated that other embodiments contemplated within the scope of the present disclosure may involve more processes, fewer processes, different processes, or a different order of processes than illustrated in FIG. 14A. It should be noted that a computer-program product may include a non-transitory machine-readable storage medium storing computer instructions that, when executed by one or more operations, may perform operations corresponding to the processes and sub-processes of method 1400A. Additionally, or alternatively, a computer-implemented method may include operations corresponding to processes and sub-processes of 1400A. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 1400A.

One of ordinary skill in the art will appreciate that method 1400A may provide many technical advantages and practical applications over conventional design of interfaces for executing analytical functions. For instance, other systems may use specialized interfaces that require specific structured formats that may not be immediately accessible to all users (e.g., users that do not possess knowledge of the specific structured format). By introducing a language model to interpret natural language queries, the techniques described herein simplify user interaction with analytics software. For instance, users may make requests in conversational language to trigger analytical functions, which may more easily enable users to access advanced analytical functionality.

Furthermore, other systems may permit language models to have direct access to sensitive data. Such systems may have compromised security due to potential for the language model to leak sensitive data if the language model misinterprets a request or if the language model receives a malicious request from an unauthorized user. In contrast, the techniques herein describe a layered architecture in which the language model interprets the intent of a user (e.g., via a mapping to an analytical function call) without directly interacting with the database that a user intends to access. While the language model is capable of providing a request that may be interpreted by a server for accessing the sensitive data in the database, the server may act independently of the language model, thus securing the sensitive data from the language model. The results of the request may include sensitive data that the LLM may use for explanation, but only after the server first verifies that the request is being provided by an authorized user. This isolation of the language model from the server with access to the database may enhance data protection, limit potential data leakage, and align with data-sensitivity constraints.

As shown in FIG. 14A, process 1410A may receive a natural language input including a natural language request for executing an analytical task. The natural language input may be received via a GUI, a command line interface, or an application programming interface (API). In a non-limiting example, FIG. 15A may depict an example of a user interface receiving a natural language input. For instance, conversational user interface 1503 may receive a natural language input 1502. The natural language input 1502 may include a natural language request for executing an analytical task as described herein.

A command line interface may refer to a text-based user interface that allows users to interact with a computer program by typing commands into a terminal or console. In a non-limiting example in which the natural language input is received via a command line interface, a user may type the natural language input into a terminal or console that process 1410 then receives. An API may refer to a set of rules or protocols that enable software applications to communicate with each other. In a non-limiting example in which the natural language input is received via an API, a software application may retrieve the natural language input from a user, a database, or an LLM and may provide the natural language input to process 1410 via an API call (e.g., via a Hypertext Transfer Protocol (HTTP) request).

In some examples, the natural language input provided to the user interface may be a multi-modal input. For instance, the natural language input may include one or more image files, video files, audio files, textual files, or files of other formats. Each image file or video file may depict extractable text that represents a natural language input or may include context that enable a natural language input to be generated from the image file. Additionally, or alternatively, each video file and/or audio file may include audio that represents a natural language input. Additionally, or alternatively, each video file and/or textual file may include text corresponding to a natural language input.

As shown in FIG. 14A, process 1420A may process the natural language input by a language model, where the language model may be a machine learning model designed to process and generate human language. The language model may, for instance, be an LLM or a small language model. A small language model may refer to a language model that has a limited number of training parameters or a limited corpus of training data relative to an LLM. The small language model may have faster processing and a lower memory consumption as compared to LLMs.

In a first non-limiting example, conversational user interface 1503 may provide the natural language input 1502 to LLM 1504 and LLM 1504 may process the natural language input. In a second non-limiting example, another type of language model (e.g., a small language model) may be substituted for the LLM 1504 of FIG. 15A. The language model may include analytical function call selector 1504A and/or parameter extractor 1504B and may be capable of providing analytical function calls 1506 and/or function parameter values 1508, respectively, to a function call executor module 1510. The language model may receive the natural language input 1502 from conversational user interface 1502 and may process the natural language input. It should be noted that there may be examples in which parameter extractor 1504B is not present or not utilized in LLM 1504 or the other language model (e.g., in examples in which the analytical function call 1506 selected by the analytical function call selector 1504A does not have any parameters).

As shown in FIG. 14A, sub-process 1422A of process 1420A may translate the natural language input to an analytical function call for calling an analytical function of a set of distinct analytical functions of an analytics computing server. In a non-limiting example, FIG. 15A may depict LLM 1504 including an analytical function call selector 1504A that may be configured to translate the natural language input 1502 to an analytical function call 1506. The analytical function call selector 1504A may provide the analytical function call 1506 to the function call executor module 1510.

In some examples, process 1420A of method 1400A may initialize the language model according to a set of predefined prompts. The set of predefined prompts may provide instructions to the language model that indicate an expected output (e.g., the expected format of the analytical function call that is output from analytical function call selector 1504A) and/or how to differentiate between requests for different analytical function calls (e.g., may provide examples of requests for particular analytical function calls as well as an indication of the particular analytical function call each request is linked to). In some examples, the set of predefined prompts may include the function prompt name and/or function prompt description associated with each of the set of analytical function calls.

As shown in FIG. 14A, process 1430A may call the analytical function at the analytics computing server using the analytical function call. For instance, in a non-limiting example, function call executor module 1510 may provide a function invocation 1512 to analytics computing server 1514, where the function invocation 1512 may provide an indication of the analytical function call 1506. Analytics computing server 1514 of FIG. 15A may include a function repository 1515, where the function repository 1515 may include a set of analytical functions to which an analytical function call may be mapped. For instance, analytics computing server 1514 may map the analytical function call 1506 indicated in function invocation 1512 to one of analytical functions 1516A, 1516B, 1516C, and 1516N. It should be noted that there may be examples in which an analytical function call 1506 is mapped to multiple analytical functions or in which the function invocation 1512 includes multiple analytical function calls.

In some examples, each analytical function of the set of distinct analytical functions may map to a respective set of predefined instructions accessible by the analytics computing server. For instance, each analytical function may map to predefined code that may be run upon the analytical function being executed at the analytics computing server. In some such examples, process 1430A may provide an identifier of the analytical function call to the analytics computing server. The identifier may, for instance, include a symbolic representation (e.g., a name) of the analytical function to be run, the function prompt name, or the function prompt description. In a non-limiting example, as depicted in FIG. 15A, the identifier may be included in function invocation 1512 provided to analytics computing server 1514. Process 1430A, upon providing the identifier, may execute the set of predefined instructions mapped to the analytical function based on the identifier of the analytical function call. For instance, in a non-limiting example as depicted in FIG. 15A, the analytics computing server 1514 may map the identifier in the function invocation 1512 to an analytical function in the function repository 1515 and may run predefined code associated with the analytical function in order to generate the analytical output 1522. It should be noted that the predefined code may have variable parameter values without deviating from the scope of the present disclosure.

In some examples, the analytics computing server may include a user database. For instance, in a non-limiting example as depicted in FIG. 15A, the analytics computing server 1514 may include a user database 1518. The user database 1518 may be configured to store tables including data. Each table within the user database 1518 may represent a specific dataset, organized into rows and columns, where each row corresponds to an individual entry and each column represents a particular data attribute. Additionally, each table within the database 1518 may be linked to a particular user. For instance, a first set of tables within the database 1518 may be linked to a first user and a second set of tables within the database 1518 may be linked to a second user. Each set of tables linked to a particular user may be located within different portions of memory or may be located in a same portion of memory but may be distinguished according to a user identifier linked to the table (e.g., stored in metadata for the table).

Accessing a table within the user database may include making a query on the table. For instance, the analytics computing server may provide a request that specifies a target table and conditions for filtering the data that is retrieved from the table. Additionally, accessing a table within the user database may include updating one or more entries within the table. For instance, the analytics computing server may provide a request that specifies a target table and which entries in which columns are to be updated. The table that is accessed and/or the manner in which a table is accessed may depend on the analytical function that the analytics computing server is executing.

When the analytics computing server executes an analytical function, the analytics computing server may restrict the analytical function to access only tables of the user database that are linked to a user that provided the analytical function call. For instance, in a non-limiting example as depicted in FIG. 15A, if a first user provides a natural language input 1502 to conversational user interface 1503, analytics computing server 1514, when executing the corresponding analytical function for the natural language input 1502, may only access tables linked to the user or a group that the user is included (e.g., explicitly or implicitly, such as in the case of public access). Analytics computing server 1514 may block access to tables that the first user is not linked to (e.g., private tables associated with a second user or a group within which the user is not included).

In order to determine the tables to which a user has access to, the analytics computing server may provide, to the analytics computing server, an indication of user credentials, where the set of tables accessible to the user may be based on the provided user credentials. For instance, function invocation 1512 may include credentials for the user (e.g., a session identifier or a username and password). Alternatively, a separate message may be sent prior to function invocation 1512 indicating the user credentials. Analytics computing server 1514 may enable access to a first set of tables associated with the user for which the user credentials were provided and may restrict (e.g., block) access to a second set of tables associated with other users (e.g., a second user distinct from the first user).

In some examples, the analytics computing server may be configured to control access to entries of the one or more tables such that the language model is restricted from accessing data stored within the one or more tables, thereby securing the one or more tables from unauthorized access via the natural language input provided to the language model. For instance, in a non-limiting example as depicted in FIG. 15A, the LLM 1504 may not have direct access to user database 1518, as user database 1518 may be located at analytics computing server 1514. Additionally, conversational user interface 1503 may not provide the user credentials included in function invocation 1512 to LLM 1504. Accordingly, LLM 1504 may not have access to the user credentials. As such, if the LLM 1504 communicates with analytics computing server 1514 (e.g., without the user credentials), analytics computing server 1514 may refrain from fulfilling a request to execute any analytical functions that may give LLM 1504 access to information within user database 1518. Restricting access in this manner may prevent LLM 1504 from providing information about user database 1518 to an unauthorized user (e.g., a user attempting to gain access to a particular table within user database 1518 without the credentials needed to access the particular table). Accordingly, a level of security associated with fulfilling analytical requests may be improved relative to systems that enable LLMs to have access to user database 1518.

As shown in FIG. 14A, process 1440A may receive a technical analytical output in response to calling the analytical function. For instance, in a non-limiting example, as depicted in FIG. 15A, after analytics computing server 1514 maps an analytical function call 1506 to an analytical function of the function repository 1515, analytics computing server 1514 may call (e.g., execute) the analytical function. Analytics computing server 1514 may output a result of the analytical function (e.g., a value returned by the analytical function) to function call executor module 1510 and/or LLM-driven interpretation module 1524. In examples in which analytics computing server 1514 provides the analytical output 1522 to function call executor module 1510, function call executor module 1510 may provide an indication of the analytical output 1522 to LLM-driven interpretation module 1524. Alternatively, function call executor module 1510 may provide an indication of the function invocation 1512 to LLM-driven interpretation module 1524.

It should be noted that there may be examples in which the analytical output 1522 is provided directly to response generator 1527. For instance, analytics computing server 1514 and/or function call executor module 1522 may provide the analytical output 1522 to response generator 1527. In doing so, the analytical output 1522 the analytical output 1522 may bypass the LLM-driven interpretation module 1524. In some such examples, the LLM-driven interpretation module 1526 may not be present, in which case the response generator 1527 may receive the analytical output 1522 but may not receive natural language explanation 1526.

As shown in FIG. 14A, process 1460A may output a response to the natural language input that includes the technical analytical output. In a non-limiting example, FIG. 15A may depict LLM-driven interpretation module 1524 providing natural language explanation 1526 to response generator 1527 and response generator 1527 providing a response 1528 to conversational user interface 1503. The response 1528 may include natural language explanation 1526 and analytical output 1522. In examples in which the analytical output 1522 bypasses the LLM-driven interpretation module 1526 and/or in which no LLM-driven interpretation module 1524 is present, response generator 1527 may generate the response may include the analytical output 1522 but may not include natural language explanation 1526.

Figure 16:
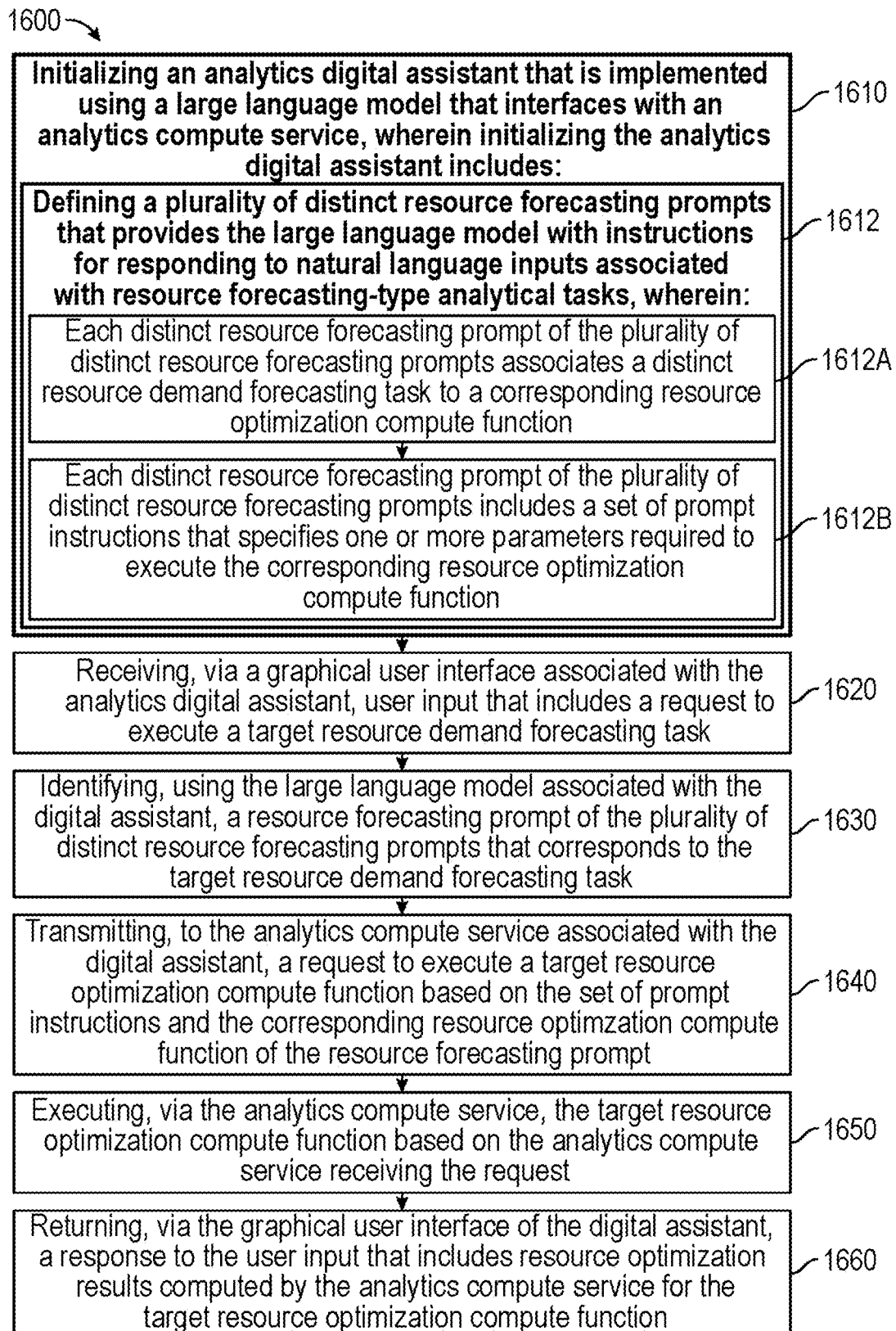
FIG. 16 illustrates an example of a method for secure execution of an analytical task using natural language, according to some embodiments of the present technology.

FIG. 16 illustrates one embodiment of method 1600 for securely executing analytical tasks using natural language. It shall be appreciated that other embodiments contemplated within the scope of the present disclosure may involve more processes, fewer processes, different processes, or a different order of processes than illustrated in FIG. 16. It should be noted that a computer-program product may include a non-transitory machine-readable storage medium storing computer instructions that, when executed by one or more operations, may perform operations corresponding to the processes and sub-processes of method 1600. Additionally, or alternatively, a computer-implemented method may include operations corresponding to processes and sub-processes of 1600. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 1600.

One of ordinary skill in the art will appreciate that method 1600 may provide many technical advantages and practical applications over conventional design of interfaces for executing analytical functions. Other systems may require users to navigate complex interfaces or to input commands in a rigid format (e.g., as code) that a user may be unfamiliar with, whereas systems that utilize method 1600 may enable users to initiate complex analytical tasks (e.g., optimization-related tasks) through natural language. By automatically transforming plain language requests into precise, structured analytics queries, systems that utilize method 1600 may increase overall ease of usage and provide reduced barriers to entry for executing analytical tasks.

Additionally, the techniques described herein may enable real-time adaptation to varying forecasting scenarios. By contrast, other solutions, such as those with static forecasting models, may require manual adjustments or may not be capable of performing tasks such as adjusting from executing resource optimization for a single location to executing resource optimization for multiple locations simultaneously. In contrast, the techniques described herein may utilize a flexible prompt and parameter structure that automatically adapts to user-defined inputs, allowing seamless transitions between complex forecasting demands without user intervention. This adaptability provides a robust and responsive solution improving the precision and relevance of forecasting outputs and enhancing efficiency compared to other more rigid models that may fail to scale or adapt to fluctuating resource constraints.

As shown in FIG. 16, process 1610 may initialize an analytics digital assistant that is implemented using an LLM that interfaces with an analytics compute service. The analytics digital assistant as defined herein may refer to a system configured to receive natural language input from a user, perform an analytical task related to the natural language input, and provide an output related to the analytical task. The LLM may be configured to receive and process the natural language input, whereas the analytics compute service may be configured to perform the analytical task. In a non-limiting example, FIGS. 17 and 18 may depict systems 1700 and 1800 that include a digital assistant 1704, which may be another term used to refer to an analytics digital assistant. In some examples, process 1610 may be performed by one or more aspects of FIG. 15A. For instance, the LLM may be an example of LLM 1504 and the analytics compute server may be an example of analytics computing server 1514 as described with reference to FIG. 15A.

As shown in FIG. 16, sub-process 1612 of process 1610 may define a set of distinct resource-forecasting prompts that provides the LLM with instructions for responding to natural language inputs associated with resource forecasting-type analytical tasks. Resource-forecasting may refer to a process of predicting (e.g., inferring, determining) a future availability or usage of resources, where resources may refer to a quantity of physical materials (e.g., physical items, physical components). Defining the set of distinct resource-forecasting prompts may include providing, to the LLM (e.g., by the analytics compute service), an indication of the set of distinct resource-forecasting prompts.

A resource-forecasting prompt may be a digital object linked to a particular resource forecasting-type analytical task. The resource-forecasting prompt may include one or more of a prompt name, a prompt description, and a function description. A prompt name may be an identifier for a particular resource-forecasting prompt and a prompt description may include instructions for responding to natural language inputs, where natural language inputs may be user-provided inputs expressed in a human language. Additionally, a function description may include an identifier and/or a description of a resource forecasting-type analytical task to perform.

An analytical task may be a computational process or operation that involves the systematic analysis of data. A resource forecasting-type analytical task may be an analytical task that involves performing resource forecasting. An example of a resource forecasting-type analytical task may be a resource demand forecasting task, where a resource demand forecasting task may be a computational process or operation that predicts future demand of resources. Performing a resource demand forecasting task may include utilizing an optimization compute function, which may be an algorithm designed to minimize an objective or metric while adhering to a set of constraints or limitations. In the case of resource demand forecasting tasks, such optimization compute functions may include resource optimization compute functions, where a resource optimization compute function may be a function that seeks to minimize or maximize an objective or metric associated with resources (e.g., a utilization rate). In some examples, the analytical task may include performing a sensitivity analysis.

In some examples, as depicted by condition 1612A of FIG. 16, each distinct resource-forecasting prompt of the set of distinct resource-forecasting prompts may associate a distinct resource demand forecasting task to a corresponding resource optimization compute function. For instance, each resource-forecasting prompt may represent a distinct resource demand forecasting task and the function description of each resource-forecasting prompt may indicate a resource optimization compute function associated with the resource demand forecasting task. Additionally, as depicted by condition 1612B of FIG. 16, each distinct resource-forecasting prompt of the set of distinct resource-forecasting prompts may include a set of prompt instructions that specifies one or more parameters required to execute the corresponding resource optimization compute function. For instance, the prompt description associated with each resource-forecasting prompt may include the set of prompt instructions that specifies the one or more parameters, where parameters may refer to inputs to the associated resource optimization compute function.

In some examples, sub-processes 1612, 1612A, and 1612B may be represented by one or more aspects of FIGS. 15A through 15G. For instance, an analytical function call (e.g., analytical function call 1530A) may include a resource-forecasting prompt, where the resource-forecasting prompt may include a prompt name (e.g., prompt name 1534A), a prompt description (e.g., 1536A), and a function description (e.g., function code 1532A). Accordingly, receiving the set of resource-forecasting prompts may include receiving a set of analytical function calls. Additionally, the optimization compute function of the resource demand forecasting task linked to each resource-forecasting prompt may be an example of an analytical function 1516.

Figure 17:
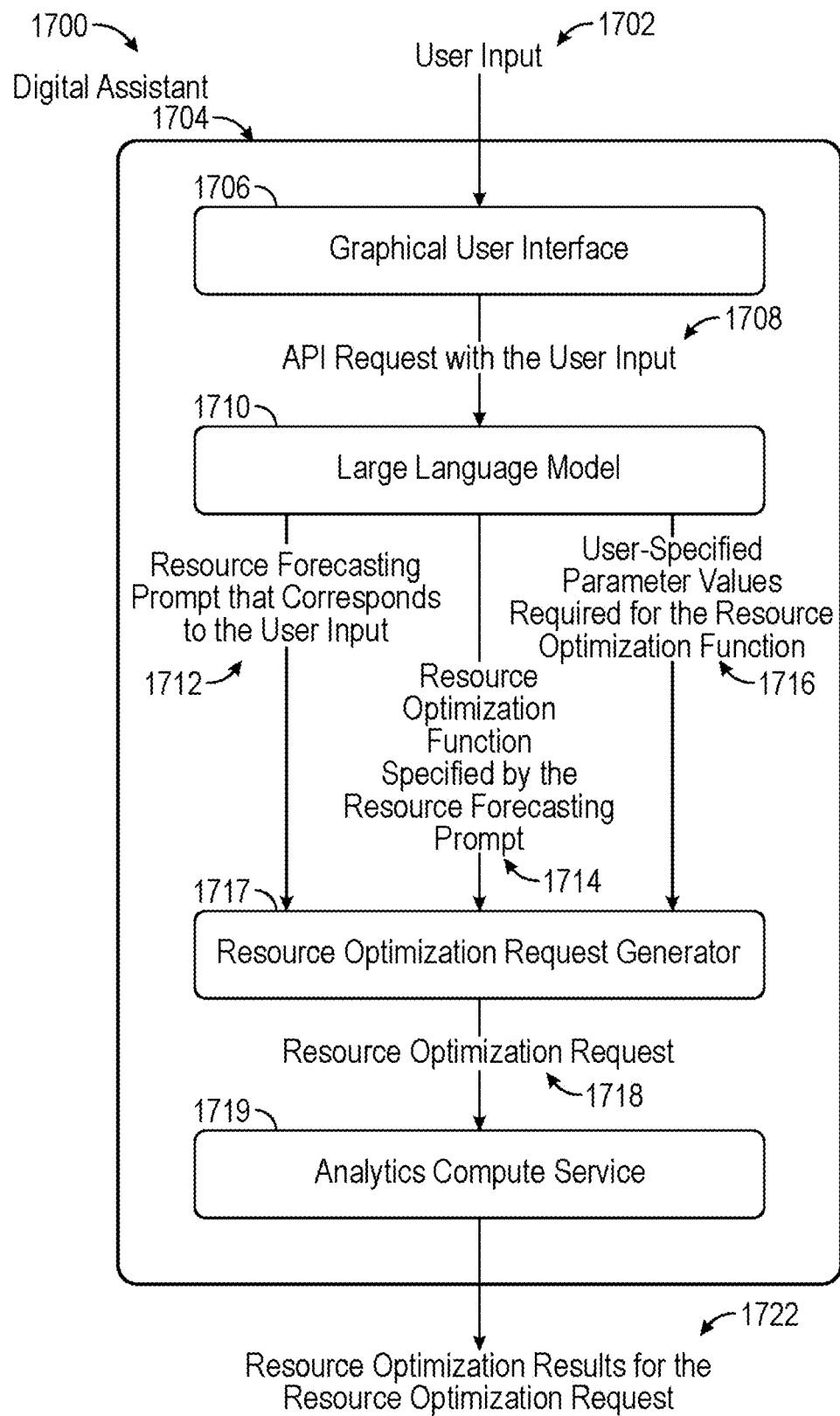
FIGS. 17 and 18 illustrate examples of systems for secure execution of an analytical task using natural language.
Figure 18:
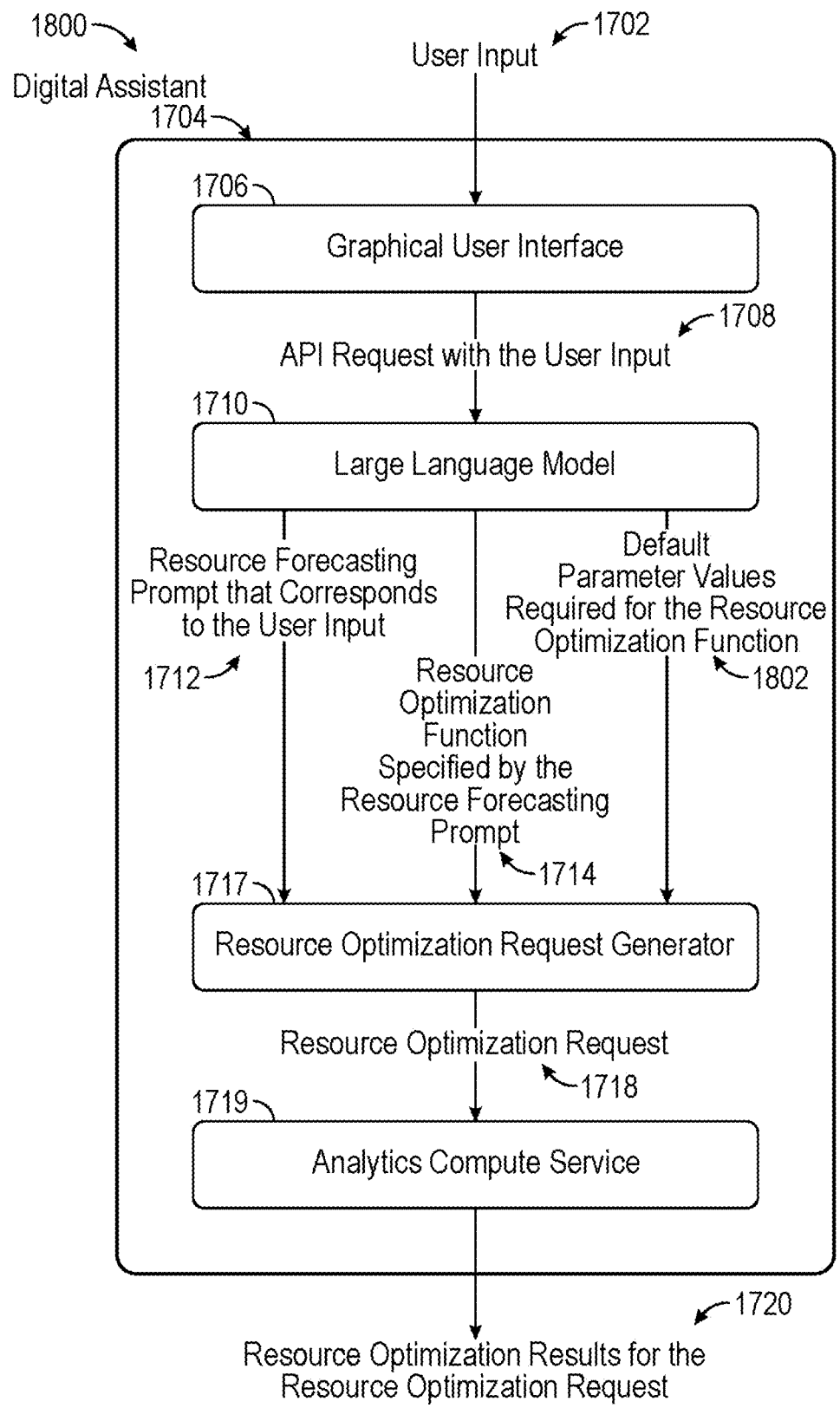

As shown in FIG. 16, process 1620 may receive, via a GUI associated with the analytics digital assistant, user input that includes a request to execute a resource demand forecasting task. In a non-limiting example, as depicted in FIGS. 17 and 18, a user input 1702 (e.g., a natural language input) may be provided to GUI 1706. In some examples, process 1620 may correspond to one or more aspects of FIG. 15A. For instance, the user input of process 1620 may be natural language input 1502 and the GUI of process 1620 may be conversational user interface 1503.

In a non-limiting example, FIGS. 20 through 26 may depict various examples of the GUI of process 1620. The GUI may include a user interface input element 2020 (e.g., an input field) into which a user may type, paste, or otherwise insert the user input. Additionally, the GUI may include a user interface control element 2030 (e.g., a submit button) which enables the user to submit the user input to process 1620. Upon the user providing the user input to process 1620, the GUI may display a receipt of user input (e.g., a copy of the text of the user input) in a user interface display element 2005. For instance, user interface textual elements 2004A through 2004M may represent displayed receipts of previous user input to user interface input element 2020. In some examples, the GUI of process 1620 may correspond to one or more aspects of FIG. 15G. For instance, user interface input element 2020 may be an example of a user interface input element 1554, user interface control element 2030 may be an example of a user interface control element 1556, user interface display element 2005 may be an example of a user interface display element 1558.

It should be noted that, when a user initially loads a GUI for an analytics digital assistant, as depicted in FIGS. 20 through 26, the GUI may be configured to display a user interface textual element 2002A that may include a welcome message. The welcome message may include an acknowledgement of the presence of the user and may include an indication of one or more actions that a user may perform. For instance, the welcome message may include an indication of a help functionality that the user may access. In response to the welcome message displayed by user interface textual element 2002-a, the user may provide a message via the user interface input element 2020 that indicates that the user would like to access the help functionality. The GUI may display the message via user interface textual element 2004A and may provide a response via user interface textual element 2002B that indicates one or more capabilities of the analytics digital assistant.

As shown in FIG. 16, process 1630 may identify, using the LLM associated with the digital assistant, a resource-forecasting prompt of the set of distinct resource-forecasting prompts that corresponds to the target resource demand forecasting task. In some examples of process 1630, each of the set of distinct resource forecasting prompts may be associated with a prompt name and a prompt description. In such examples, process 1630 identifying the resource forecasting prompt of the set of distinct resource forecasting prompts that corresponds to the target resource demand forecasting task may include assessing, via the LLM, the user input against the prompt name and the prompt description of the set of distinct resource forecasting prompts and detecting, via the LLM, that the prompt name and the prompt description of the resource forecasting prompt of the set of distinct resource forecasting prompts that corresponds to the target resource demand forecasting task matches the user input with a greater amount of confidence than the prompt name and the prompt description of a remainder of the set of distinct resource forecasting prompts.

A target resource demand forecasting task may be defined as a resource demand forecasting task that is being requested by the user input. Assessing the user input against prompt names and prompt descriptions of the set of distinct resource forecasting prompts may include determining a vector value for the user input and comparing the vector for the user input against the vector values for the prompt names and/or prompt descriptions of the set of distinct resource forecasting prompts. The resource forecasting prompt whose prompt name and/or prompt description has a smallest vector distance with a vector value of the user input may be selected, where a smaller vector distance may represent a greater amount of confidence. It should be noted that other techniques may be utilized to compare the user input against the prompt names and/or prompt descriptions of the set of distinct resource forecasting prompts without deviating from the scope of the present disclosure.

In a non-limiting example, as depicted in FIGS. 17 and 18, after graphical user interface 1706 receives user input 1702, graphical user interface 1706 may provide a request 1708 (e.g., an application programming interface (API) request) to LLM 1710, where the request 1708 may include the user input 1702. LLM 1710 may identify a resource forecasting prompt 1712 that corresponds to user input 1702 and may provide the resource forecast prompt 1712 to resource optimization request generator 1717. Additionally, the LLM 1710 may identify a resource optimization function 1714 (e.g., a resource optimization compute function) and may provide the resource optimization function 1714 function to the resource optimization request generator 1717.

In some examples, as depicted in FIG. 17, LLM 1710 may extract, from the user input 1702, user-specified parameter values 1716 required for resource optimization function 1714 (e.g., those specified by the prompt description or function description for a given resource forecasting prompt). In such examples, LLM 1710 may provide the user-specified parameter values 1716 to resource optimization request generator 1717. Alternatively, as depicted in FIG. 18, LLM 1710 may fail to extract user-specified parameter values required for resource optimization function 1714. In such examples, LLM 1710 may provide default parameter values 1802 required for the optimization function 1714 to resource optimization request generator 1717. The default parameter values 1802 may be provided to the LLM 1710 via an analytics compute service 1719 or another service. Alternatively, LLM 1710, upon failing to extract user-specified parameter values, may provide null values for the parameter values required for resource optimization function 1714 and analytics compute service 1719 may set these default parameter values.

Resource optimization request generator 1717, upon receiving information from the LLM 1710 (e.g., one or more of the resource forecasting prompt 1712, the resource optimization function 1714, the user-specified parameter values 1716, or the default parameter values 1802), may generate a resource optimization request 1718 to provide to the analytics compute service 1719. Resource optimization request generator 1717 may generate the resource optimization request 1718 by combining the information received from LLM 1710 into a structured format (e.g., in an Extensible Markup Language (XML) format or a JavaScript Object Notation (JSON) format). In some examples, resource optimization request generator 1717 may provide the resource optimization request 1718 to the analytics compute service 1719 via an API call.

Figure 19:
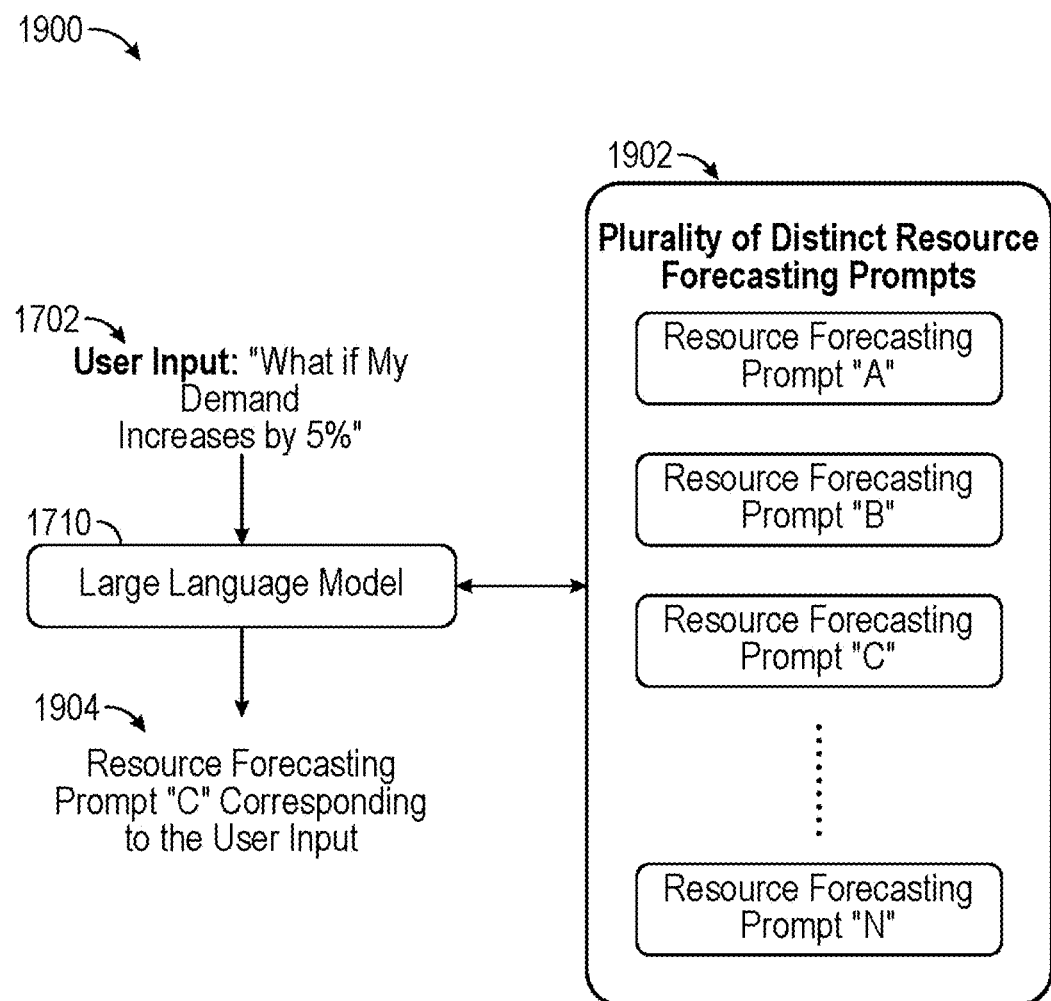
FIG. 19 illustrates examples of system procedures for secure execution of an analytical task using natural language.
Figure 19:
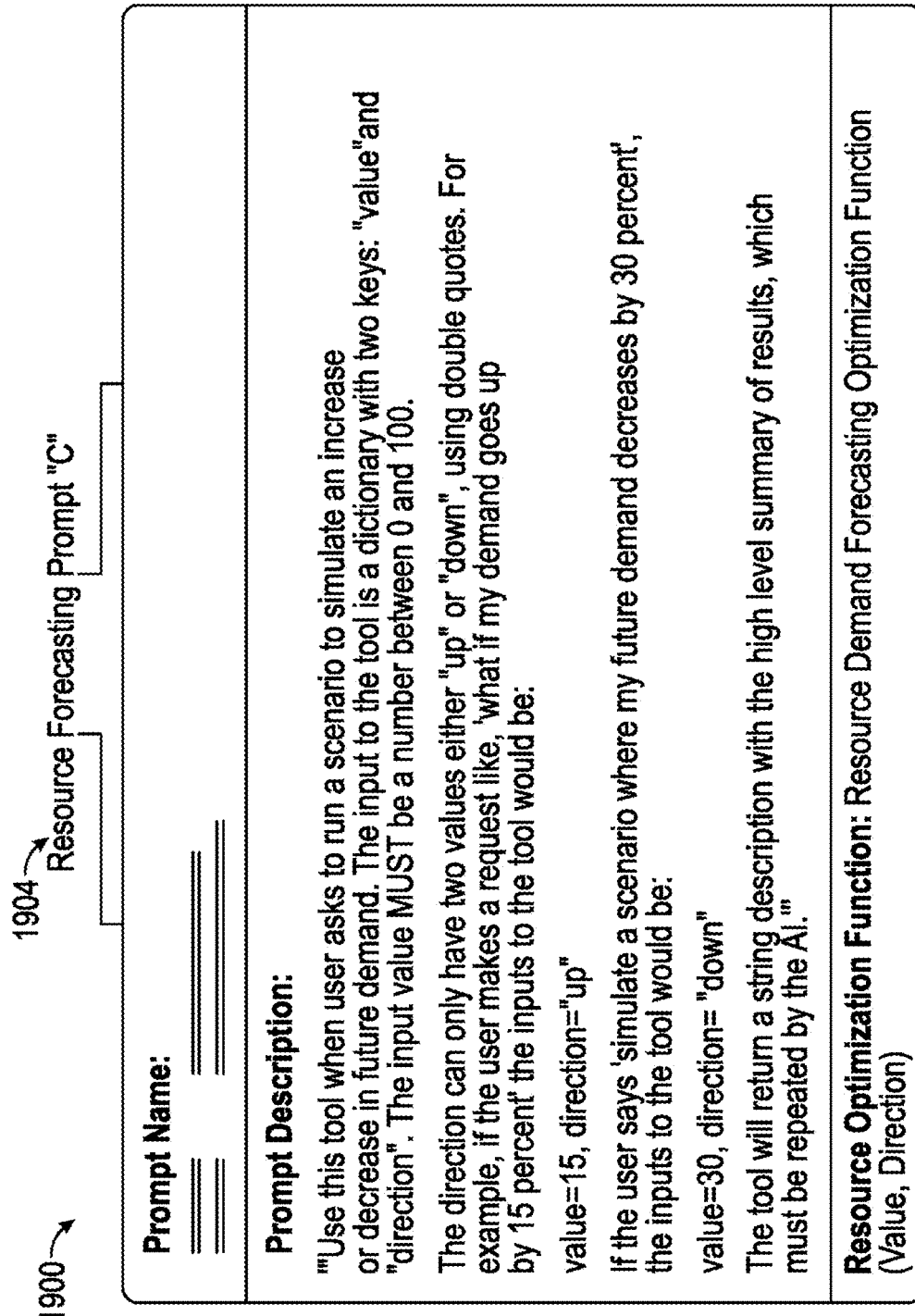
Figure 19:
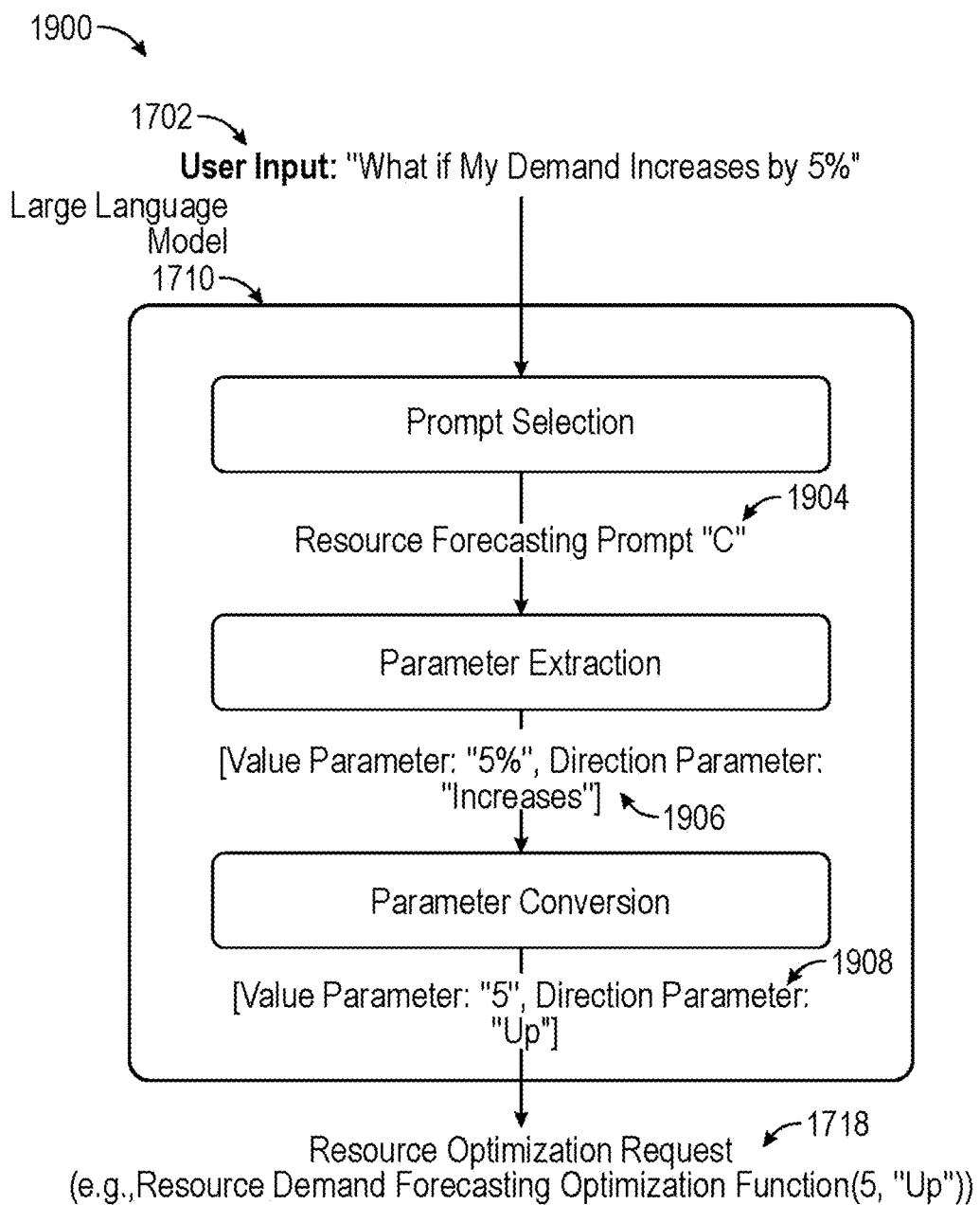
Figure 19:
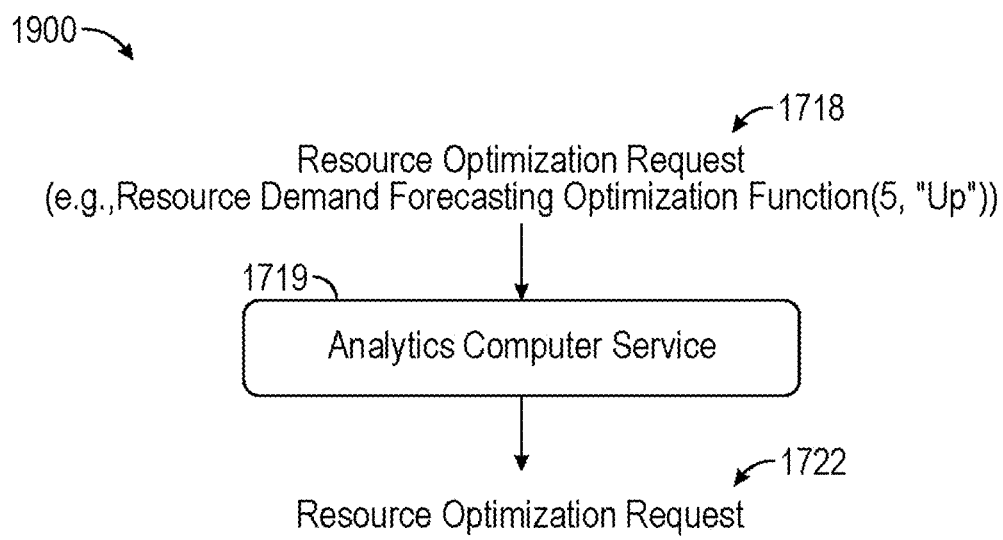

FIG. 19 may depict a non-limiting example of an LLM 1710 converting a user input 1702 into a resource forecasting prompt 1904. As described herein, LLM 1710 may be initialized with a resource forecasting prompt set 1902 that includes multiple distinct resource forecasting prompts. The LLM 1710 may match the user input 1702 to one of the distinct resource forecasting prompts (e.g., resource forecasting prompt 1904) and may output an indication of the matched resource forecasting prompt. It should be noted that each resource forecasting prompt 1904 may have a prompt name, a prompt description, and a function description. An example of a prompt description may be the following: 'Use this tool when user asks to run a scenario to simulate an increase or decrease in future demand. The input to the tool is a dictionary with two keys: "value" and "direction"' The input value MUST be a number between 0 and 100. The direction can only have two values either "up" or "down", using double quotes. For example, if the user makes a request like, "what if my demand goes up by 15 percent", the inputs to the tool would be: value=15, direction="up". If the user says "simulate a scenario where my future demand decreases by 30 percent", the inputs to the tool would be: value=30, direction="down". The tool will return a string description with the high level summary of results, which must be repeated by the AI." An example of a function description may be "Resource Optimization Function: Resource Demand Forecasting Optimization Function (Value, Direction)".

FIG. 19 may further depict converting a user input 1702 to a resource optimization request 1718 using LLM 1710. It should be noted that, in such examples, LLM 1710 may perform functionalities ascribed to LLM 1710 and resource optimization request generator 1717 as described with reference to FIGS. 17 and 18. For instance, LLM 1710 may receive a user input 1702 ("What if my demand increases by 5%") and perform prompt selection to select resource forecasting prompt 1904. After performing prompt selection, LLM 1710 may extract parameters from the user input 1702 and may output the values of the extracted parameters. For instance, if the resource forecasting prompt 1904 indicates to locate a value parameter and a direction parameter, LLM 1710 may attempt to extract a value for the value parameter (e.g., 5%) and the direction parameter (e.g., "increases").

After extracting the parameters, LLM 1710 may convert the extracted values of the parameters into a format requested by the resource forecasting prompt 1904 (e.g., from a first data type into a second data type). For instance, if the resource forecasting prompt 1904 indicates that the value parameter should have a value between 0 and 100, then the value of the value parameter may be converted to a value between 0 and 100 (e.g., 5). Additionally, if the resource forecasting prompt 1904 indicates that the direction parameter should either be "up" or "down", then the value of the direction parameter may be converted to either "up" or "down" (e.g., "increases" may be converted to "up"). Once the parameter values have been converted, LLM 1710 (e.g., or resource optimization request generator 1717) may generate a resource optimization request 1718.

As shown in FIG. 16, process 1640 may transmit, to the analytics compute service associated with the digital assistant, a request to execute a target resource optimization compute function based on the set of prompt instructions and the corresponding resource optimization compute function of the resource forecasting prompt. In a non-limiting example, FIGS. 17 and 18 may depict resource optimization request generator 1717 providing a resource optimization request 1718 to analytics compute service 1719. The resource optimization request 1718 may provide an indication of a target resource optimization compute function (e.g., by indicating information associated with a particular resource forecasting prompt).

As shown in FIG. 16, process 1650 may execute, via the analytics compute service, the target resource optimization compute function based on the analytics compute service receiving the request. In a non-limiting example, FIGS. 17, 18, and 19 may each depict an analytics compute service 1719 receiving a resource optimization request 1718 and outputting resource optimization results 1722 in response to the resource optimization request 1718. The resource optimization results may be provided to graphical user interface 1706.

Analytics compute service 1719 executing the target resource optimization compute function may include analytical compute service 1719 identifying the target resource optimization compute function from a set of distinct target resource optimization compute functions. Once analytics compute service 1719 selects the target resource optimization compute function, analytics compute service 1719 may iterate through possible configurations of the target resource optimization compute function utilizing the parameter values indicated by resource optimization request 1718, where each configuration may be evaluated based on an objective function. Analytics compute service 1719 may select a configuration that has a maximum value or a minimum value relative to each other configuration evaluated against the objective function. The resource optimization results 1722 may be derived from the configuration that has the maximum value or the minimum value.

As shown in FIG. 16, process 1660 may return, via the graphical user interface of the digital assistant, a response to the user input that includes resource optimization results computed by the analytics compute service for the target resource optimization compute function. In a non-limiting example, the resource optimization results 1722 of FIGS. 17 and 18 may be provided to GUI 1706, which may display a response to user input 1702 that includes the resource optimization results 1722. Various non-limiting examples of responses including resource optimization results returned via the GUI of process 1660 may be depicted with regards to FIGS. 20 through 26. For instance, the user interface display element 2005 may include user interface textual elements 2002C through 2002M, each of which may represent a response returned for the user inputs represented by user interface textual elements 2004B through 2004L, respectively.

In some examples, the target resource demand forecasting task relates to optimizing a utilization rate of a target physical location and the user input does not include a user-specified utilization rate of the target physical location. A utilization rate may be defined as a metric that measures a proportion of a system (e.g., an amount of one or more materials currently stored at the target physical location) being used relative to a total available capacity (e.g., a maximum amount of the one or more materials that may be stored at the target physical location). A target physical location may refer to a physical location of the resources (e.g., physical materials, physical items) linked to a user's request. The user input not including the user-defined utilization rate may refer to the user input message not specifying a utilization rate or an LLM receiving the message failing to extract a value for the user-defined utilization rate from the user input message.

In some such examples, the target resource optimization compute function may relate to a utilization optimization compute function that requires a utilization parameter value to be set before executing the utilization optimization compute function. A utilization optimization compute function may be an optimization compute function that seeks to maximize or minimize an objective associated with utilization rate (e.g., maximizing utilization rate at a target physical location). In some such examples, process 1650 executing the target resource optimization compute function may include executing the utilization optimization compute function with a default utilization parameter value based on the user input excluding the user-specified utilization rate of the target physical location. For instance, due to the target resource optimization compute function requiring a utilization parameter to be set before executing the utilization optimization compute function and the user input not including the user-specified utilization rate, the LLM or the analytics compute service may set the utilization parameter with a default utilization rate and may execute the target resource optimization compute function using the default utilization rate.

In examples in which the target resource demand forecasting task relates to optimizing a utilization rate of a target physical location, resource optimization results included in the response returned by process 1660 may include a first proposed resource transfer that specifies a total number of items to transfer from the target physical location to a second physical location, a second proposed resource transfer that specifies a total number of items to transfer from the second physical location to the target physical location, and an expected utilization rate of the target physical location after the first proposed resource transfer and the second proposed resource transfer are complete.

Figure 20:
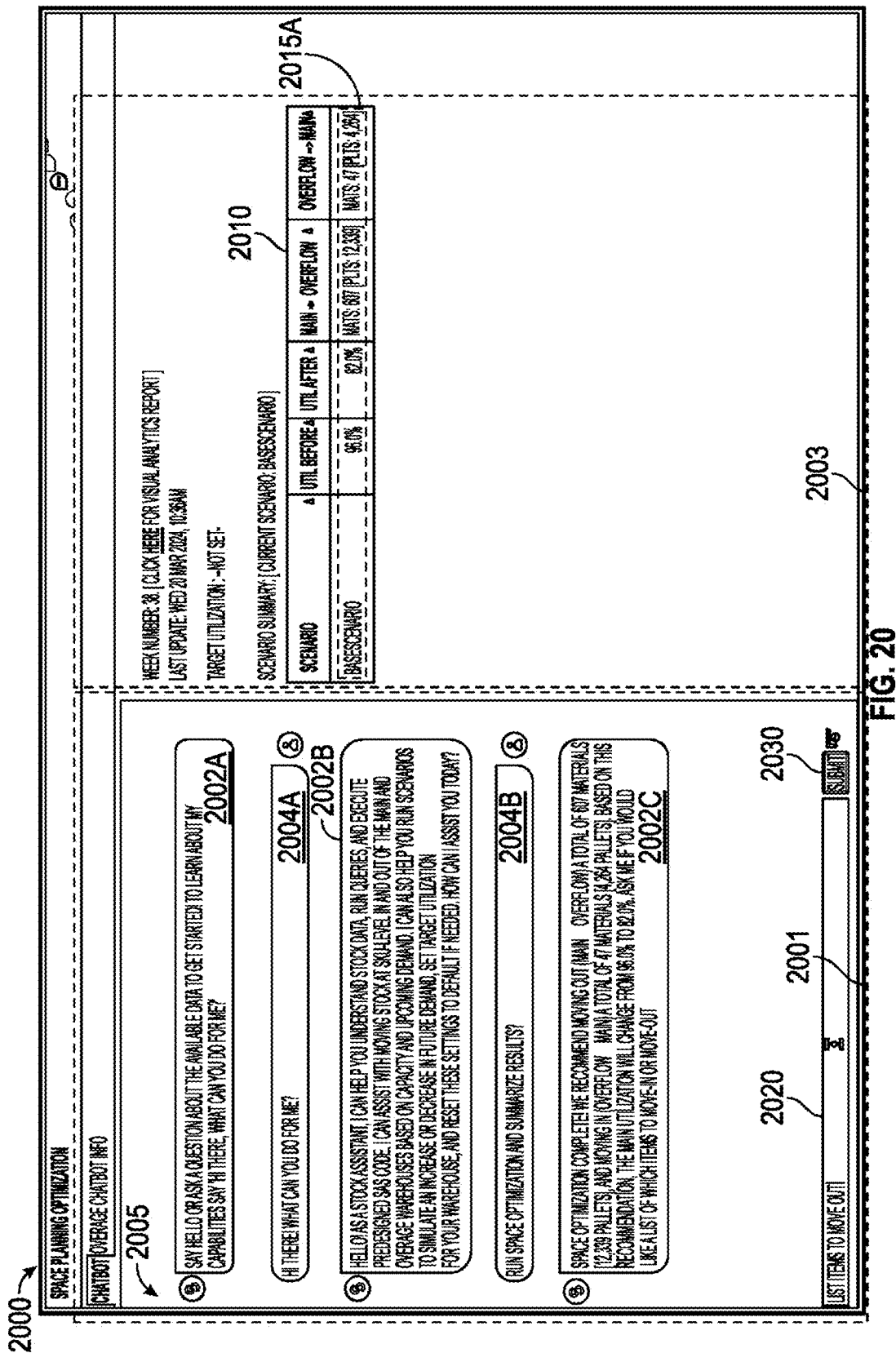

In a non-limiting example, FIG. 20 may depict a user interface textual element 2004B displaying a user input in which the user has requested a resource demand forecasting task relating to optimizing a utilization rate without specifying a user-defined utilization rate (e.g., a request to run space optimization and summarize results). As the user does not specify a utilization rate, a default starting utilization rate may be determined (e.g., 96%). In response to the provided user input, the GUI may receive a response from the analytics compute service and may display user interface textual element 2002C based on the response. The user interface textual element 2002C may include a first proposed resource transfer specifying a total number of items (e.g., 607 materials or 12,339 pallets) to transfer from the target physical location (e.g., a main location) to a second location (e.g., an overflow location) and a second proposed resource transfer that specifies a total number of items (e.g., 47 materials or 4,264 pallets) to transfer from the second physical location to the target location. Additionally, because the user does not specify a utilization rate, the user interface textual element 2002C may further display an expected utilization rate of the target physical location (e.g., 82%), as determined by the analytics compute service, after the first proposed resource transfer and the second proposed resource transfer are complete. Additionally, the user interface textual element 2002C may include a recommendation for the user to request a list of items to move in or move out based on the optimization.

In other examples, the target demand forecasting task relates to optimizing a utilization rate of a target physical location and the user input includes a user-specified utilization rate of the target physical location. In such examples, process 1650 or another process may extract, from the user input, the user-specified utilization rate of the target physical location using the LLM. Additionally, process 1650 executing the target resource optimization compute function may include executing the utilization optimization compute function with the user-specified utilization rate of the target physical location based on the user input having the user-specified utilization rate of the target physical location.

Figure 24:
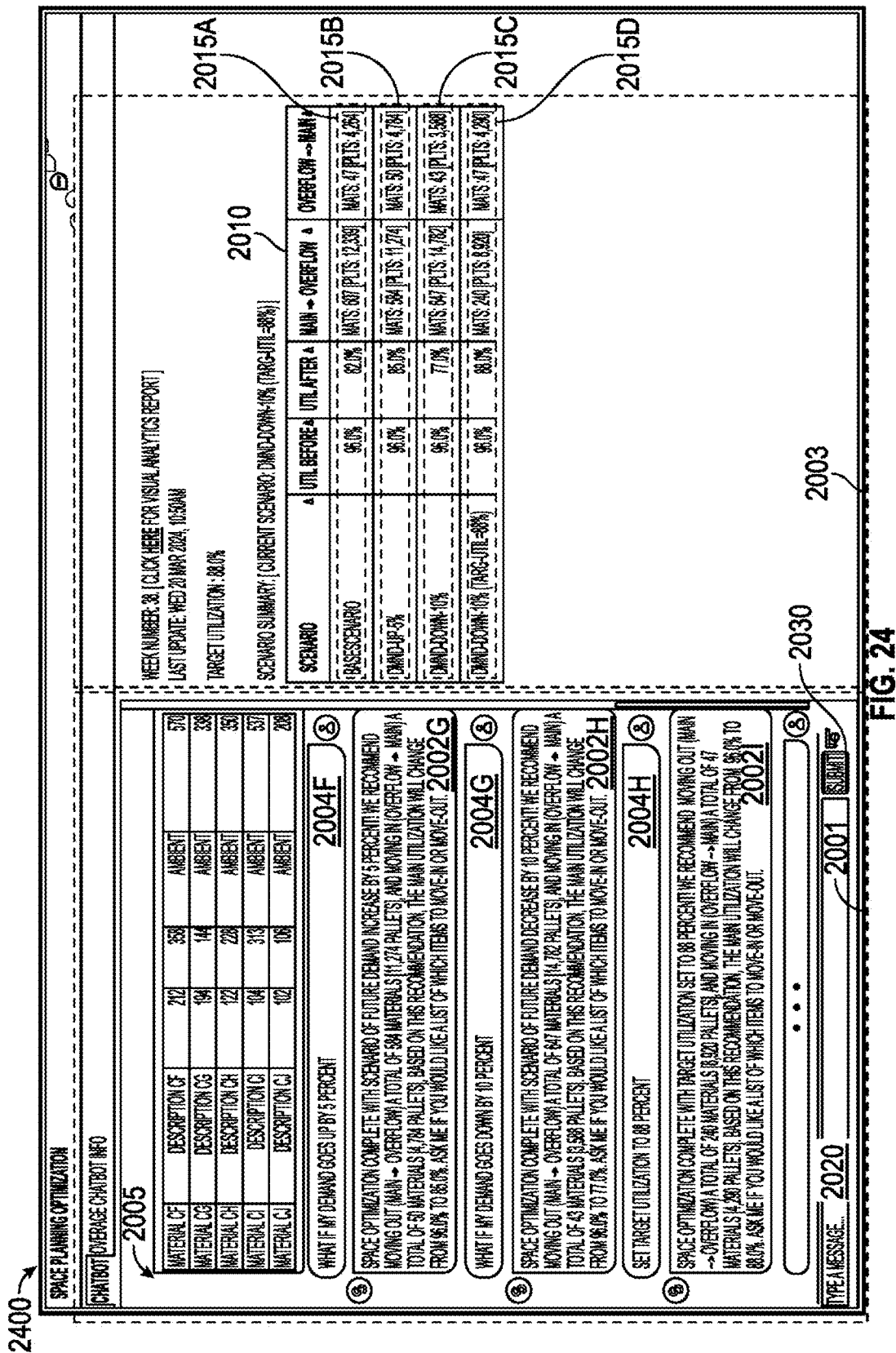

In a non-limiting example, FIG. 24 may depict a user interface textual element 2004H displaying a user input in which the user has requested a resource demand forecasting task relating to optimizing a utilization rate with a user-defined utilization rate (e.g., a request to run space optimization and summarize results with a target utilization set to a particular percentage). Because the user does not specify a starting utilization rate, a default starting utilization rate may be determined (e.g., 96%). In response to the provided user input, the GUI may receive a response from the analytics compute service and may display user interface textual element 2002I based on the response. The user interface textual element 2002I may include a first proposed resource transfer specifying a total number of items (e.g., 240 materials or 8,920 pallets) to transfer from the target physical location (e.g., a main location) to a second location (e.g., an overflow location) and a second proposed resource transfer that specifies a total number of items (e.g., 47 materials or 4,290 pallets) to transfer from the second physical location to the target location. Additionally, because the user specified a user-defined target utilization rate, the user interface textual element 2002I may display an expected utilization rate of the target physical location that matches the user-defined utilization rate (e.g., 88%). Additionally, the user interface textual element 2002I may include a recommendation for the user to request a list of items to move in or move out based on the optimization.

In some examples, the target resource demand forecasting task relates to identifying items for transportation from a primary physical storage site to a secondary physical storage site and the target resource optimization compute function relates to an item transport optimization compute function that determines a set of items to transport from the primary physical storage site to the secondary physical storage site to satisfy a predetermined storage utilization rate of the primary physical storage site. In some such examples, process 1650 executing the target resource optimization compute function may include executing, using an optimization model, the item transport optimization compute function, where an output of the optimization model includes an outbound item transfer list that specifies one or more item identification numbers and respective item quantities to be transported. Additionally, process 1660 returning the response to the user input (e.g., via the graphical user interface of the digital assistant) may include presenting the outbound item transfer list in a tabular format.

Figure 21:
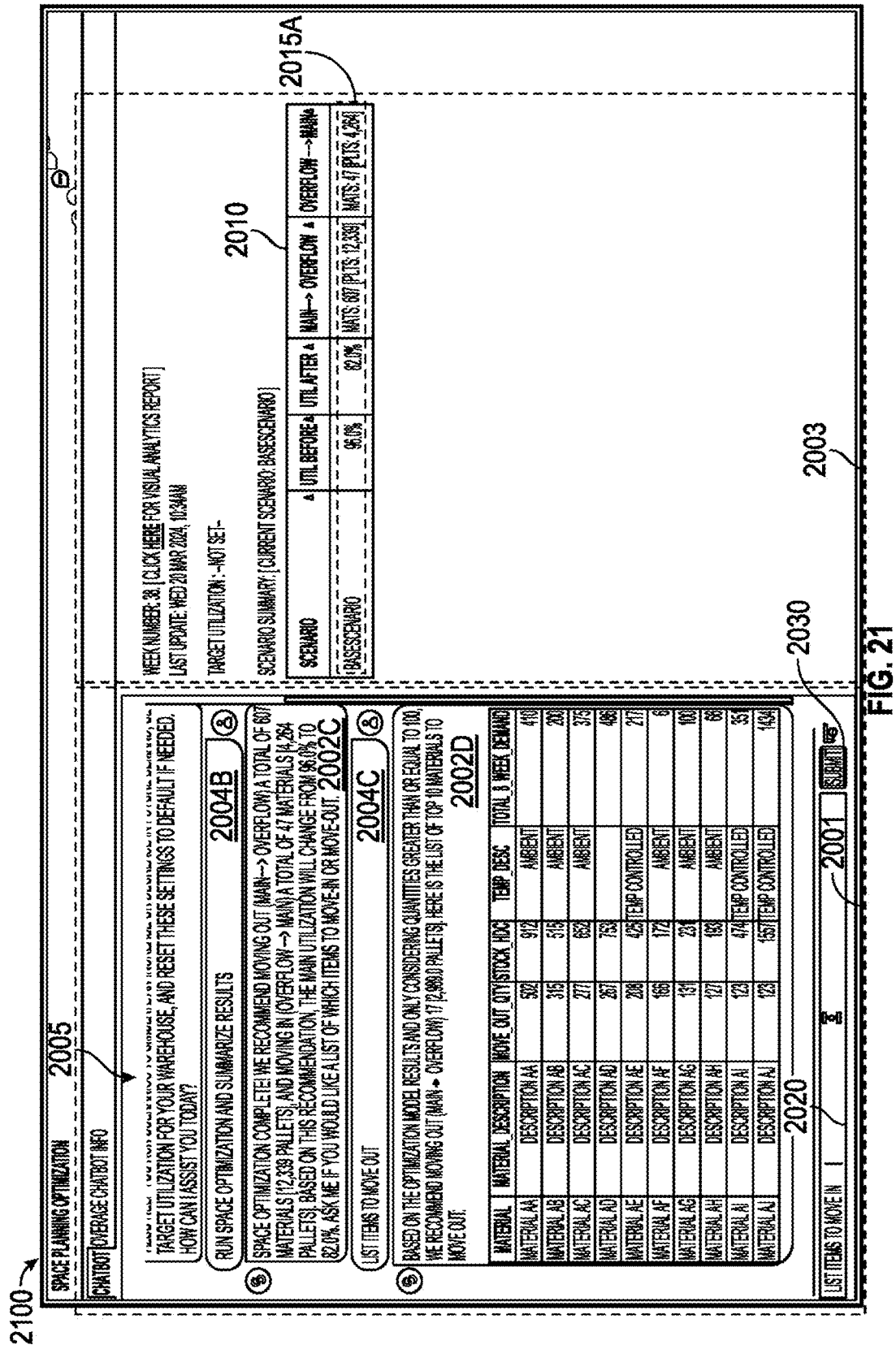

In a first non-limiting example, FIG. 21 may depict a user interface textual element 2004C displaying a user input in which the user has requested a resource demand forecasting task relating to identifying items for transportation from a primary physical storage site to a secondary physical storage site. In response to the provided user input, the GUI may receive a response from the analytics compute service and may display user interface textual element 2002D based on the response. The user interface textual element 2004D may include an outbound item transfer list that specifies one or more item identification numbers (e.g., represented by Material AA, Material AB, and so on) and respective item quantities to be transported (e.g., 502 for Material AA, 315 for Material AB, and so on). It should be noted that the item identification numbers may instead be represented by alphabetical characters, alphanumeric characters, or other symbolic forms of representation without deviating from the scope of the disclosure.

The user interface textual element 2002D may, in some examples, provide an indication of items for transportation to the secondary physical storage site based on the results of a previously run optimization (e.g., the space optimization requested earlier by a user as indicated in user interface textual element 2004B). Additionally, a default filter may be defined for the outbound item transfer list (e.g., may only list items with a quantity size of 100 or greater). It should be noted that there may be examples in which custom filters may be configured by the user (e.g., via user interface input element 2020). Such custom filters may include filtering by identification number, item quantity, description, item stock, temperature, or demand. In some examples, the outbound item transfer list may be ordered (e.g., descending order by item quantity). Additionally, user interface textual element 2002D may provide a recommendation for a quantity of materials (e.g., 17 materials) and/or pallets (e.g., 2,989 pallets) to move out based on the results of the previously run optimization and the active filters (e.g., custom filters, default filters in examples where the default filter is not replaced with a custom filter).

Figure 26:
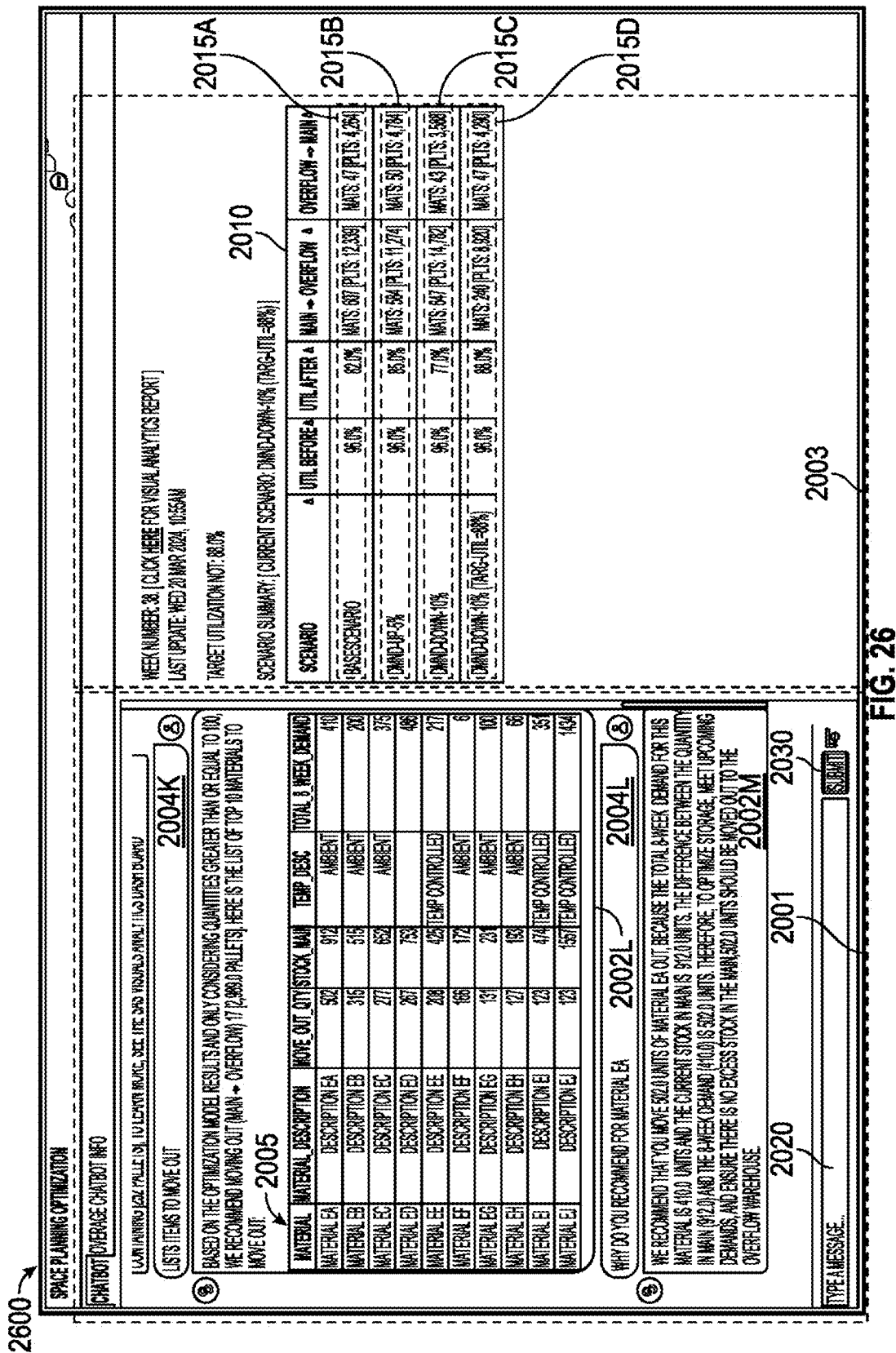

In a second non-limiting example, FIG. 26 may depict a user interface textual element 2004K displaying a user input in which the user has requested a resource demand forecasting task relating to identifying items for transportation from a primary physical storage site to a secondary physical storage site. In response to the provided user input, the GUI may receive a response from the analytics compute service and may display user interface textual element 2002L based on the response. The user interface textual element 2004L may include an outbound item transfer list that specifies one or more item identification numbers (e.g., represented by Material EA, Material DB, and so on) and respective item quantities to be transported (e.g., 502 for Material EA, 315 for Material DB, and so on). It should be noted that the item identification numbers may instead be represented by alphabetical characters, alphanumeric characters, or other symbolic forms of representation without deviating from the scope of the disclosure.

Figure 25:
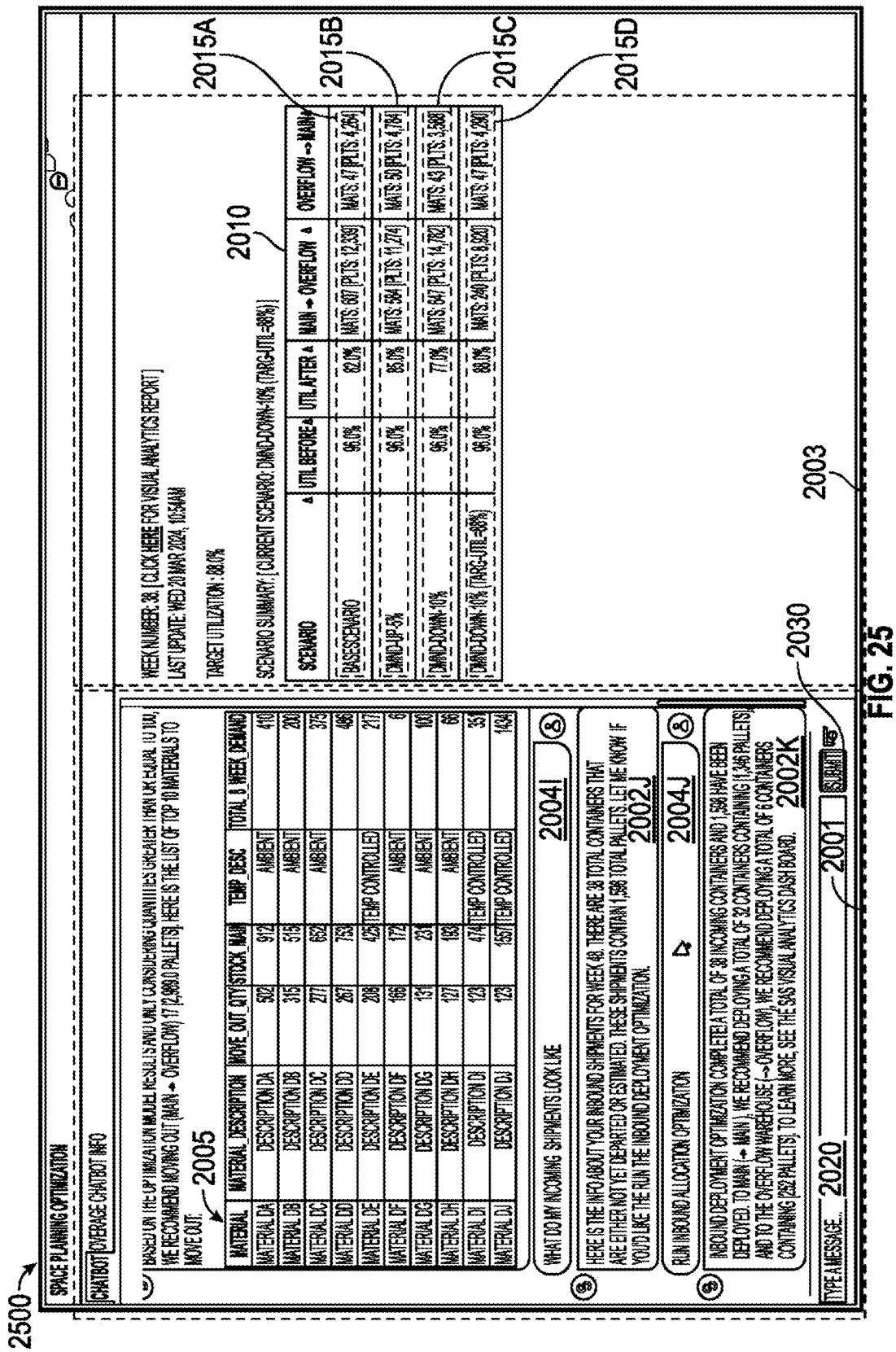

The user interface textual element 2002L may, in some examples, provide an indication of items for transportation to the secondary physical storage site based on the results of a previously run optimization (e.g., the space optimization requested earlier by a user as indicated in textual element 2004H in FIG. 24 or 2004J in FIG. 25). Additionally, a default filter may be defined for the outbound item transfer list (e.g., may only list items with a quantity size of 100 or greater). It should be noted that there may be examples in which custom filters may be configured by the user (e.g., via user interface input element 2020). Such custom filters may include filtering by identification number, item quantity, description, item stock, temperature, or demand. In some examples, the outbound item transfer list may be ordered (e.g., descending order by item quantity). Additionally, user interface textual element 2002D may provide a recommendation for a quantity of materials (e.g., 17 materials) and/or pallets (e.g., 2,989 pallets) to move out based on the results of the previously run optimization and the active filters (e.g., custom filters, default filters in examples where the default filter is not replaced with a custom filter).

In some examples, the target demand forecasting task relates to identifying items for transportation from a secondary physical storage site to a primary physical storage site and the target resource optimization compute function relates to an item transport optimization compute function that determines a set of items to transport from the secondary physical storage site to the primary physical storage site to satisfy a predetermined storage utilization rate of the primary physical storage site. In such examples, process 1650 executing the target resource optimization compute function may include executing, using an optimization model, the item transport optimization compute function, where an output of the optimization model includes an inbound item transfer list that specifies one or more item identification numbers and respective item quantities to be transported. Additionally, process 1660 returning the response to the user input (e.g., via the graphical user interface of the digital assistant) may include presenting the inbound item transfer list in a tabular format.

In a first non-limiting example, FIG. 22 may depict a user interface textual element 2004D displaying a user input in which the user has requested a resource demand forecasting task relating to identifying items for transportation from a secondary storage site to a primary storage site. In response to the provided user input, the GUI may receive a response from the analytics compute service and may display user interface textual element 2002E based on the received response. The user interface textual element 2004E may include an inbound item transfer list that specifies one or more item identification numbers (e.g., represented by Material BA, Material BB, and so on) and respective item quantities to be transported (e.g., 749 for Material BA, 338 for Material BB, and so on). It should be noted that the item identification numbers may instead be represented by alphabetical characters, alphanumeric characters, or other symbolic forms of representation without deviating from the scope of the disclosure.

The user interface textual element 2002E may, in some examples, provide an indication of items for transportation to the primary physical storage site based on the results of a previously run optimization (e.g., the space optimization requested earlier by a user as indicated in user interface textual element 2004D). Additionally, a default filter may be defined for the inbound item transfer list (e.g., may only list items with a quantity size of 100 or greater). It should be noted that there may be examples in which custom filters may be configured by the user (e.g., via user interface input element 2020). Such custom filters may include filtering by identification number, item quantity, description, item stock, temperature, or demand. In some examples, the inbound item transfer list may be ordered (e.g., descending order by item quantity). Additionally, user interface textual element 2002E may provide a recommendation for a quantity of materials (e.g., 15 materials) and/or pallets (e.g., 3,319 pallets) to move in based on the results of the previously run optimization and the active filters (e.g., custom filters, default filters in examples where the default filter is not replaced with a custom filter).

Figure 23:
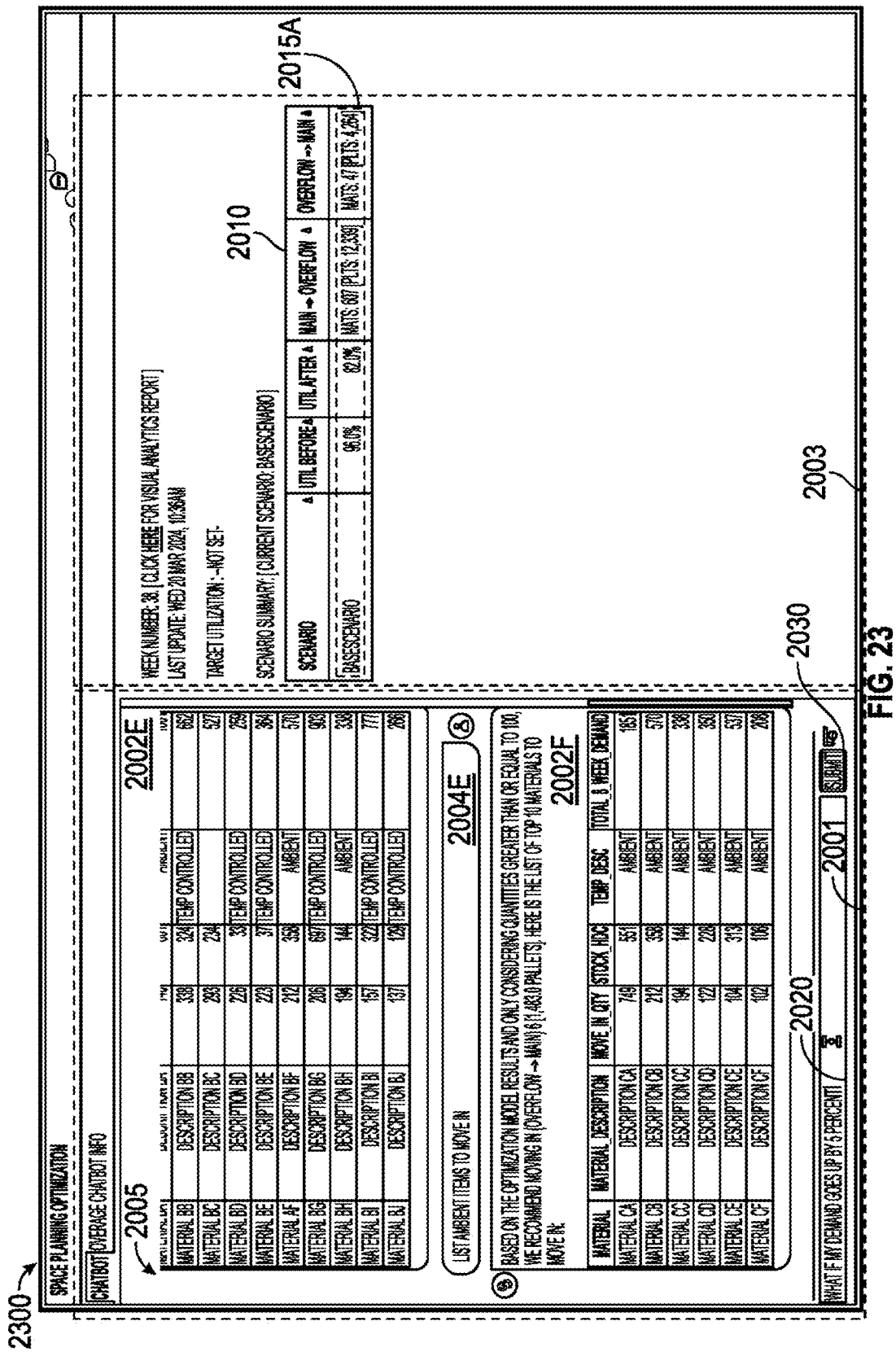

In a second non-limiting example, FIG. 23 may depict a user interface textual element 2004E displaying a user input in which the user has requested a resource demand forecasting task relating to identifying items for transportation from a secondary storage site to a primary storage site. In response to the provided user input, the GUI may receive a response from the analytics compute service and may display user interface textual element 2002F based on the received response. The user interface textual element 2004E may include an inbound item transfer list that specifies one or more item identification numbers (e.g., represented by Material CA, Material CB, and so on) and respective item quantities to be transported (e.g., 749 for Material CA, 212 for Material CB, and so on). It should be noted that the item identification numbers may instead be represented by alphabetical characters, alphanumeric characters, or other symbolic forms of representation without deviating from the scope of the disclosure.

The user interface textual element 2002F may, in some examples, provide an indication of items for transportation to the primary physical storage site based on the results of a previously run optimization (e.g., the space optimization requested earlier by a user as indicated in user interface textual element 2004D). A default filter may be defined for the inbound item transfer list (e.g., may only list items with a quantity size of 100 or greater). Additionally, a custom filter may be configured via the user input (e.g., filtering by temperature, such as only items that have an ambient temperature description). Other custom filters may be added including filtering by identification number, item quantity, description, item stock, or demand. In some examples, the inbound item transfer list may be ordered (e.g., descending order by item quantity). Additionally, user interface textual element 2002E may provide a recommendation for a quantity of materials (e.g., 6 materials) and/or pallets (e.g., 1,483 pallets) to move in based on the results of the previously run optimization and the active filters (e.g., custom filters, default filters in examples where the default filter is not replaced with a custom filter). As user interface textual element 2002F is associated with a different set of filters than user interface textual element 2002E, the corresponding recommended quantity of materials and/or quantity of pallets may differ.

In some examples, the user input includes a request to simulate a scenario where future demand increases or decreases by a user-specified demand adjustment value and the target resource optimization compute function may relate to a resource demand forecasting optimization compute function that requires a demand direction parameter and a demand adjustment parameter. In some examples, process 1650 or another process may identify, using the LLM, the user-specified demand adjustment value and a user-specified demand direction value from the user input. Additionally, process 1650 or another process may convert, using the LLM, the user-specified demand adjustment value into a standardized format compatible with the resource demand forecasting optimization compute function and may convert, using the large language model, the user-specified demand direction value into a standardized format compatible with the resource demand forecasting optimization compute function. In some such examples, process 1650 executing the target optimization compute function may include executing, using an optimization model, the resource demand forecasting optimization compute function with the converted user-specified demand direction value as the demand direction parameter and the converted user-specified demand adjustment value as the demand adjustment parameter. In some such examples, the response to the user input returned by process 1660 may include one or more recommended item movement actions based on the scenario simulated and an expected utilization rate of a target physical location after the one or more recommended item movement actions are completed.

In a first non-limiting example, FIG. 24 may depict a user interface textual element 2004F displaying a user input in which the user has requested a resource demand forecasting task that depends on a demand direction parameter and/or a demand adjustment parameter (e.g., optimizing a utilization rate). The user input (e.g., "What if my demand goes up by 5 percent") may include a value corresponding to the demand direction parameter (e.g., "up") and a value corresponding to the demand adjustment parameter (e.g., 5%). An LLM may extract the values corresponding to these parameters and may convert these values to a proper format for the parameter if needed (e.g., converting 5% to 5 for the demand adjustment parameter). The corresponding demand direction and demand adjustment parameters may then be provided to the analytics compute service. It should be noted that, in some examples, the demand direction parameter and demand adjustment parameter may be combined into a single parameter value that may represent both a direction and a magnitude of adjustment without deviating from the scope of the present disclosure.

In response to the provided user input, the GUI may receive a response from the analytics compute service and may display user interface textual element 2002G based on the received response. The user interface textual element 2002G may include a first proposed resource transfer specifying a total number of items (e.g., 584 materials or 11,274 pallets) to transfer from the target physical location (e.g., a main location) to a second location (e.g., an overflow location) and a second proposed resource transfer that specifies a total number of items (e.g., 50 materials or 4,784 pallets) to transfer from the second physical location to the target location. Additionally, because the user does not specify a utilization rate, the user interface textual element 2002G may further display an expected utilization rate of the target physical location (e.g., 85%), as determined by the analytics compute service, after the first proposed resource transfer and the second proposed resource transfer are complete. Each of the total number of items and expected utilization rate may be determined based on the adjusted demand value (determined based on an assumed increase in demand by 5%). Additionally, the user interface textual element 2002G may include a recommendation for the user to request a list of items to move in or move out based on the optimization.

In a second non-limiting example, FIG. 24 may further depict a user interface textual element 2004G displaying a user input in which the user has requested a resource demand forecasting task that depends on a demand direction parameter and/or a demand adjustment parameter (e.g., optimizing a utilization rate). The user input (e.g., "What if my demand goes down by 10 percent") may include a value corresponding to the demand direction parameter (e.g., "down") and a value corresponding to the demand adjustment parameter (e.g., 10%). An LLM may extract the values corresponding to these parameters and may convert these values to a proper format for the parameter if needed (e.g., converting 10% to 10 for the demand adjustment parameter). The corresponding demand direction and demand adjustment parameters may then be provided to the analytics compute service. It should be noted that, in some examples, the demand direction parameter and demand adjustment parameter may be combined into a single parameter value that may represent both a direction and a magnitude of adjustment without deviating from the scope of the present disclosure.

In response to the provided user input, the GUI may receive a response from the analytics compute service and may display user interface textual element 2002H based on the received response. The user interface textual element 2002G may include a first proposed resource transfer specifying a total number of items (e.g., 647 materials or 14,782 pallets) to transfer from the target physical location (e.g., a main location) to a second location (e.g., an overflow location) and a second proposed resource transfer that specifies a total number of items (e.g., 43 materials or 3,588 pallets) to transfer from the second physical location to the target location. Additionally, because the user does not specify a utilization rate, the user interface textual element 2002H may further display an expected utilization rate of the target physical location (e.g., 77%), as determined by the analytics compute service, after the first proposed resource transfer and the second proposed resource transfer are complete. Each of the total number of items and expected utilization rate may be determined based on the adjusted demand value (determined based on an assumed decrease in demand by 10%). Additionally, the user interface textual element 2002H may include a recommendation for the user to request a list of items to move in or move out based on the optimization.

In a third non-limiting example, FIG. 24 may further depict a user interface textual element 2004H displaying a user input in which the user has requested a resource demand forecasting task that depends on a demand direction parameter and/or a demand adjustment parameter (e.g., optimizing a utilization rate). The user input (e.g., "Set target utilization to 88 percent") may not include a value corresponding to the demand direction parameter or a value corresponding to the demand adjustment parameter. Accordingly, a previous value of the demand may be used (e.g., an LLM may provide a previous value of the demand direction parameter and demand adjustment parameter to an analytics compute service or may provide null values and the analytics compute service may set these parameters with the previous values). However, the user input may include a target utilization (e.g., 88%). Accordingly, an LLM may extract the value corresponding to the target utilization and may convert this value to a proper format for a target utilization parameter if needed (e.g., converting 88% to 88 for a target utilization parameter). The corresponding target utilization parameter may then be provided to the analytics compute service.

In response to the provided user input, the GUI may receive a response from the analytics compute service and may display user interface textual element 2002I based on the received response. The user interface textual element 2002I may include a first proposed resource transfer specifying a total number of items (e.g., 240 materials or 8,920 pallets) to transfer from the target physical location (e.g., a main location) to a second location (e.g., an overflow location) and a second proposed resource transfer that specifies a total number of items (e.g., 47 materials or 4,290 pallets) to transfer from the second physical location to the target location. Additionally, because the user specifies a utilization rate, the user interface textual element 2002I may further display the expected utilization rate of the target physical location (e.g., 88%). Each of the total number of items and expected utilization rate may be determined based on the previously adjusted demand value (determined based on an assumed decrease in demand by 10%). Additionally, the user interface textual element 2002I may include a recommendation for the user to request a list of items to move in or move out based on the optimization.

In some examples, the target demand forecasting task relates to identifying items for transportation from an item source to a primary physical storage site and a secondary physical storage site. The item source may include one or more physical storage site locations distinct from the primary physical storage site and the secondary physical storage site from which the items to be transported may be sourced. In a non-limiting example, as depicted in FIG. 25, a user interface textual element 2004I may display a user input in which a user has requested a resource demand forecasting task that relates to identifying items for transportation from an item source to a primary physical storage site and a secondary physical storage site (e.g., incoming shipments). In response to the provided user input, the GUI may receive a response from the analytics compute service and may display user interface textual element 2002J. The user interface textual element 2002J may include a total number of items to be transported from the item source (e.g., 38 containers or 1,598 pallets). Additionally, the user interface textual element 2002J may include a recommendation for the user to request a corresponding resource optimization compute function (e.g., an inbound deployment optimization).

In some examples, the target demand forecasting task relates to allocating incoming resources among multiple storage sites (e.g., a physical storage site and a secondary storage site). In some such examples, the target resource optimization compute function may relate to an inbound allocation optimization compute function. In a non-limiting example, FIG. 25 may depict a user interface textual element 2004J displaying a user input in which a user has requested a resource demand forecasting task that relates to allocating incoming resources among multiple storage sites. In response to the provided user input, the GUI may receive a response from the analytics compute service and may display user interface textual element 2002K. The user interface textual element 2002K may include a first proposed resource transfer specifying a total number of items (e.g., 32 containers or 1,346 pallets) to transfer from the item source to the primary storage site and a second proposed resource transfer that specifies a total number of items (e.g., 6 containers or 252 pallets) to transfer from the item source to the secondary storage site.

In some examples, the target demand forecasting task relates to requesting additional information (e.g., insight) on a material proposed for transportation between a physical storage site and a secondary storage site. In a non-limiting example, as depicted in FIG. 26, a user interface textual element 2004K may depict a user interface textual element 2004K displaying a user input in which the user has requested a resource demand forecasting task relating to identifying items for transportation from a primary physical storage site to a secondary physical storage site. In response to the provided user input, the GUI may receive a response from the analytics compute service and may display user interface textual element 2002L based on the response. The user interface textual element 2004L may include an outbound item transfer list that includes a row with a particular item identification number (e.g., Material EA).

After the user interface textual element 2002L is displayed, the user may request additional information (e.g., insight) about the item with the particular item identification number (e.g., Material EA). User interface textual element 2004L may depict the user requesting additional information about the item with the particular item identification number. In response to the provided user input associated with user interface textual element 2004L, the GUI may receive a response from analytics compute service and may display user interface textual element 2002M in response. The user interface textual element 2002M may display the additional information requested by the user (e.g., insight related to the contents of the outbound item transfer list for the item with the particular item identification number). It should be noted that similar techniques may be performed for an inbound item transfer list without deviating from the scope of the present disclosure.

In some examples, the graphical user interface may include a dual-panel interface. The dual-panel interface may include a first panel configured to display a chatbot-type interface for receiving optimization requests from a user and displaying responses from the digital assistant during a current session. Additionally, the dual-panel interface may include a second panel configured to display a summary table of optimization scenarios executed during the current session, where each distinct row of the summary table represents a distinct optimization scenario executed during the current session.

In a non-limiting example, FIGS. 20 through 26 may depict a GUI with a dual-panel interface. For instance, the GUI may include a first panel 2001 that includes user interface display element 2005, user interface input element 2020, and user interface control element 2030. Additionally, the GUI may include a second panel 2003 that includes a summary table 2010, where the summary table 2010 may indicate optimization scenarios executed during a current session. Each distinct row of the summary table may represent a distinct optimization scenario. For instance, row 2015A may represent a base scenario, row 2015B may represent a scenario in which demand is up by 5%, row 2015C may represent a scenario in which demand is down by 10%, and row 2015D may represent a scenario in which demand is down by 10% and a utilization rate is set from a default value (e.g., 96%) to a user-specified one (e.g., 88%).

Each distinct row of the summary table of optimization scenarios may include one or more of an optimization name or optimization scenario identifier for the distinct optimization scenario, a utilization rate of a target physical storage site before the distinct optimization scenario was executed, a utilization rate of the target physical storage site after the distinct optimization scenario was executed, a total quantity of items to transport from the target physical storage site to a secondary physical storage site as determined by the distinct optimization scenario, and a total quantity of items to transport from the secondary physical storage site to the primary physical storage site as determined by the distinct optimization scenario.

In a non-limiting example, as depicted in FIG. 26, row 2015A of summary table 2010 may include an optimization scenario identifier (e.g., BaseScenario), a utilization rate of a target physical storage site before the distinct optimization scenario was executed (e.g., 96.0%), a utilization rate of the target physical storage site after the distinct optimization scenario was executed (e.g., 82%), a total quantity of materials to transport from the target physical storage site to a secondary physical storage site (e.g., 607 materials or 12,339 pallets) and a total quantity of items to transport from the primary physical storage site to the secondary physical storage site (e.g., 47 materials or 4,264 pallets). Rows 2015B, 2015C, and 2015D of summary table 2010 may include respective utilization rates before and after a particular optimization scenario and may also include respective total quantities of materials to transport between the target physical storage site and the secondary physical storage site.

In some examples, process 1660 returning, via the graphical user interface of the digital assistant, the response to the user input may include process 1660 returning a natural language response to the user input in the chatbot-type interface of the first panel of the dual-panel interface and adding, in real-time or near real-time, a new row to the summary table of optimization scenarios based on the resource optimization results computed by the analytics compute service for the target resource optimization compute function. For instance, in a non-limiting example as depicted in FIG. 20, once the user input associated with user interface textual element 2004-b is received by the digital assistant, the response associated with user interface textual element 2002-c may be provided in user interface display element 2005 (e.g., a chatbot-type interface) and summary table 2010 may be dynamically updated with a new row corresponding to the user input.

In some examples, the digital assistant uses a first programmatic interface (e.g., a first API) to interact with the LLM and may use a second programmatic interface (e.g., a second API) to interact with the analytics compute service. Additionally, the LLM and the analytics compute service may be separate components that the digital assistant uses to generate the response to the user input. For instance, the LLM may be located at a first server in communication with a GUI of the digital assistant (e.g., GUI 1706) and the analytics compute service may be located at a second server in communication with the GUI.

In a non-limiting example, when a user provides an input to graphical user interface 1706 of FIGS. 17 and 18, the graphical user interface may provide a request to the LLM 1710 using a first programmatic interface. In some examples, the resource optimization request generator 1717 may be included in the LLM 1710. In such examples, the LLM 1710 may provide a resource optimization request 1718 to the analytics compute service 1719 via a second programmatic interface (e.g., an API). Alternatively, the LLM 1710 may provide the resource optimization request 1718 to a system hosting the GUI 1706, where the system may provide the resource optimization request 1718 to the analytics compute service 1719 via a second programmatic interface. In other examples, the resource optimization request generator 1717 may be included in the system hosting the GUI 1706. In such examples, the GUI 1706 may receive the resource forecasting prompt 1712, resource optimization function 1714, and user-specified parameter values 1716 and/or default parameter values 1802 from LLM 1710 and may provide a corresponding resource optimization request 1718 to the LLM 1710 via the second programmatic interface.

It shall also be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:

receiving a natural language input comprising a natural language request for executing an analytical task;

processing the natural language input by a language model that is configured to translate the natural language input to a plurality of distinct analytical function calls that are each associated with a function prompt name and a function prompt description, wherein the processing includes:

translating the natural language input to an analytical function call for calling an analytical function of a plurality of distinct analytical functions of an analytics computing server, wherein translating the natural language input to the analytical function call includes:
  detecting, via the language model, a value for one or more input arguments of the analytical function call from the natural language input and that a vector value of the function prompt name and a vector value of the function prompt description of the analytical function call of the plurality of distinct analytical function calls has a smallest vector distance to a vector value of the natural language input, and
  translating the natural language input to the analytical function call based on detecting that the vector value of the function prompt name and the vector value of the function prompt description has the smallest vector distance to the vector value of the natural language input;
calling the analytical function at the analytics computing server using the analytical function call;
receiving a technical analytical output in response to calling the analytical function; and
outputting a response to the natural language input that includes the technical analytical output.

2. The computer-program product according to claim 1, wherein:
the one or more input arguments of the analytical function call include a first input argument and a second input argument,
the analytical function at the analytics computing server includes a third input argument and a fourth input argument,
the analytics computing server executes the analytical function based on a value of the third input argument and a value of the fourth input argument, wherein executing the analytical function at the analytics computing server includes:
  using the value detected for the first input argument as the value for the third input argument, and
  using the value detected for the second input argument as the value for the fourth input argument, and
each analytical function of the plurality of distinct analytical functions maps to a respective set of predefined instructions accessible by the analytics computing server, and wherein calling the analytical function comprises providing an identifier of the analytical function call to the analytics computing server and executing, at the analytics computing server, the respective set of predefined instructions mapped to the analytical function based at least in part on the identifier of the analytical function call.

3. The computer-program product according to claim 2, the computer instructions, when executed by the one or more processors, performing additional operations comprising:
providing, to the analytics computing server, an indication of user credentials, wherein executing the respective set of predefined instructions that map to the analytical function comprises accessing one or more of a set of tables, the set of tables based at least in part on the provided indication of user credentials.

4. The computer-program product according to claim 3, the computer instructions, when executed by the one or more processors, performing additional operations comprising:
storing, at a database accessible by the analytics computing server, the set of tables and a second set of tables, the set of tables associated with a first user indicated by the user credentials and the second set of tables associated with a second user distinct from the first user; and
blocking access to the second set of tables based at least in part on the provided indication of user credentials.

5. The computer-program product according to claim 3, wherein accessing the one or more of the set of tables comprises updating an entry of the one or more of the set of tables.

6. The computer-program product according to claim 2, wherein the analytics computing server is configured to control access to entries of one or more tables such that the language model is restricted from accessing data stored within the one or more tables, thereby securing the one or more tables from unauthorized access via the natural language input provided to the language model.

7. The computer-program product according to claim 1, wherein:
the one or more input arguments of the analytical function call includes a first input argument,
the analytical function at the analytics computing server includes a second input argument and a third input argument, different from the second input argument,
a value of the second input argument and a value of the third input argument is detected from the first input argument, and
the computer instructions, when executed by the one or more processors, performing additional operations comprising:
  initializing the language model according to a set of predefined prompts, wherein the language model translates the natural language input to the analytical function call based at least in part on the initializing.

8. The computer-program product according to claim 1, wherein:
the one or more input arguments of the analytical function call at least include a required input argument and an optional input argument,
the computer instructions, when executed by the one or more processors, perform operations further comprising:
  determining that the value detected for a first input argument of the one or more input arguments is of a first data type,
  determining that the first input argument of the analytical function call corresponds to a second input argument of the analytical function that is of a second data type, different from the first data type,
  converting the value detected for the first input argument from the first data type to the second data type, and
  after converting the value to the second data type, using the value for the second input argument of the analytical function,
detecting the value for the one or more input arguments of the analytical function call includes:
  determining that the language model did not detect the value for the required input argument, and
  assigning a default value to the required input argument in response to the determining that the language model did not detect the value for the required input argument,
the computer instructions, when executed by the one or more processors, perform operations further comprising:

translating, by the language model, the technical analytical output to a natural language explanation of the technical analytical output, or the natural language input is received via a graphical user interface (GUI), a command-line interface (CLI), or an application programming interface (API).

9. The computer-program product according to claim 8, wherein:

the response to the natural language input includes the natural language explanation and is output via the GUI, the CLI, or the API.

10. The computer-program product according to claim 1, wherein:

a graphical user interface that receives the natural language input is in communication with a language model computing server that executes the language model;

the language model computing server is in communication with a function call computing server configured with a function call library that includes the analytical function call;

the function call computing server is in communication with the analytics computing server configured to execute one or more of the plurality of distinct analytical functions; and the analytics computing server is in communication with a computer database comprising user data and a visual analytics computing server that generates graphical analytic content for the response to the natural language input.

11. A computer-implemented method comprising:

initializing a language model according to a set of predefined prompts;

receiving a natural language input comprising a natural language request for executing an analytical task;

processing the natural language input by the language model, wherein the processing includes:

translating the natural language input to an analytical function call for calling an analytical function of a plurality of distinct analytical functions of an analytics computing server based at least in part on the initializing, wherein translating the natural language input to the analytical function call includes detecting a value for one or more input arguments of the analytical function call from the natural language input, wherein:

the one or more input arguments of the analytical function call includes a first input argument, the analytical function at the analytics computing server includes a second input argument and a third input argument, different from the second input argument, and a value of the second input argument and a value of the third input argument is detected from the first input argument;

calling the analytical function at the analytics computing server using the analytical function call;

receiving a technical analytical output in response to calling the analytical function; and outputting a response to the natural language input that includes the technical analytical output.

12. The computer-implemented method according to claim 11, wherein:

the one or more input arguments of the analytical function call include a fourth input argument and a fifth input argument, the analytical function at the analytics computing server includes a sixth input argument and a seventh input argument, the analytics computing server executes the analytical function based on a value of the sixth input argument and a value of the seventh input argument, wherein executing the analytical function at the analytics computing server includes:

using the value detected for the fourth input argument as the value for the sixth input argument, and using the value detected for the fifth input argument as the value for the seventh input argument, and each analytical function of the plurality of distinct analytical functions maps to a respective set of predefined instructions accessible by the analytics computing server, and wherein calling the analytical function comprises providing an identifier of the analytical function call to the analytics computing server and executing, at the analytics computing server, the respective set of predefined instructions mapped to the analytical function based at least in part on the identifier of the analytical function call.

13. The computer-implemented method according to claim 12, further comprising:

providing, to the analytics computing server, an indication of user credentials, wherein executing the respective set of predefined instructions that map to the analytical function comprises accessing one or more of a set of tables, the set of tables based at least in part on the provided indication of user credentials.

14. The computer-implemented method according to claim 13, further comprising:

storing, at a database accessible by the analytics computing server, the set of tables and a second set of tables, the set of tables associated with a first user indicated by the user credentials and the second set of tables associated with a second user distinct from the first user; and blocking access to the second set of tables based at least in part on the provided indication of user credentials.

15. The computer-implemented method according to claim 13, wherein accessing the one or more of the set of tables comprises updating an entry of the one or more of the set of tables.

16. The computer-implemented method according to claim 12, wherein the analytics computing server is configured to control access to entries of one or more tables such that the language model is restricted from accessing data stored within the one or more tables, thereby securing the one or more tables from unauthorized access via the natural language input provided to the language model.

17. The computer-implemented method according to claim 11, wherein:

the one or more input arguments of the analytical function call at least include a required input argument and an optional input argument, the computer-implemented method further comprises:

determining that the value detected for a fourth input argument of the one or more input arguments is of a first data type, determining that the fourth input argument of the analytical function call corresponds to a fifth input argument of the analytical function that is of a second data type, different from the first data type, converting the value detected for the fourth input argument from the first data type to the second data type, and after converting the value to the second data type, using the value for the fifth input argument of the analytical function, detecting the value for the one or more input arguments of the analytical function call includes:

determining that the language model did not detect the value for the required input argument, and assigning a default value to the required input argument in response to the determining that the language model did not detect the value for the required input argument, the computer-implemented method further comprises:

translating, by the language model, the technical analytical output to a natural language explanation of the technical analytical output, or the natural language input is received via a graphical user interface (GUI), a command-line interface (CLI), or an application programming interface (API).

18. The computer-implemented method according to claim 17, wherein:

the response to the natural language input includes the natural language explanation and is output via the GUI, the CLI, or the API.

19. The computer-implemented method according to claim 11, wherein:

the language model is configured to translate the natural language input to a plurality of distinct analytical function calls, each of the plurality of distinct analytical function calls are associated with a function prompt name and a function prompt description, and translating the natural language input to the analytical function call includes:

detecting, via the language model, that a vector value of the function prompt name and a vector value of the function prompt description of the analytical function call of the plurality of distinct analytical function calls has a smallest vector distance to a vector value of the natural language input, and translating the natural language input to the analytical function call based on detecting that the vector value of the function prompt name and the vector value of the function prompt description has the smallest vector distance to the vector value of the natural language input.

20. The computer-implemented method according to claim 11, wherein:

a graphical user interface that receives the natural language input is in communication with a language model computing server that executes the language model;

the language model computing server is in communication with a function call computing server configured with a function call library that includes the analytical function call;

the function call computing server is in communication with the analytics computing server configured to execute one or more of the plurality of distinct analytical functions; and the analytics computing server is in communication with a computer database comprising user data and a visual analytics computing server that generates graphical analytic content for the response to the natural language input.

21. A computer-implemented system comprising:
one or more processors;
a memory;
a non-transitory computer-readable medium operably coupled to the one or more processors, the non-transitory computer-readable medium having computer-readable instructions stored thereon that, when executed by the one or more processors, cause a computing device to perform operations comprising:
initializing a language model according to a set of predefined prompts;
receiving a natural language input comprising a natural language request for executing an analytical task;
processing the natural language input by the language model, wherein the processing includes:
translating the natural language input to an analytical function call for calling an analytical function of a plurality of distinct analytical functions of an analytics computing server based at least in part on the initializing, wherein translating the natural language input to the analytical function call includes detecting a value for one or more input arguments of the analytical function call from the natural language input, wherein:
the one or more input arguments of the analytical function call includes a first input argument,
the analytical function at the analytics computing server includes a second input argument and a third input argument, different from the second input argument, and
a value of the second input argument and a value of the third input argument is detected from the first input argument;
calling the analytical function at the analytics computing server using the analytical function call;
receiving a technical analytical output in response to calling the analytical function; and
outputting a response to the natural language input that includes the technical analytical output.

22. The computer-implemented system according to claim 21, wherein:
the one or more input arguments of the analytical function call include a fourth input argument and a fifth input argument,
the analytical function at the analytics computing server includes a sixth input argument and a seventh input argument,
the analytics computing server executes the analytical function based on a value of the sixth input argument and a value of the seventh input argument, wherein executing the analytical function at the analytics computing server includes:
using the value detected for the fourth input argument as the value for the sixth input argument, and
using the value detected for the fifth input argument as the value for the seventh input argument, and
each analytical function of the plurality of distinct analytical functions maps to a respective set of predefined instructions accessible by the analytics computing server, and wherein calling the analytical function comprises providing an identifier of the analytical function call to the analytics computing server and executing, at the analytics computing server, the respective set of predefined instructions mapped to the analytical function based at least in part on the identifier of the analytical function call.

23. The computer-implemented system according to claim 22, wherein the computer-readable instructions stored thereon, when executed by the one or more processors, cause the computing device to perform additional operations comprising:
providing, to the analytics computing server, an indication of user credentials, wherein executing the respective set of predefined instructions that map to the analytical function comprises accessing one or more of a set of tables, the set of tables based at least in part on the provided indication of user credentials.

24. The computer-implemented system according to claim 23, wherein the computer-readable instructions stored thereon, when executed by the one or more processors, cause the computing device to perform additional operations comprising:
storing, at a database accessible by the analytics computing server, the set of tables and a second set of tables, the set of tables associated with a first user indicated by the user credentials and the second set of tables associated with a second user distinct from the first user; and
blocking access to the second set of tables based at least in part on the provided indication of user credentials.

25. The computer-implemented system according to claim 23, wherein accessing the one or more of the set of tables comprises updating an entry of the one or more of the set of tables.

26. The computer-implemented system according to claim 22, wherein the analytics computing server is configured to control access to entries of one or more tables such that the language model is restricted from accessing data stored within the one or more tables, thereby securing the one or more tables from unauthorized access via the natural language input provided to the language model.

27. The computer-implemented system according to claim 21, wherein:
the one or more input arguments of the analytical function call at least include a required input argument and an optional input argument,
the computer-readable instructions stored thereon, when executed by the one or more processors, cause the computing device to perform operations further comprising:
determining that the value detected for a fourth input argument of the one or more input arguments is of a first data type,
determining that the fourth input argument of the analytical function call corresponds to a fifth input argument of the analytical function that is of a second data type, different from the first data type,
converting the value detected for the fourth input argument from the first data type to the second data type, and
after converting the value to the second data type, using the value for the fifth input argument of the analytical function,
detecting the value for the one or more input arguments of the analytical function call includes:
determining that the language model did not detect the value for the required input argument, and
assigning a default value to the required input argument in response to the determining that the language model did not detect the value for the required input argument,
the computer-readable instructions stored thereon, when executed by the one or more processors, cause the computing device to perform operations further comprising:
translating, by the language model, the technical analytical output to a natural language explanation of the technical analytical output, or
the natural language input is received via a graphical user interface (GUI), a command-line interface (CLI), or an application programming interface (API).

28. A computer-program product comprising a non-transitory machine-readable storage medium storing computer instructions that, when executed by one or more processors, perform operations comprising:
receiving a natural language input comprising a natural language request for executing an analytical task;
processing the natural language input by a language model, wherein the processing includes:
translating the natural language input to an analytical function call for calling an analytical function of a plurality of distinct analytical functions of an analytics computing server, wherein:
each analytical function of the plurality of distinct analytical functions maps to a respective set of predefined instructions accessible by the analytics computing server, and wherein calling the analytical function comprises providing an identifier of the analytical function call to the analytics computing server and executing, at the analytics computing server, the respective set of predefined instructions mapped to the analytical function based at least in part on the identifier of the analytical function call, and
translating the natural language input to the analytical function call includes detecting a value for one or more input arguments of the analytical function call from the natural language input, wherein:
the one or more input arguments of the analytical function call include a first input argument and a second input argument, and
the analytical function at the analytics computing server includes a third input argument and a fourth input argument;
calling the analytical function at the analytics computing server using the analytical function call, wherein the analytics computing server executes the analytical function based on a value of the third input argument and a value of the fourth input argument, wherein executing the analytical function at the analytics computing server includes:
using the value detected for the first input argument as the value for the third input argument, and
using the value detected for the second input argument as the value for the fourth input argument;
receiving a technical analytical output in response to calling the analytical function; and
outputting a response to the natural language input that includes the technical analytical output.

29. A computer-program product comprising a non-transitory machine-readable storage medium storing computer instructions that, when executed by one or more processors, perform operations comprising:
initializing a language model according to a set of predefined prompts;
receiving a natural language input comprising a natural language request for executing an analytical task;

processing the natural language input by the language model, wherein the processing includes:
  translating the natural language input to an analytical function call for calling an analytical function of a plurality of distinct analytical functions of an analytics computing server based at least in part on the initializing, wherein translating the natural language input to the analytical function call includes detecting a value for one or more input arguments of the analytical function call from the natural language input, wherein:
    the one or more input arguments of the analytical function call includes a first input argument,
    the analytical function at the analytics computing server includes a second input argument and a third input argument, different from the second input argument, and
    a value of the second input argument and a value of the third input argument is detected from the first input argument;
  calling the analytical function at the analytics computing server using the analytical function call;
  receiving a technical analytical output in response to calling the analytical function; and
  outputting a response to the natural language input that includes the technical analytical output.

30. A computer-program product comprising a non-transitory machine-readable storage medium storing computer instructions that, when executed by one or more processors, perform operations comprising:
  receiving a natural language input comprising a natural language request for executing an analytical task;
  processing the natural language input by a language model, wherein the processing includes:
    translating the natural language input to an analytical function call for calling an analytical function of a plurality of distinct analytical functions of an analytics computing server, wherein translating the natural language input to the analytical function call includes detecting a value for one or more input arguments of the analytical function call from the natural language input;
  calling the analytical function at the analytics computing server using the analytical function call;
  receiving a technical analytical output in response to calling the analytical function; and
  outputting a response to the natural language input that includes the technical analytical output,
  wherein:
    the one or more input arguments of the analytical function call at least include a required input argument and an optional input argument,
    detecting the value for the one or more input arguments of the analytical function call includes:
      determining that the language model did not detect the value for the required input argument, and
      assigning a default value to the required input argument in response to the determining that the language model did not detect the value for the required input argument,
    the computer instructions, when executed by the one or more processors, perform operations further comprising:
      determining that the value detected for a first input argument of the one or more input arguments is of a first data type,
      determining that the first input argument of the analytical function call corresponds to a second input argument of the analytical function that is of a second data type, different from the first data type,
      converting the value detected for the first input argument from the first data type to the second data type, and
      after converting the value to the second data type, using the value for the second input argument of the analytical function,
    the computer instructions, when executed by the one or more processors, perform operations further comprising:
      translating, by the language model, the technical analytical output to a natural language explanation of the technical analytical output, or
    the natural language input is received via a graphical user interface (GUI), a command-line interface (CLI), or an application programming interface (API).

31. A computer-implemented method comprising:
  receiving a natural language input comprising a natural language request for executing an analytical task;
  processing the natural language input by a language model that is configured to translate the natural language input to a plurality of distinct analytical function calls that are each associated with a function prompt name and a function prompt description, wherein the processing includes:
    translating the natural language input to an analytical function call for calling an analytical function of a plurality of distinct analytical functions of an analytics computing server, wherein translating the natural language input to the analytical function call includes:
      detecting, via the language model, a value for one or more input arguments of the analytical function call from the natural language input and that a vector value of the function prompt name and a vector value of the function prompt description of the analytical function call of the plurality of distinct analytical function calls has a smallest vector distance to a vector value of the natural language input, and
      translating the natural language input to the analytical function call based on detecting that the vector value of the function prompt name and the vector value of the function prompt description has the smallest vector distance to the vector value of the natural language input;
  calling the analytical function at the analytics computing server using the analytical function call;
  receiving a technical analytical output in response to calling the analytical function; and
  outputting a response to the natural language input that includes the technical analytical output.

32. A computer-implemented system comprising:
  one or more processors;
  a memory;
  a non-transitory computer-readable medium operably coupled to the one or more processors, the non-transitory computer-readable medium having computer-readable instructions stored thereon that, when executed by the one or more processors, cause a computing device to perform operations comprising:

receiving a natural language input comprising a natural language request for executing an analytical task;

processing the natural language input by a language model, wherein the processing includes:

translating the natural language input to an analytical function call for calling an analytical function of a plurality of distinct analytical functions of an analytics computing server, wherein translating the natural language input to the analytical function call includes detecting a value for one or more input arguments of the analytical function call from the natural language input;

calling the analytical function at the analytics computing server using the analytical function call;

receiving a technical analytical output in response to calling the analytical function; and outputting a response to the natural language input that includes the technical analytical output, wherein:

the one or more input arguments of the analytical function call at least include a required input argument and an optional input argument, detecting the value for the one or more input arguments of the analytical function call includes:

determining that the language model did not detect the value for the required input argument, and assigning a default value to the required input argument in response to the determining that the language model did not detect the value for the required input argument, the computer-readable instructions stored thereon, when executed by the one or more processors, cause the computing device to perform operations further comprising:

determining that the value detected for a first input argument of the one or more input arguments is of a first data type, determining that the first input argument of the analytical function call corresponds to a second input argument of the analytical function that is of a second data type, different from the first data type, converting the value detected for the first input argument from the first data type to the second data type, and after converting the value to the second data type, using the value for the second input argument of the analytical function, the computer-readable instructions stored thereon, when executed by the one or more processors, cause the computing device to perform operations further comprising:

translating, by the language model, the technical analytical output to a natural language explanation of the technical analytical output, or the natural language input is received via a graphical user interface (GUI), a command-line interface (CLI), or an application programming interface (API).

* * * * *